United States Patent
Sasaki et al.

(10) Patent No.: US 8,326,124 B2
(45) Date of Patent: Dec. 4, 2012

(54) RECORDING MEDIUM, PLAYBACK APPARATUS, RECORDING APPARATUS, PLAYBACK METHOD, AND RECORDING METHOD FOR REDUCING PROCESSING LOAD DURING COPYRIGHT PROTECTION AT THE TS PACKET LEVEL

(75) Inventors: Taiji Sasaki, Osaka (JP); Minehisa Nagata, Osaka (JP); Masaya Yamamoto, Osaka (JP); Takahiro Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 1059 days.

(21) Appl. No.: 12/261,362

(22) Filed: Oct. 30, 2008

(65) Prior Publication Data

US 2009/0116818 A1 May 7, 2009

Related U.S. Application Data

(60) Provisional application No. 60/996,090, filed on Nov. 1, 2007.

(51) Int. Cl.
*H04N 5/783* (2006.01)

(52) U.S. Cl. .................................. 386/259; 386/344

(58) Field of Classification Search .................. 386/343, 386/344, 345, 346, 351, 252, 258, 259
See application file for complete search history.

(56) References Cited

U.S. PATENT DOCUMENTS

| | | | |
|---|---|---|---|
| 6,512,882 B1 | 1/2003 | Teunissen | |
| 6,950,604 B1 | 9/2005 | Kato et al. | |
| 7,865,060 B2 * | 1/2011 | Ikeda et al. ................... | 386/241 |
| 2002/0064189 A1 | 5/2002 | Coupe et al. | |
| 2003/0072564 A1 | 4/2003 | Teunissen | |
| 2003/0086568 A1 | 5/2003 | Kato et al. | |
| 2004/0156623 A1 | 8/2004 | Kato et al. | |
| 2005/0157714 A1 * | 7/2005 | Shlissel et al. ................ | 370/389 |
| 2007/0047645 A1 * | 3/2007 | Takashima ................. | 375/240.2 |
| 2008/0273698 A1 * | 11/2008 | Manders et al. ............. | 380/200 |
| 2008/0304810 A1 * | 12/2008 | Rijckaert et al. ................ | 386/68 |

FOREIGN PATENT DOCUMENTS

| | | | |
|---|---|---|---|
| EP | 1 381 045 | | 1/2004 |
| JP | 2000-228656 | | 8/2000 |
| JP | 2001-169247 | | 6/2001 |
| JP | 2007-97128 | | 4/2007 |
| RU | 2 287 907 | | 4/1999 |
| WO | WO 2006/028216 | * | 3/2006 |

OTHER PUBLICATIONS

Extended European Search Report issued Nov. 22, 20111 in corresponding European Application No. 08843703.3.
Russian Decision on Grant (and English translation thereof) issued Jun. 19, 2012 in Russian Application 201022070.

* cited by examiner

*Primary Examiner* — David Harvey
(74) *Attorney, Agent, or Firm* — Wenderoth Lind & Ponack, L.L.P.

(57) ABSTRACT

A recording medium enables special playback processing although part of the AV stream recorded therein is transformed. An AV stream, a first EP map, and a second EP map are recorded on the recording medium. In the AV stream, a part of the multiplexed stream including a first video stream and a second video stream is transformed. The first EP map indicates one or more entry points of the first video stream and the second EP map indicates one or more entry points of the second video stream. TS packets constituting I-pictures of the first video stream are indicated by every 4N-th entry point in the first EP map, and TS packets constituting I-pictures of the second video stream are indicated by the entry points whose presentation time is closest to the presentation time of any one of the every 4N-th entry point in the first EP map.

19 Claims, 38 Drawing Sheets

RECORDING MEDIUM, PLAYBACK APPARATUS, RECORDING APPARATUS, PLAYBACK METHOD, AND RECORDING METHOD FOR REDUCING PROCESSING LOAD DURING COPYRIGHT PROTECTION AT THE TS PACKET LEVEL

This application claims benefit to the provisional U.S. application Ser. No. 60/996,090, filed Nov. 1, 2007.

BACKGROUND OF THE INVENTION (1) Field of the Invention

The present invention relates to an information recording medium, a playback method thereof, and a recording method thereof, in particular, to a technology for realizing special playback such as fast-forward/rewind. Here, the information recording medium is a BD-ROM or the like having recorded thereon contents such as video and audio, with copyright protection.

(2) Description of the Related Art

Special playback functions such as fast-forward/rewind are indispensable functions for playing back an AV stream recorded on a BD-ROM, DVD, or the like.

In general, a player can perform special functions such as fast-forward/rewind by executing reading of a disc, decoding of the read data, and the like at a speed faster than a normal playback speed, and then playing it back. However, this method places burden on the player, causing the player to be unable to perform processing at the speed required for high-speed playback such as 10× for fast-forward/rewind.

Accordingly, in order to realize special playback such as fast-forward/rewind, the player needs to read and decode part of the AV stream while making temporal skips. For example, the player may select intra-frame encoded images (hereinafter, referred to as "I-pictures") in video included in an AV stream in accordance with the speed of fast-forward/rewind, and performs reading and decoding. However, an AV stream on a BD-ROM or DVD contains various streams such as video, audio, and subtitles multiplexed into the AV stream. Besides, pictures vary in size in a case where the video is encoded using variable length encoding. Accordingly, identifying an I-picture pertaining to a desired time requires analysis processing of the AV stream, thereby consuming a large amount of processing time.

Thus, BD-ROMs use entry maps to realize fast-forward/rewind. An entry map is composed of a list of multiple entry points each indicating an access position in an AV stream. Each entry point is information in which a file position within the AV stream corresponds to a playback time of data located at the file position. For example, an entry map including entry points each composed of a starting file position of an I-picture included in an AV stream on an information recording medium and the presentation time of the I-picture allows the playback apparatus to identify the position, of the I-picture, corresponding to the playback time without analyzing the AV stream, by referring to the entry map. As a result, the playback apparatus is able to perform partial playback of the AV stream, thereby realizing efficient fast-forward/rewind without burden. Patent Document 1 discloses a data structure and a creation method of an entry map for identifying positions of I-pictures.

Patent Document 1: Japanese Laid-Open Patent Application Publication No. 2000-228656

In manufacturing BD-ROM playback apparatuses which handle HDTV contents, demand for copyright protection at the level of TS packets constituting the AV stream is high. However, in order to realize copyright protection using such as special encryption and transformation at the TS packet level, it is required to perform decryption processing, restoration processing or the like in real time at the uppermost stream when reading from the BD-ROM. Especially if the AV stream is provided for a high-speed special playback such as over 10×, such real time processing will incur a large burden.

In addition, multiple video streams may be multiplexed into an AV stream in a BD-ROM to realize Picture-in-Picture playback or 3D playback.

If TS packets constituting two video streams in an AV stream are transformed and the AV stream is provided for a high-speed special playback such as 10×, simultaneous restoration of the transformed TS packets of these multiple video streams need to be realized at 10×. If the BD-ROM playback apparatus is to be designed assuming such a worst-case scenario, it will inevitably require addition of special hardware, increase in operation clock speed, and the like. This will necessitate further modification and improvement of the present BD-ROM players, which goes against the idea of encouraging broad use of the playback apparatuses through standardization.

SUMMARY OF THE INVENTION

The present invention was conceived in view of the above problem and aims to provide a recording medium, a recording method, and a playback apparatus and a playback method for playing back the recording medium, which are able to prevent increase in processing load due to realization of copyright protection at the TS packet level.

In order to achieve the stated aim, the recording medium of the present invention is a recording medium having recorded thereon an AV stream and stream information. Here, the AV stream includes (a) TS packets composing a primary video stream and (b) TS packets composing a secondary video stream, the stream information includes: a first entry map indicating a plurality of associations each associating (a) a start position of, among the TS packets composing the primary video stream, a group of TS packets which constitute an entry unit with (b) a presentation time stamp of the group of TS packets; and a second entry map indicating a plurality of associations each associating (a) a start position of, among the TS packets composing the secondary video stream, a group of TS packets which constitute an entry unit with (b) a presentation time stamp of the group of TS packets of the secondary video stream, each group of TS packets constituting an entry unit stores an intra-frame encoded image therein, among the TS packets composing the primary video stream, one or more TS packets have been transformed and TS packets which constitute every N-th entry unit, in an order of the start position, are untransformed, N being an integer of 2 or more, and each TS packet which constitutes one of the entry units of the secondary video stream and whose presentation time stamp is in a predetermined relationship with a presentation time stamp of the every N-th entry unit, is untransformed.

According to the stated structure, transformation for the purpose of copyright protection is not executed on (a) TS packets which constitute one of every N-th entry unit of the primary video stream and (b) TS packets which constitute an entry unit of the secondary video stream and whose presentation time stamp attached thereto is in a predetermined relationship with the one of every N-th entry unit of the primary video stream. Consequently, selectively using entry units stored in these TS packets eliminates the need for restoring the transformed TS packets constituting the primary video stream and TS packets constituting the secondary video stream. As a result, increase in processing load during high-speed fast-forward/rewind playback can be prevented, thereby realizing the copyright protection using transformation of the TS packets within a permissible range of the processing capability of a standard-model BD-ROM player, without adding special hardware or increasing operation clock speed.

Accordingly, copyright protection is realized by transforming part of the AV stream and recording the post-transformation AV stream, and at the same time, high-speed and simultaneous fast-forward/rewind of the primary video stream and secondary video stream can be performed.

Here, among the TS packets of the secondary video stream, TS packets constituting the entry units closest to every N-th entry unit of the primary video stream are chosen to be untransformed, thereby realizing fast-forward/rewind of the primary video stream and secondary video stream in an as closely synchronized manner as possible.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawing.

DETAILED DESCRIPTION OF THE INVENTION

First Embodiment

Figure 1:
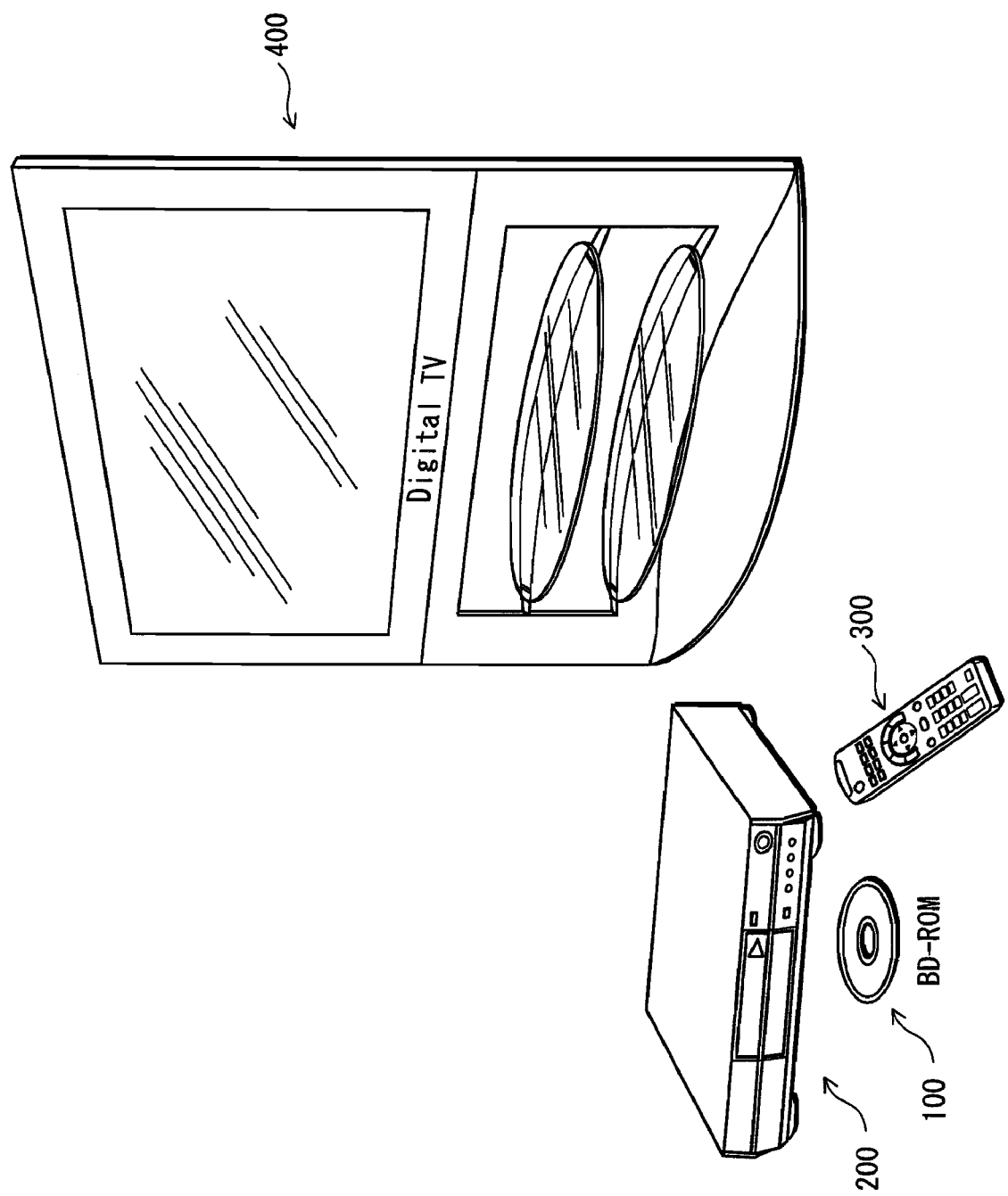
FIG. 1 shows a use form of a recording medium of the present invention.

The following describes a first embodiment of a recording medium of the present invention. First, among various aspects of the recording medium of the present invention, a use form is described. FIG. 1 shows the use form of the recording medium of the present invention. In FIG. 1, the recording medium of the present invention is a BD-ROM 100 which is used to supply a motion picture to a home theater system further composed of a playback apparatus 200, a remote controller 300, and a television 400.

The BD-ROM 100 is a recording medium having recorded thereon a motion picture.

The playback apparatus 200 is an Internet-compliant digital home appliance, and is capable of playing back the BD-ROM 100. The playback apparatus 200 downloads content from a server of a film distributor via a network and stores the downloaded content into a local storage thereof. This way, the playback apparatus 200 is able to expand/update the content of the BD-ROM 100 by combining the content stored in the local storage and the content recorded on the BD-ROM 100. The technology which handles data not recorded on the BD-ROM 100 as if the data is recorded on the BD-ROM 100, by combining the content of the BD-ROM 100 and the content of the local storage, is called "virtual package".

Described above is the use form of the recording medium of the present invention.

Next, description is given on a production form of the recording medium of the present invention. The recording medium of the present invention can be realized by modifying a file system.

<Outline of BD-ROM>

Figure 2:
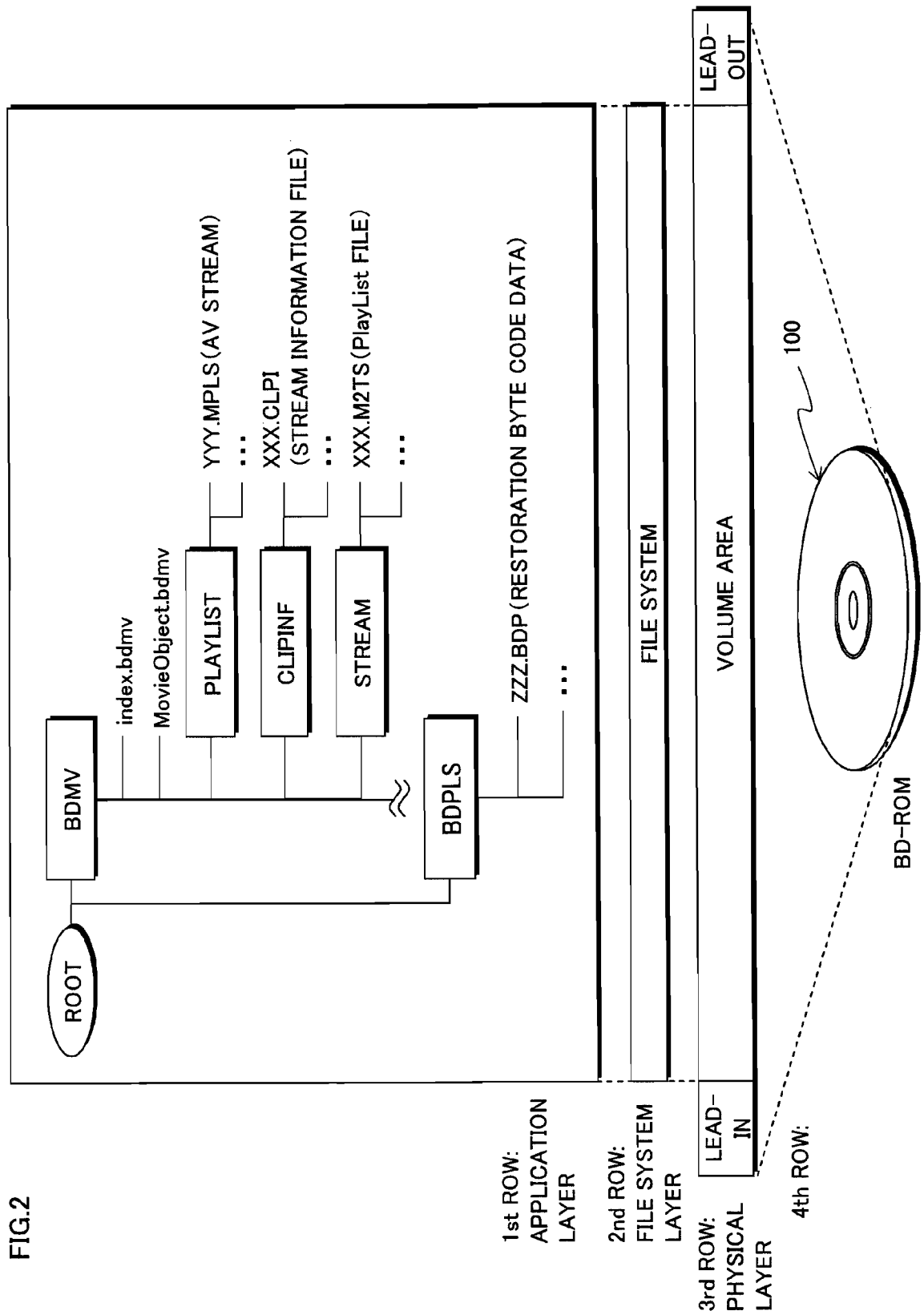
FIG. 2 shows an internal structure of a BD-ROM.

FIG. 2 shows a structure of the BD-ROM. The fourth row in the figure shows the BD-ROM 100, while the third row shows a track on the BD-ROM. In the figure, the track is stretched out horizontally, although in reality it spirals from the inner periphery to the outer periphery of the BD-ROM 100. The BD-ROM 100, like other optical discs such as DVDs and CDs, has a recording area formed spirally from the inner periphery to the outer periphery therein, and has, between the lead-in of the inner periphery and the lead-out of the outer periphery, a logical address space capable of recording logical data. Additionally, inside the lead-in, there is a special area called BCA (Burst Cutting Area) which can be read only by drives. Being unreadable by applications, this area is often used for copyright protection technology.

In the logical address space, volume information of a file system is recorded from the beginning thereof, and subsequently, application data such as video data is recorded. The file system is a structure which represents data on a disc in units of directories or files, and in the BD-ROM 100, UDF (UniversalDisc Format) is used. PCs (Personal Computers) for everyday use also use a file system called FAT or NTFS and present, on computer, data stored in a hard disc in a structure of directories and files, thereby increasing usability. The use of file system enables the ED-ROM 100 to read logical data, which is stored in the same manner as in a general purpose PC, using the directory and file structure.

With use of the directory and file structure, the application layer format (application format) of the BD-ROM 100 is presented as the first row of the figure. According to the directory and file structure of the BD-ROM 100, there is a BDMV directory directly under the root directory (ROOT). The BDMV directory records data processed by the BD-ROM 100, such as AV contents and management information. Under the BDMV directory, there are IndexFile (index.bdmv), a Movie Object file (MovieObject.bdmv), a PLAYLIST directory, a CLIPINF directory, and a STREAM directory. The IndexFile defines an IndexTable constituting Titles, and the Movie Object file defines a dynamic scenario. The STREAM directory, CLIPINF directory, and PLAYLIST directory include AV streams (XXX.M2TS) storing AV contents such as video and audio which are multiplexed, stream information files (XXX.CLPI) storing management information of the AV streams, and PlayList files (YYY.MPLS) defining logical playback paths of the AV streams, respectively.

Directly under the root directory (ROOT), there is also a BDPLS directory which records restoration byte code data (ZZZ.BDP). In a BD-ROM including the BDPLS directory, an AV stream is partially transformed at the TS packet level in advance. The restoration byte code data is an execution program, and when executed, generates restoration parameters to restore the transformed AV stream. Prior to playing back the AV stream, the playback apparatus generates restoration parameters by executing the restoration byte code data, restores the transformed AV stream using the generated restoration parameters, and plays back the restored AV stream.

It should be noted that these directory names and file names are defined for the purpose of explaining the present embodiment, and accordingly, different names can be applied when put to practical use.

In the following, description is given on the data structure of each file under the BDMV directory.

<Structure of BD-ROM (1) IndexFile>

Figure 3:
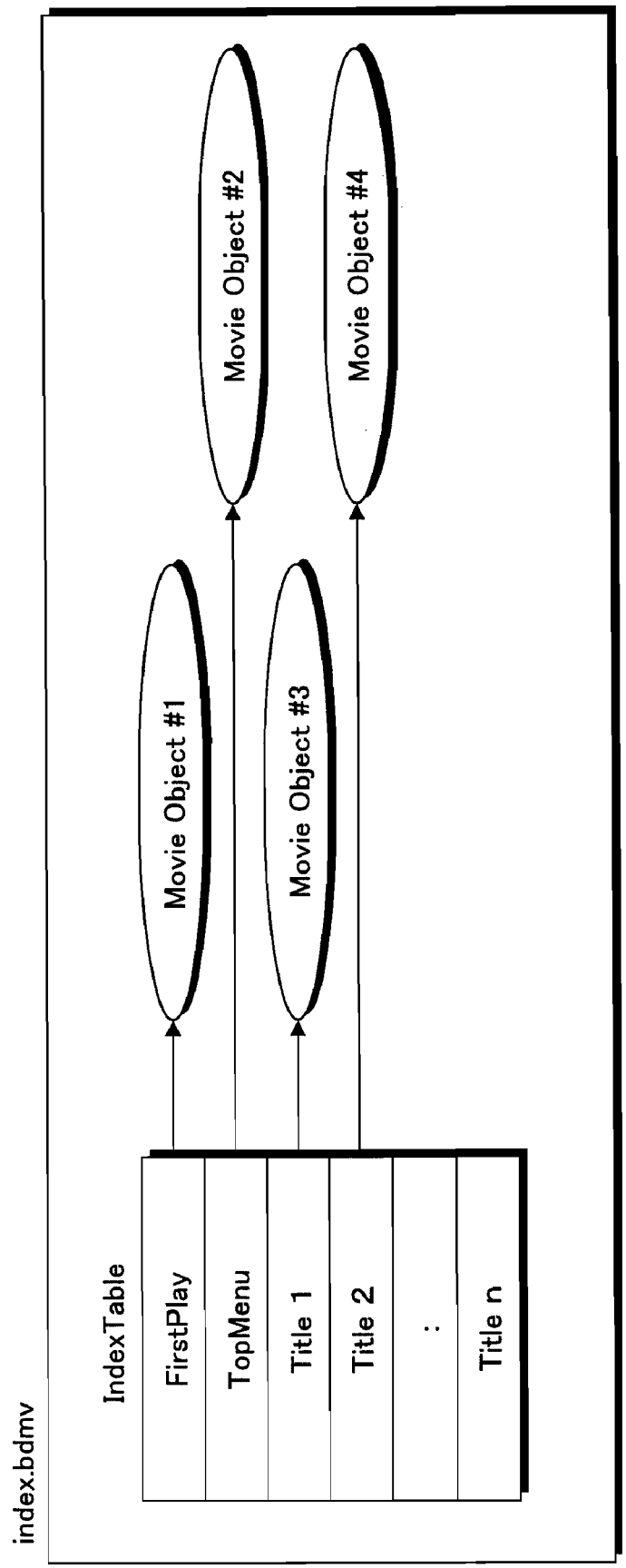
FIG. 3 shows an internal structure of IndexFile.

First, the IndexFile (Index.bdmv) is described. The IndexFile includes IndexTable shown in FIG. 3. The IndexTable is a table of the highest layer and defines the title structure of all the Titles, TopMenu, FirstPlay and the like stored in the BD-ROM. This table specifies Movie Objects included in the Movie Object file which are first executed by all the Titles, TopMenu, and FirstPlay. Each time a Title or a Menu is invoked, the playback apparatus of the ED-ROM refers to the IndexTable and executes a predetermined Movie Object. Here, the FirstPlay is set by a content provider and has been set to a Movie Object that is automatically executed when the disc is inserted. The TopMenu specifies a Movie Object invoked when a command such as "return to menu" is executed by user operation of the remote controller.

<Structure of BD-ROM (2) Movie Object File>

Next, the Movie Object file (MovieObject.bdmv) is described.

Figure 4:
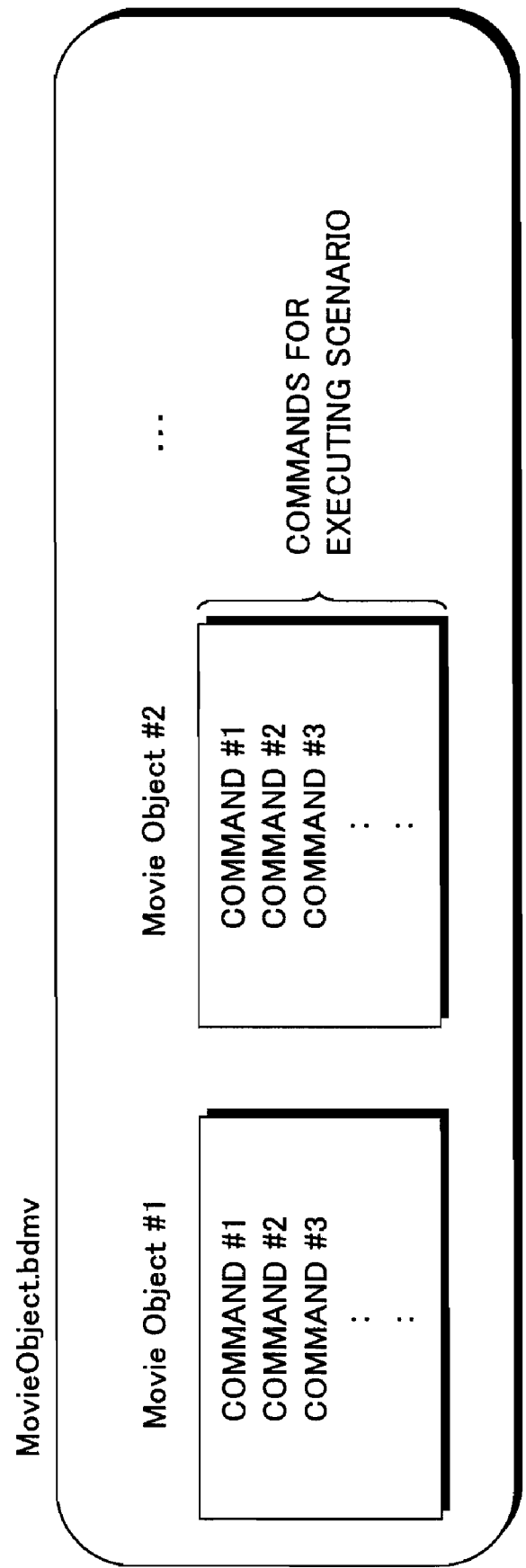
FIG. 4 shows an internal structure of a Movie Object file.

As shown in FIG. 4, multiple Movie Objects are defined in the Movie Object file, and each Movie Object is identified by a Movie Object ID. Each Movie Object includes one or more navigation commands instructing a playback of a PlayList, transition to another Movie Object or Title, and the like, and the playback apparatus sequentially executes the string of navigation commands. For example, when "PlayPL#N" is described, the playback apparatus selects a file name of a PlayList corresponding to "PlayPL#N" from the PlayList directory and plays back the selected PlayList. Also, for example, when "JumpObject#N" is described, the playback apparatus selects the corresponding Movie Object from the Movie Object file and executes the selected Movie Object.

Next, the AV stream file (XXX.M2TS) and stream information file (XXX.CLPI) are described.

<Structure of BD-ROM (3) AV Stream>

The AV stream is a digital stream of MPEG-2 transport stream format.

Figure 5:
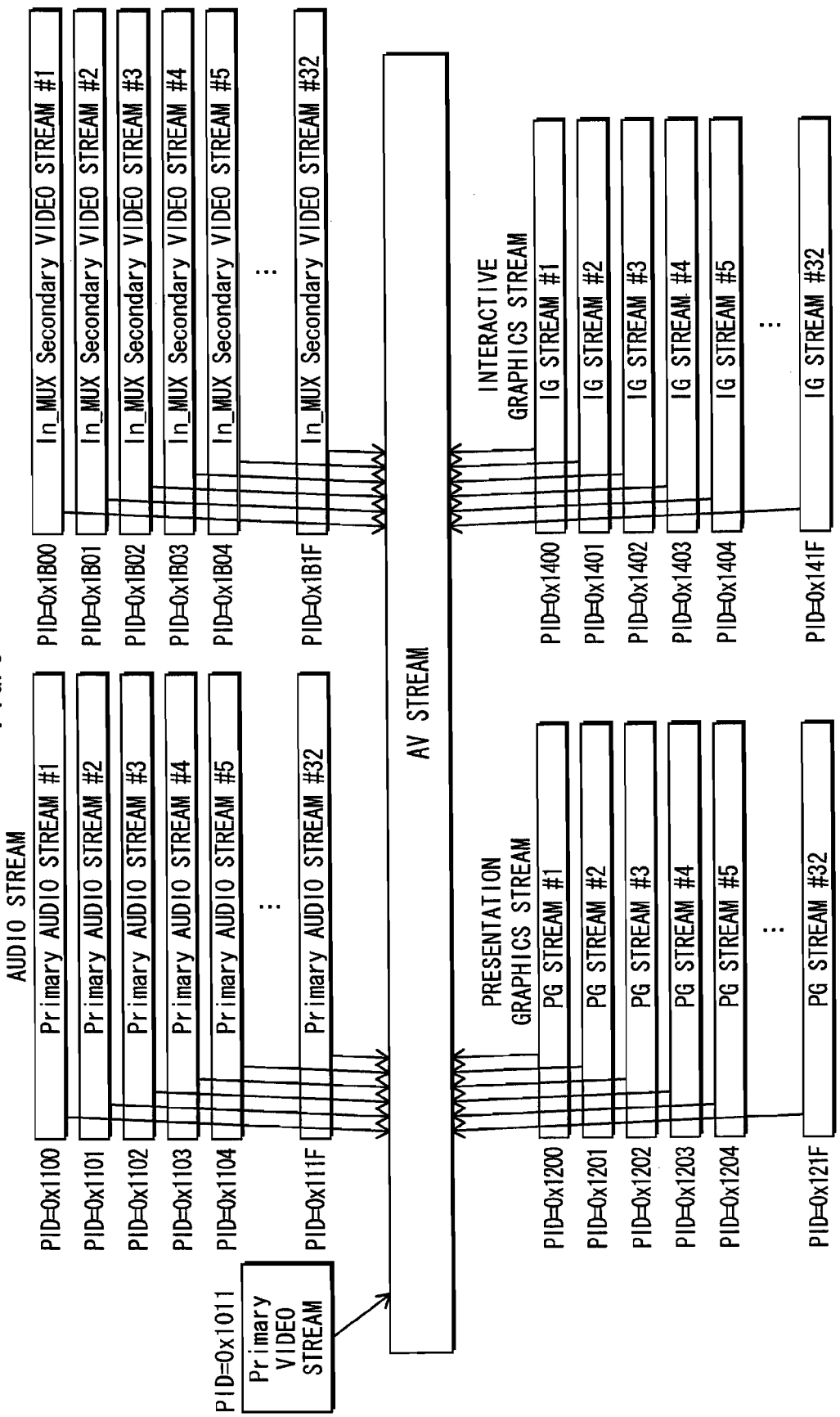
FIG. 5 shows a structure of an AV stream.
Figure 6:
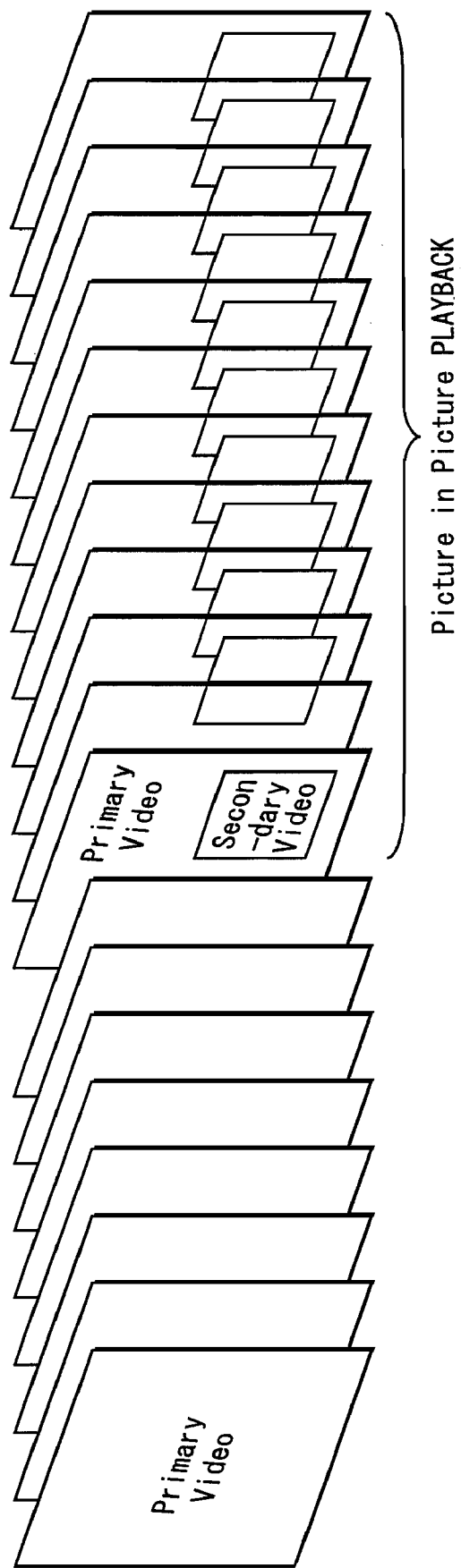
FIG. 6 shows an example of Picture in Picture.

FIG. 5 shows a structure of the AV stream. As shown in FIG. 5, the AV stream is obtained by multiplexing one or more among video streams, audio streams, presentation graphics streams, and interactive graphics streams. The video stream indicates a primary video or a secondary video of a motion picture, the audio stream indicates audio part of a motion picture, and the presentation graphics stream indicates subtitles of a motion picture. Here, when the AV stream stores Picture-in-Picture video, as shown in FIG. 6, the primary video constitutes ordinary video displayed in a screen, while the secondary video constitutes a small screen within the primary video. If the AV stream is of three-dimensional images, the primary video is for right-eye image, and the secondary video is for left-eye image. The interactive graphics stream indicates a dialogue screen created by placing GUI parts on a screen. Each stream included in the AV stream is identified by PID. For example, a video stream used for the primary video of a motion picture is allocated 0x1011, an audio stream is allocated 0x1100 to 0x111F, a presentation graphics stream is allocated 0x1200 to 0x121F, an interactive graphics stream is allocated 0x1400 to 0x141F, and a video stream used for the secondary video of a motion picture is allocated 0x1B00 to 0x1B1F.

Figure 7:
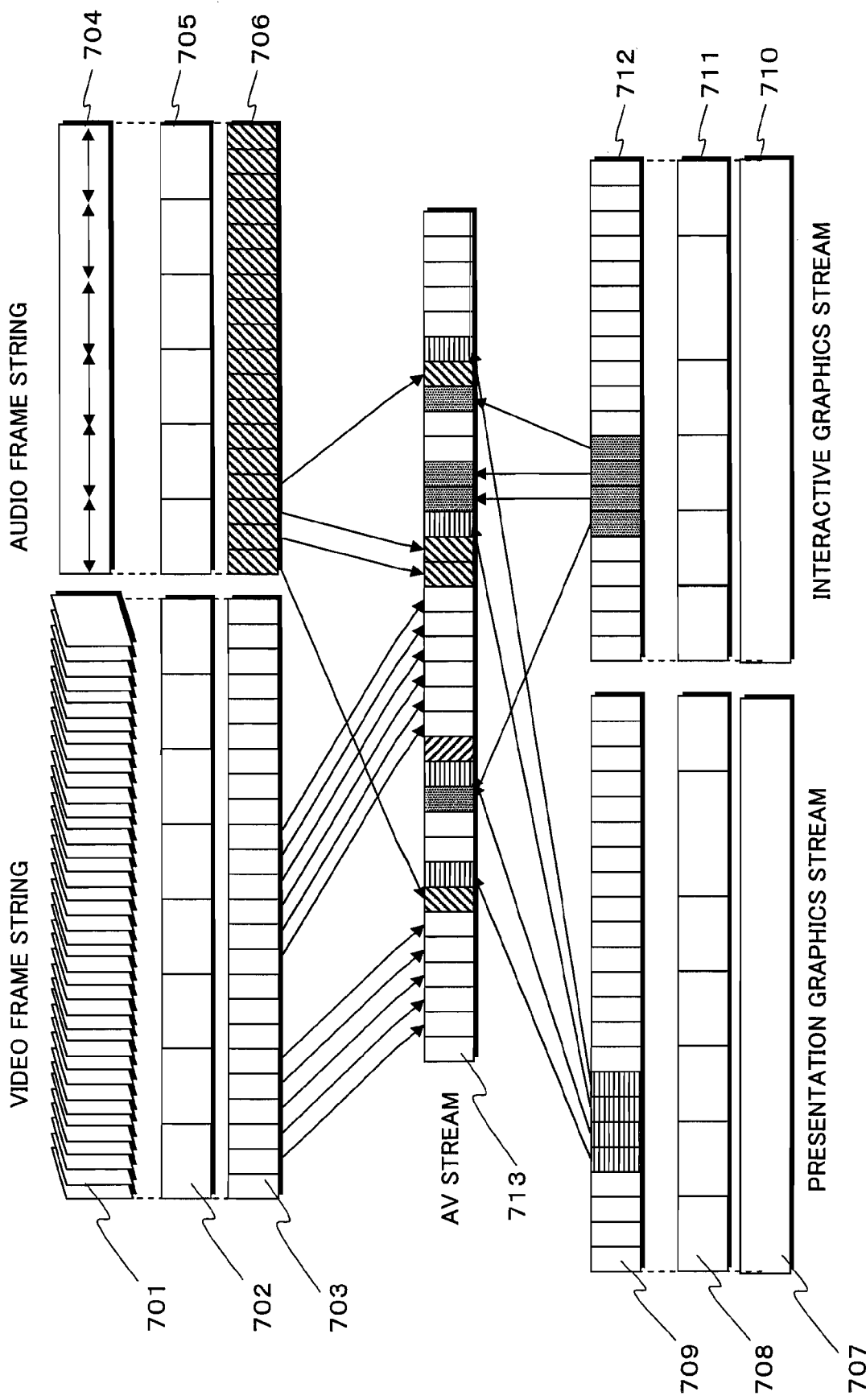
FIG. 7 schematically shows how streams are multiplexed into an AV stream.

FIG. 7 is a schematic diagram showing how the AV stream is multiplexed. First, a video stream 701 composed of multiple video frames, and an audio stream 704 composed of multiple audio frames are converted to PES packet strings 702 and 705, respectively, and further converted to TS packets 703 and 706, respectively. Similarly, data of a presentation graphics stream 707 and of an interactive graphics 710 are converted to PES packet strings 708 and 711, respectively, and further converted to TS packets 709 and 712, respectively. An AV stream 713 is formed by multiplexing these TS packets into one stream.

Figure 8:
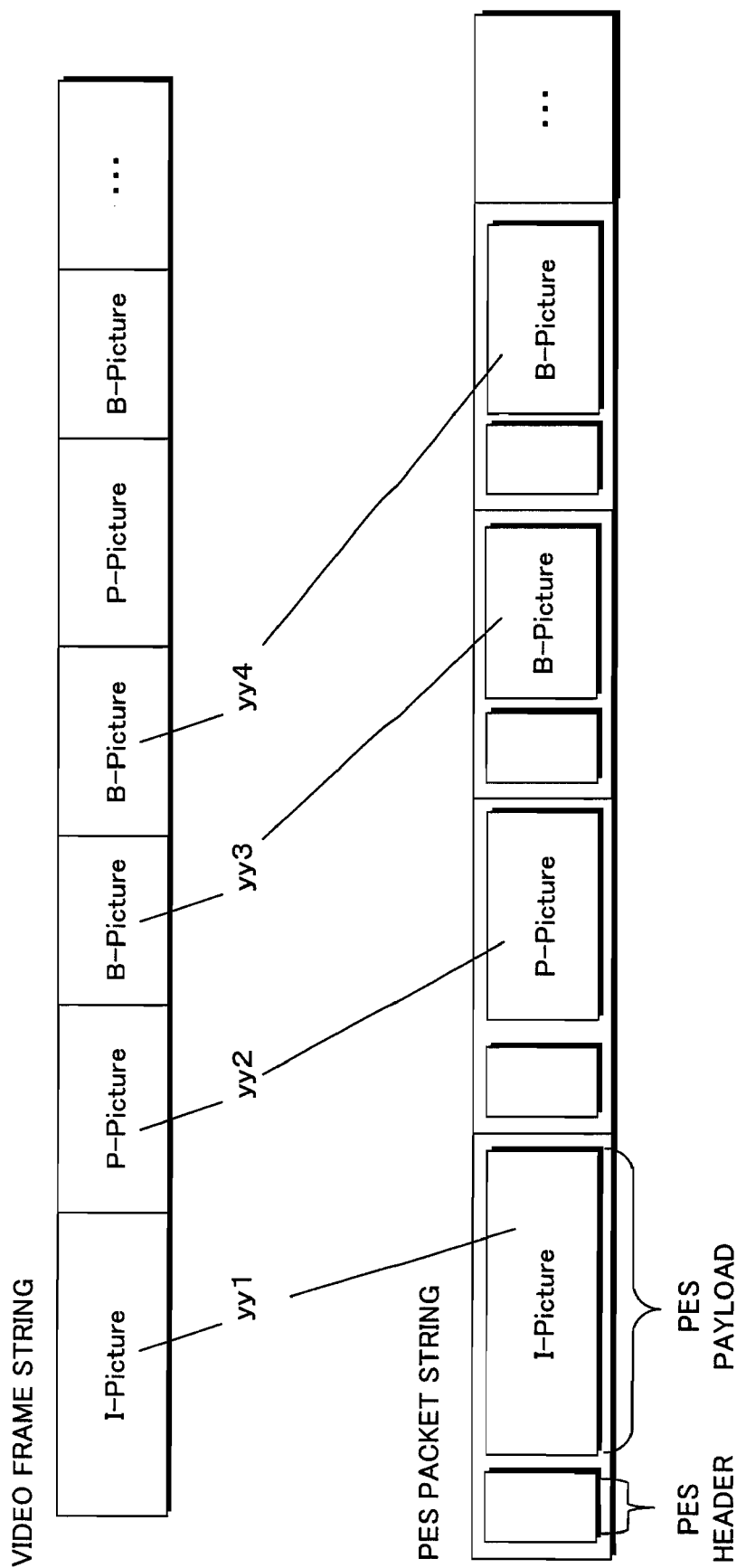
FIG. 8 shows further details on how a video stream and an audio stream are stored into a PES packet string.

FIG. 8 gives further details on how a video stream is stored into an PES packet string. The first row of the figure indicates the video frame string of the video stream. The second row indicates the PES packet string. As shown by arrows yy1, yy2, yy3, and yy4 in the figure, I-pictures, B-pictures, and P-pictures which are multiple Video Presentation Units in the video stream are divided into units of pictures and stored into payloads of PES packets separately. Each PES packet has a PES header storing therein PTS (Presentation Time-Stamp) which is a presentation time of the picture, DTS (Decoding Time-Stamp) which is a decoding time of the picture, and the like.

Figure 9:
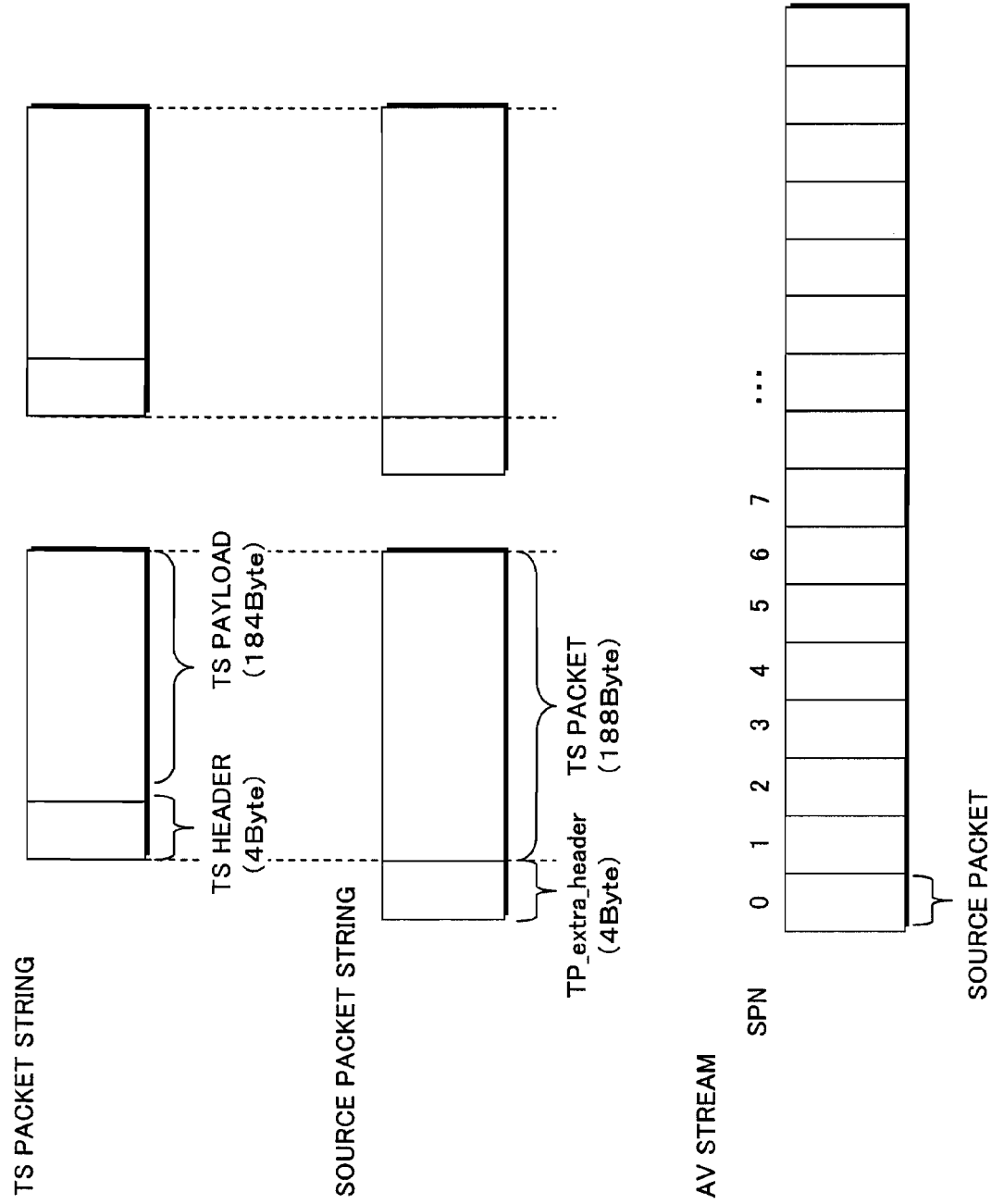
FIG. 9 shows a structure of a TS packet and a source packet in an AV stream.

FIG. 9 shows the final format used for TS packets to be written into an AV stream. Each TS packet is a fixed-length packet composed of a 4-byte TS header and a 184-byte TS payload. The TS header includes information such as PID identifying a stream, and the TS payload stores data. Each PES packet is divided and stored into TS payloads. In a BD-ROM, each TS packet has a 4-byte TP_Extra_Header attached thereto and accordingly, is written into an AV stream as a 192-byte source packet. The TP_Extra_Header includes information such as ATS (Arrival_Time_Stamp). ATS shows the transfer starting time of the TS packet to a PID filter. Source packets are arranged in the AV stream as shown in the lower level of FIG. 8, and the number which is incremented from the beginning of the AV stream is called SPN (Source Packet Number).

Furthermore, in addition to the streams for video, audio, subtitles, and the like, TS packets in an AV stream include PAT (Program Association Table), PMT (Program Map Table), PCR (Program Clock Reference) and the like. PAT indicates the PID of the PMT used in the AV stream, and the PID of the PAT itself is registered as "0". PMT includes (i) PIDs of streams such as for video, audio, subtitles and others, (ii) attribute information corresponding to each PID, and (iii) descriptors related to the AV stream. The descriptors include such as copy control information which instructs copying of the AV stream to be permitted or rejected. In order to synchronize ATC (Arrival Time Clock) which is the time-axis of ATS, with STC (System Time Clock) which is the time-axis of PTS and DTS, PCR has information on STC time corresponding to ATS at which the PCR packet is transferred to a decoder.

Figure 10:
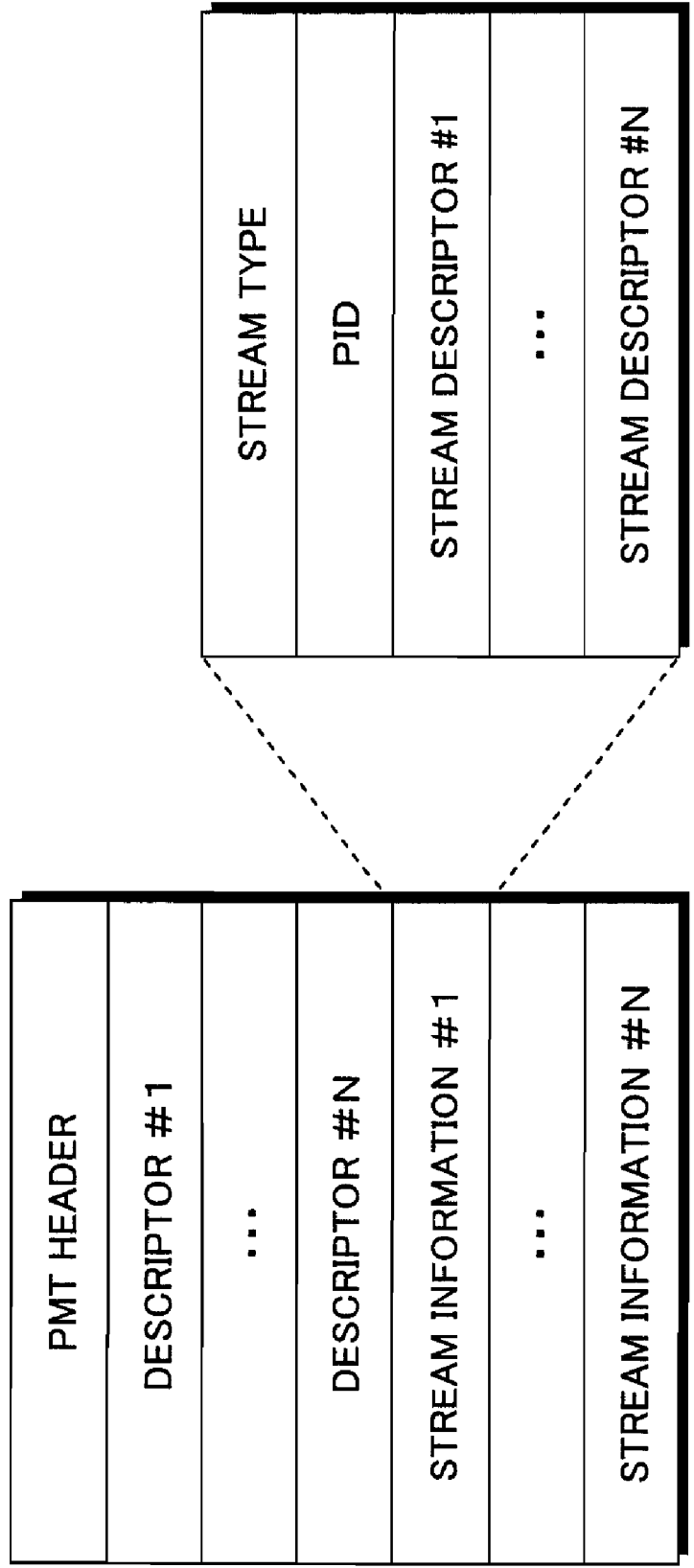
FIG. 10 shows a data structure of PMT.

FIG. 10 shows details of the data structure of PMT. At the beginning of PMT, a PMT header describing the length of data included in PMT is arranged. Subsequent to that, multiple descriptors regarding the AV stream are arranged. The descriptors describe such as the above-mentioned copy control information. In addition, with respect to the AV stream of the present embodiment, transformation is performed at the TS packet level using a transformation method described later, and a restoration descriptor used for restoring the transformation is described as a descriptor of PMT.

After the descriptors, multiple pieces of stream information regarding the streams included in the AV stream are arranged. Each piece of stream information includes a stream type for identifying compression codec or the like of the stream, PID of the stream, and stream descriptors describing attribute information of the stream (frame rate, aspect ratio, etc.). The number of the stream descriptors is equivalent to the number of the streams included in the AV stream.

<Structure of BD-ROM (4) Stream Information File>

Next, description is given on the stream information file.

Figure 11:
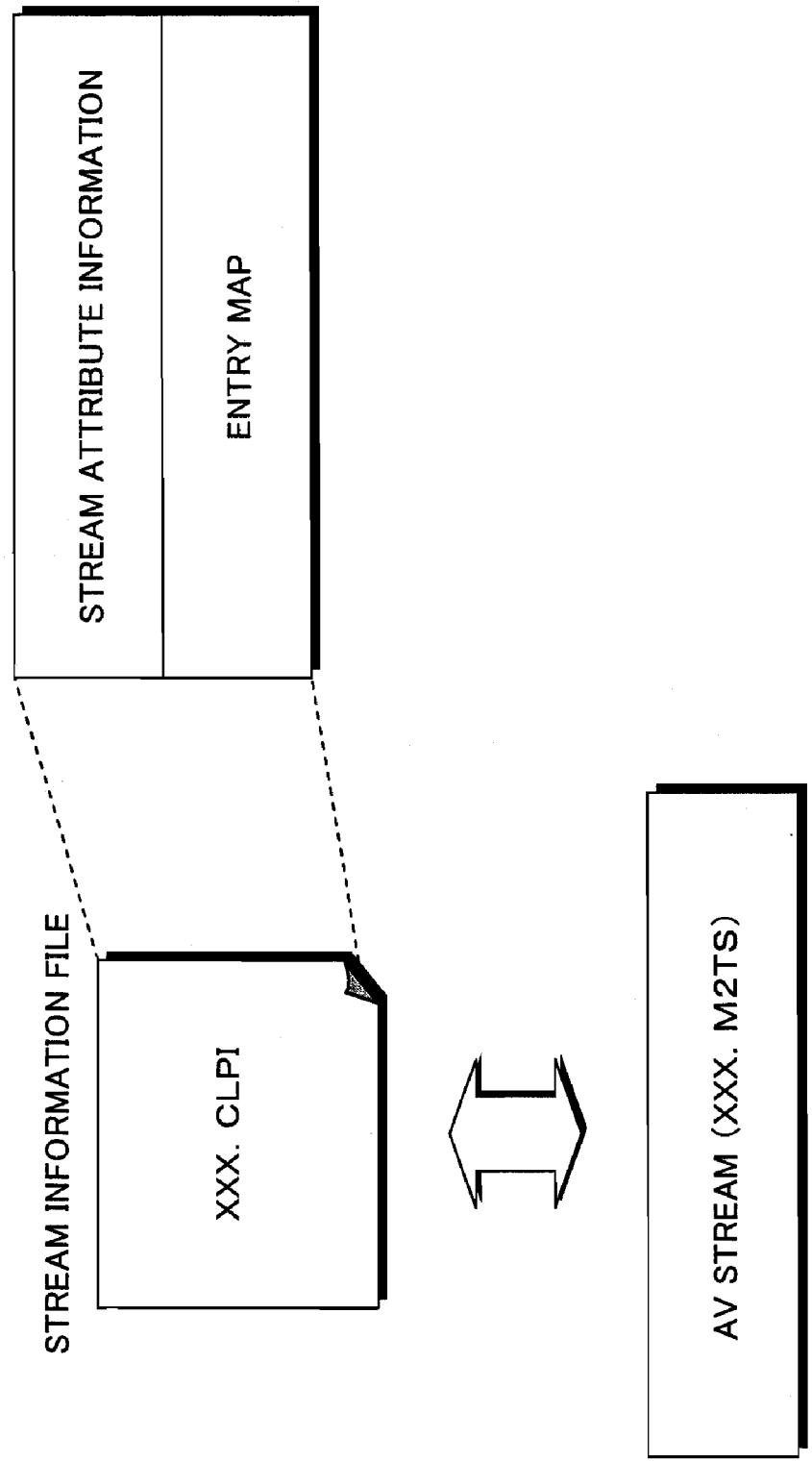
FIG. 11 shows an internal structure of a stream information file.

The stream information file, which is management information of an AV stream, as shown in FIG. 11, corresponds one-to-one with an AV stream, and includes stream attribute information and entry maps.

Figure 12:
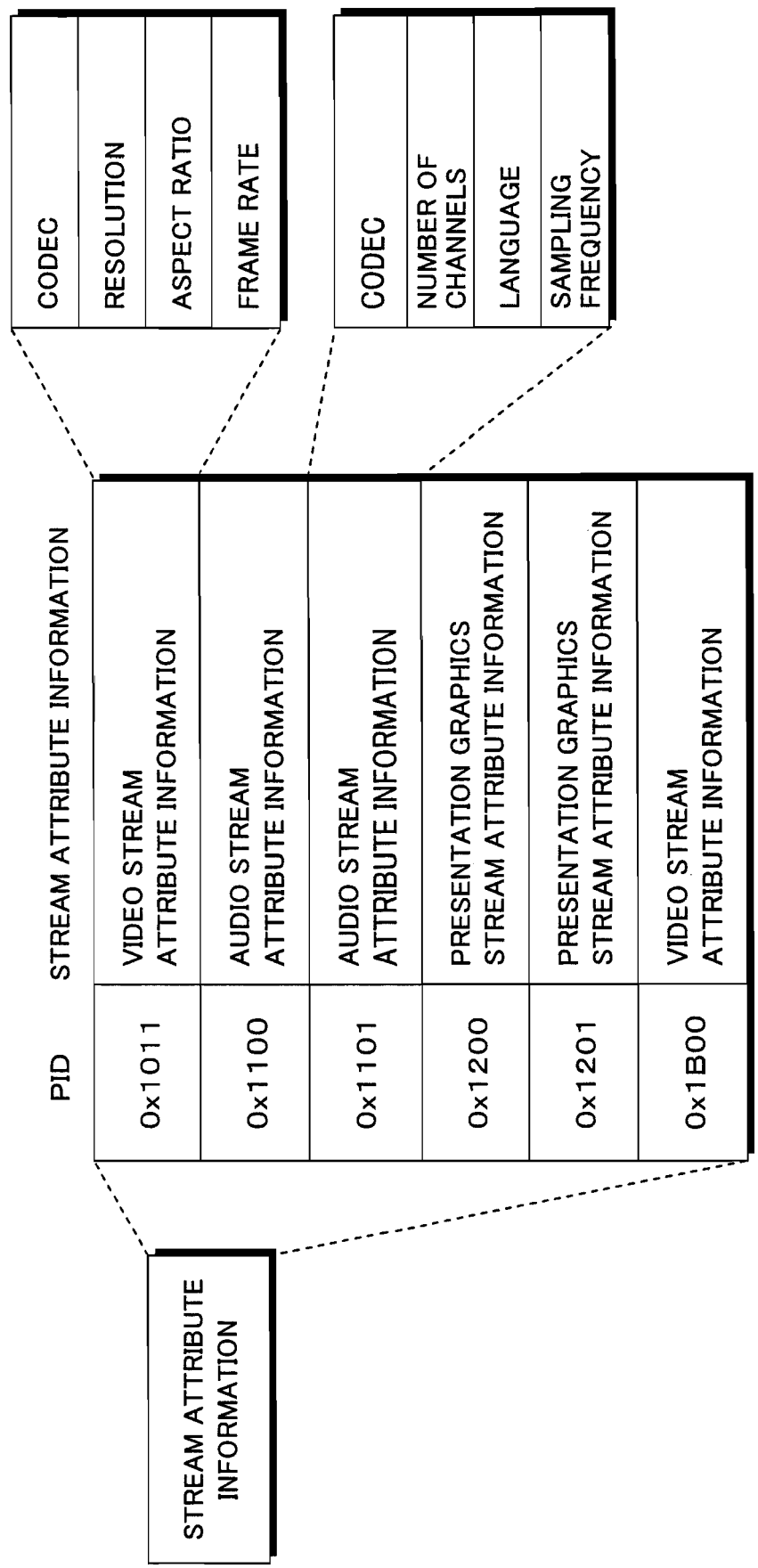
FIG. 12 shows an internal structure of stream attribute information.

The stream attribute information, as shown in FIG. 12, includes pieces of attribute information which correspond one-to-one to the streams included in the AV stream and which are registered for each PID. The video stream, audio stream, presentation graphics stream, and interactive graphics stream each have its own attribute information. The video stream attribute information includes information on what kind of compression codec is used to compress the video stream, what the resolution of each picture data constituting the video stream is, what the aspect ratio is, what the frame rate is, and the like. The audio stream attribute information includes information on what kind of compression codec is used to compress the audio stream, how many channels the audio stream has, to which languages the audio stream corresponds, how many sampling frequencies there are, and the like. These information are used for initialization of the decoder and the like before the playback apparatus performs a playback.

Figure 13:
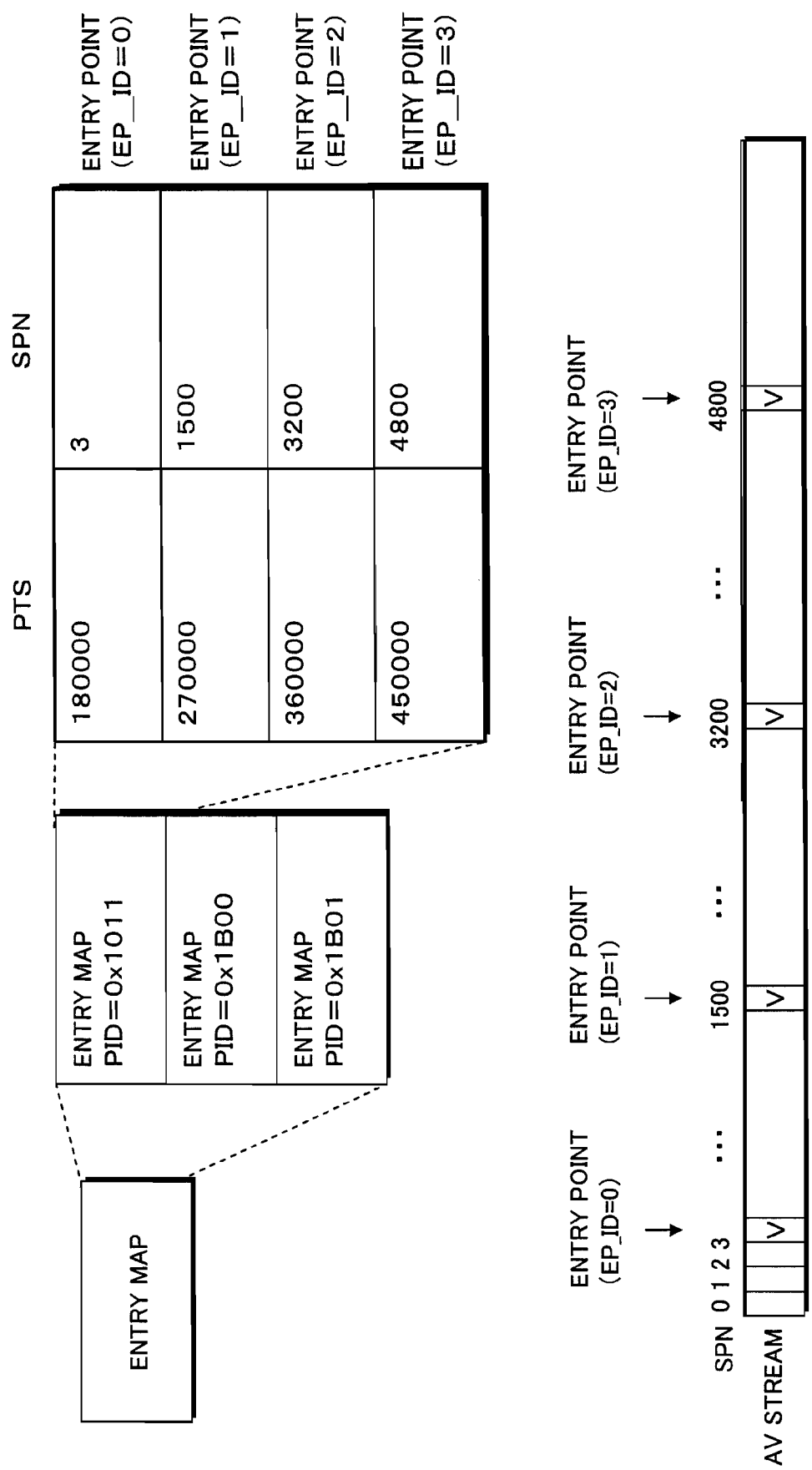
FIG. 13 shows an internal structure of an entry map.

The entry map, as shown in FIG. 13, is table information which describes PTS indicating presentation time of each intra-frame encoded image (hereinafter, referred to as "I-picture") in a video stream included in the AV stream, and SPN of the AV stream at which each I-picture starts.

In the present embodiment, information composed of a set of PTS and SPN indicated in one row of the table is called "entry point", and a group of TS packets storing an I-picture indicated by an entry point is called "entry unit". In addition, a value which starts with "0" and is incremented by one at each entry point is called "entry point ID" (hereinafter, referred to as "EP_ID"). By using this entry map, the playback apparatus is able to specify, in the AV stream, file positions which correspond one-to-one with arbitrary positions on the time-axis of the video stream. For example, when performing special playback such as fast-forward/rewind, the playback apparatus is able to perform processing efficiently without analyzing the AV stream by specifying I-pictures registered in the entry map and selectively playing back the specified I-pictures. The entry map is created for each video stream multiplexed into the AV stream, and is managed by PID.

<Structure of BD-ROM (5) PlayList File>

Next, the PlayList file (YYY.MPLS) is described.

Figure 14:
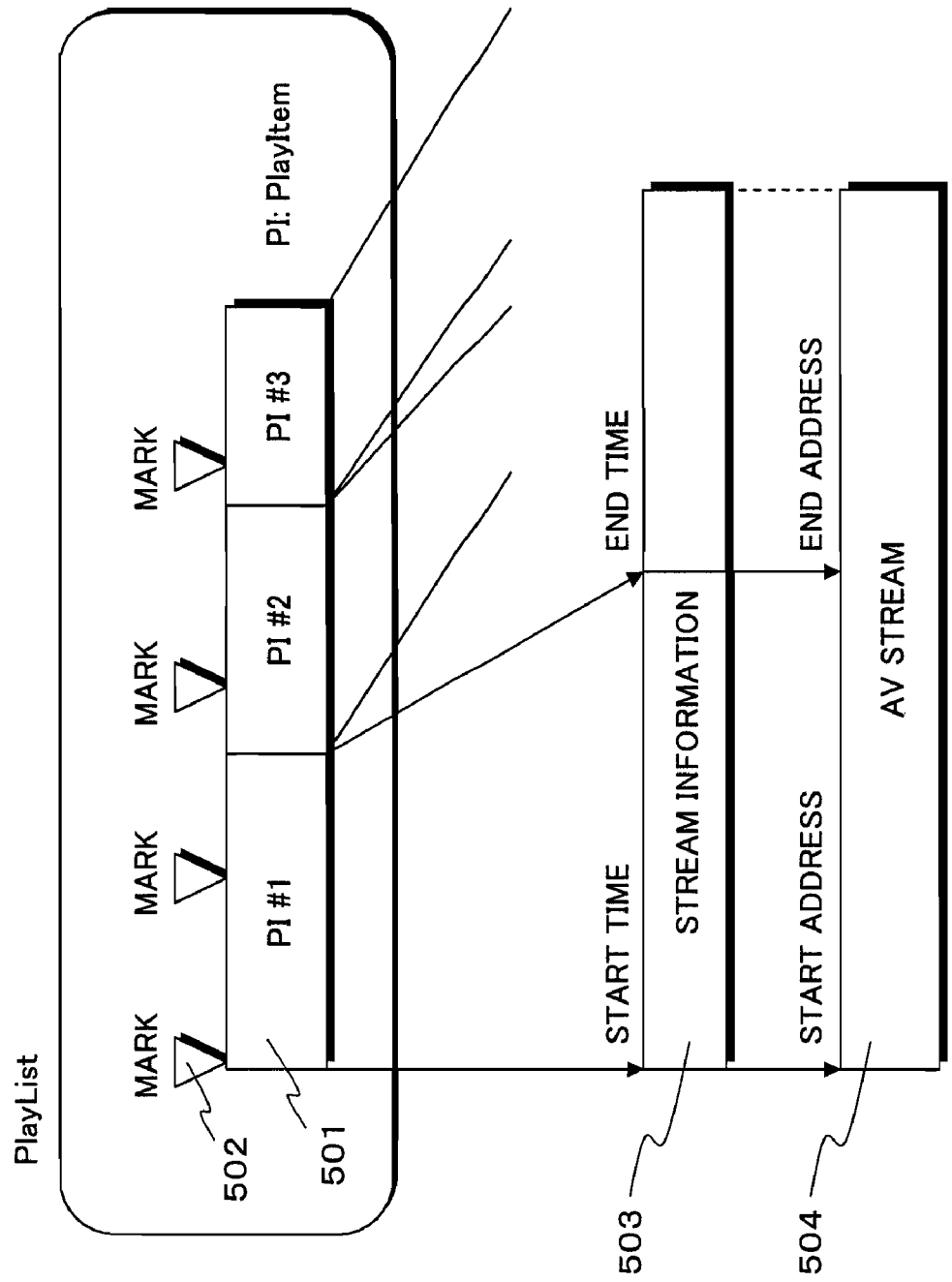
FIG. 14 shows an internal structure of a PlayList.

A PlayList indicates a playback path of an AV stream. As shown in FIG. 14, a PlayList includes one or more PlayItems 501, and each PlayItem indicates a playback section with respect to the AV stream. Each PlayItem 501 is identified by a PlayItem ID and is described in order of playback within the PlayList. The PlayList includes entry marks 502 each indicates a playback start point. Each entry mark 502 can be assigned in a playback section defined by a PlayItem, and as shown in FIG. 14, is assigned to a position which can be a playback start point with respect to the PlayItem and is used for a playback from a specified time. For example, a motion picture Title can be played back in units of chapters by assigning the entry marks 502 to positions where chapters start.

Figure 15:
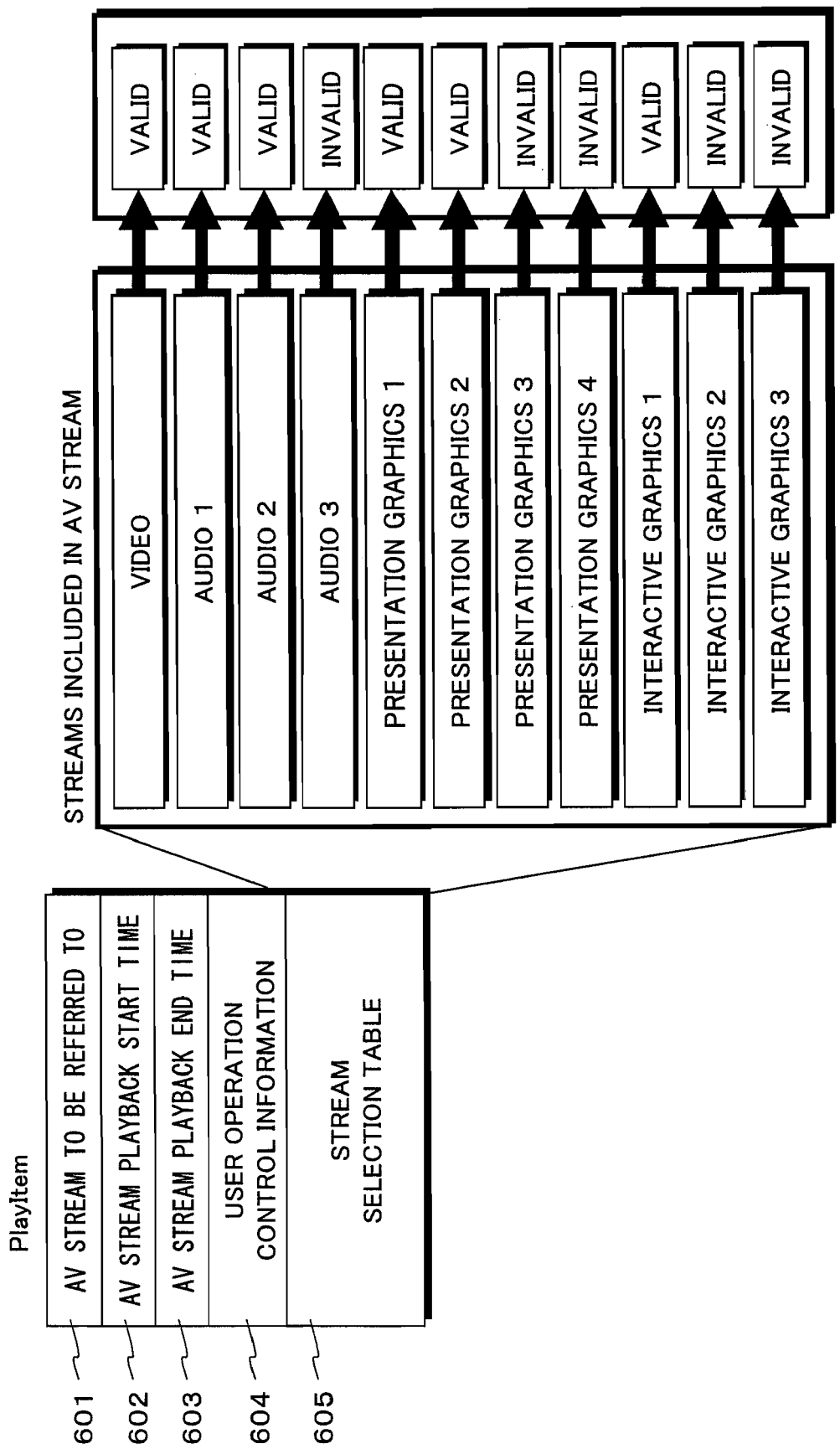
FIG. 15 shows an internal structure of a PlayItem.

Content of a PlayItem is described with reference to FIG. 15. The PlayItem includes information on stream information to be referred to 601, a playback start time 602, a playback end time 603, and a stream selection table 605. Since the playback start time and playback end time are time information, the playback apparatus performs playback processing after (a) obtaining SPN corresponding to the specified playback start time and SPN corresponding to the specified playback end time by referring to the entry map of the stream information file and (b) specifying the read start position.

The stream selection table 605 is a table indicating whether each stream multiplexed into the AV stream to be referred to is valid or invalid when playing the PlayItem. Specifically, according to the example shown in FIG. 15, the AV stream includes one video stream, three audio streams, four presentation graphics streams, and three interactive graphics streams. According to the stream selection table 605, among these streams, video, audio 1, audio 2, presentation graphics 1, presentation graphics 2, and interactive graphics 1 are valid. Accordingly, in this PlayItem, the above-mentioned valid elementary streams are playable, while the other elementary streams are not allowed to play. The stream selection table 605 also stores attribute information of each stream. Here, the attribute information is information indicating characteristics of each stream. For example, audio, presentation graphics, and interactive graphics include language attribute and the like.

<Structure of BD-ROM (6) Restoration Byte Code Data>

Next, description is given on restoration byte code data under the BDPLS directory, and the transformation method and data structure, of the AV stream, required to implement copyright protection using the restoration byte code data.

Described below are the transformation method and data structure of the AV stream.

Figure 16:
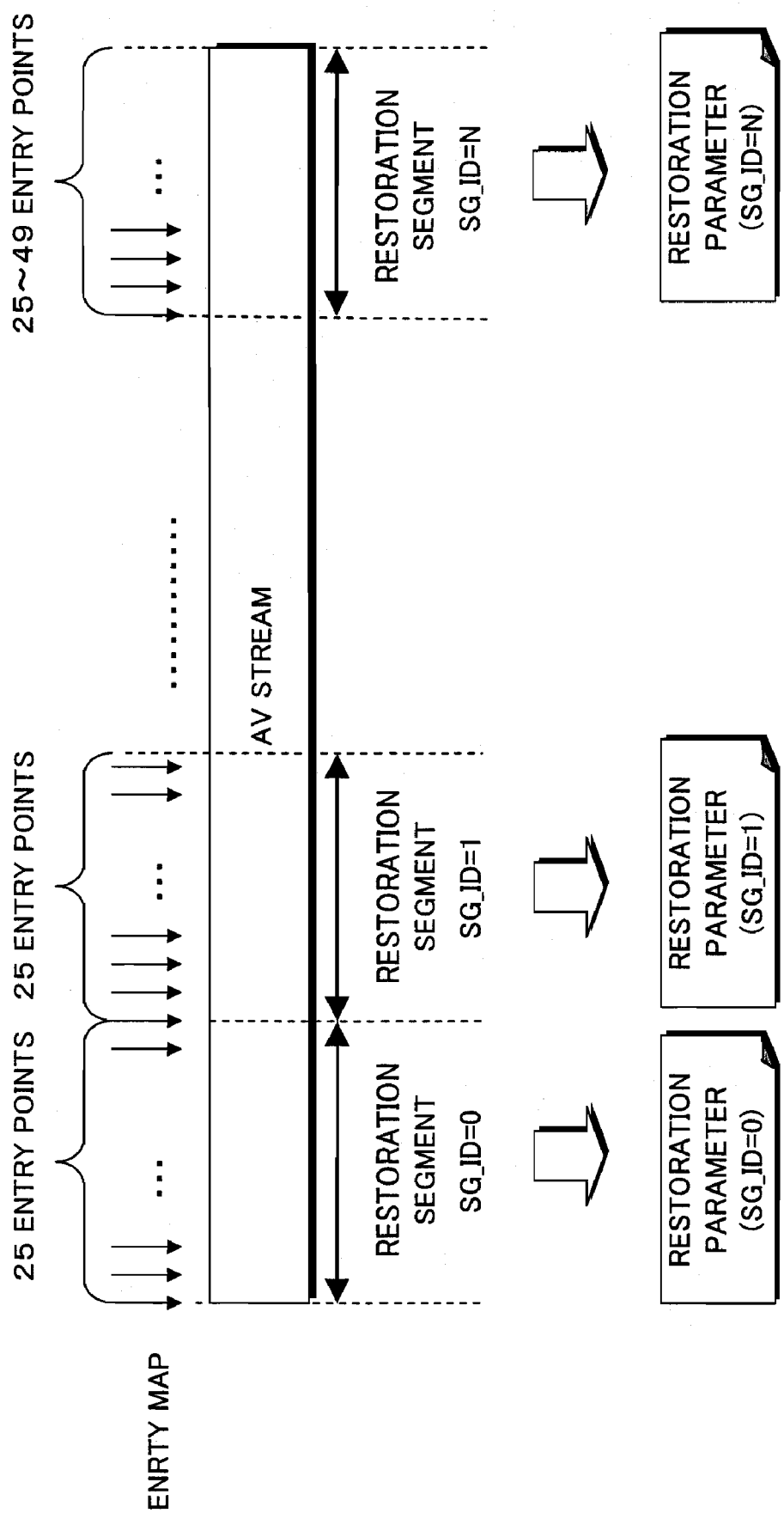
FIG. 16 shows relationship between restoration segments and restoration parameters with respect to an AV stream.

First, the restoration segment and restoration parameter are described. As shown in FIG. 16, the AV stream is divided into multiple restoration segments based on the entry map. Every 25 entry points from the beginning, the AV stream is divided to a restoration segment. However, it should be noted that the final restoration segment includes between 25 to 49 entry points so as not to be of less than 25 entry points. A restoration segment ID (SG_ID) starts from "0" at the beginning of the restoration segment, and is incremented by one. A restoration parameter which is a byte string having a constant length is defined for each restoration segment. When transformed data in the AV stream is to be restored, the restoration parameter defined by the restoration segment to which the transformed data belongs is used.

Figure 17:
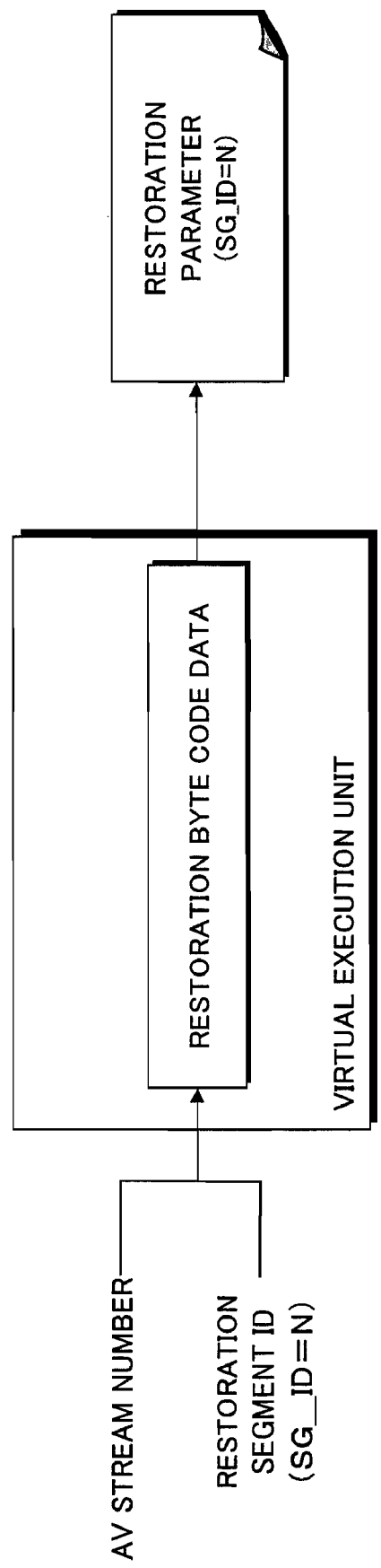
FIG. 17 shows a function of restoration byte code data.

Next, the restoration byte code data is described with reference to FIG. 17. The restoration byte code data is a program code executable by a virtual operation means such as JAVA, and, when executed given the number of the AV stream and restoration segment ID, generates a restoration parameter corresponding thereto. The restoration byte code data can be arbitrarily created by a content provider. Accordingly, for example, the content provider is requested to make efforts such as, with use of a key on the BD-ROM disc or in the playback apparatus, allowing only the playback apparatus having the correct key to generate the restoration parameter, thereby preventing an illegal playback apparatus from performing playback, or obfuscating program codes to prevent the program itself from being illegally analyzed.

<Details of Transformation Method of AV Streams>

The transformation method of an AV stream is described in detail in the following.

Figure 18:
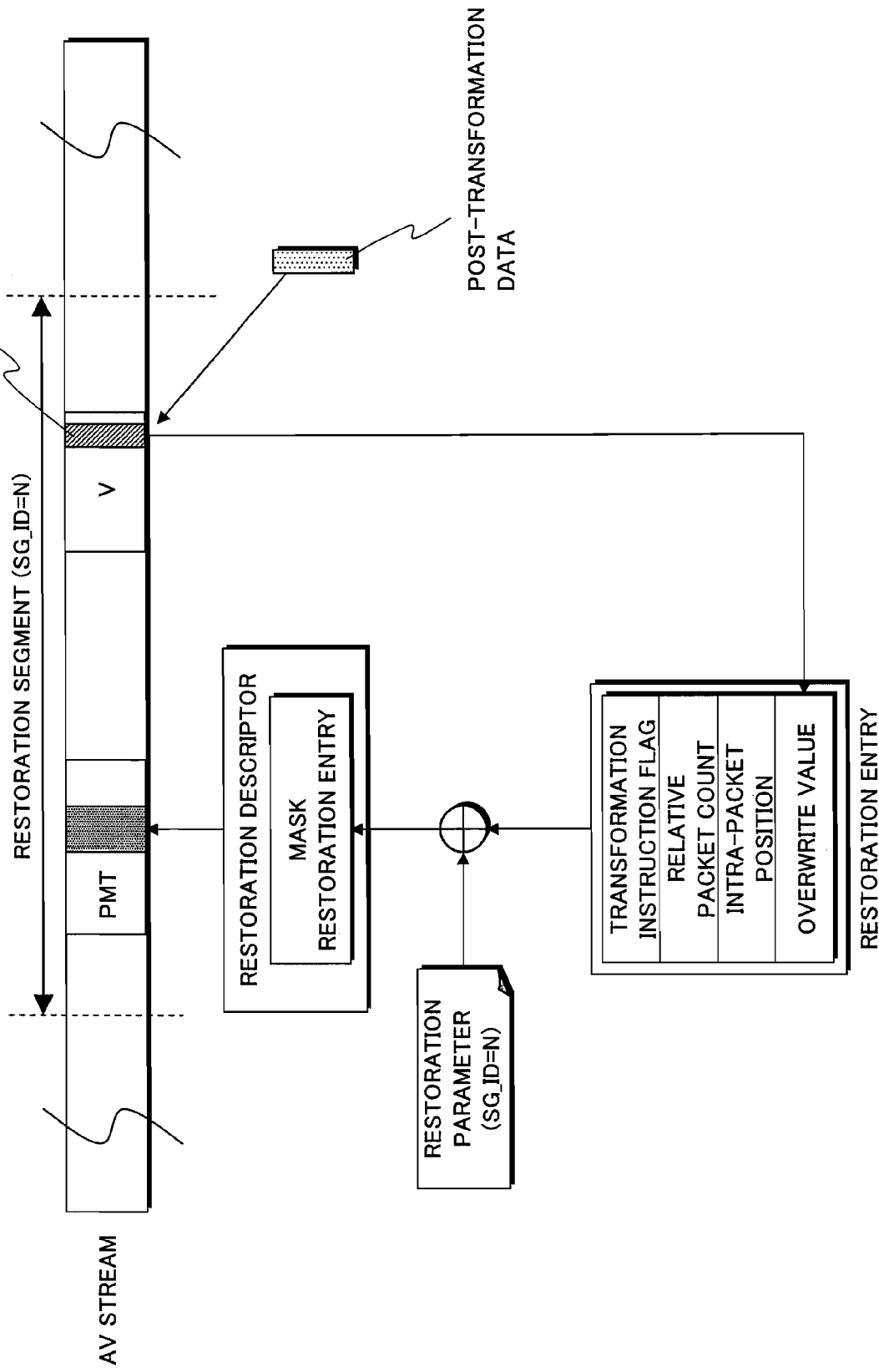
FIG. 18 shows a structure of a restoration entry with respect to transformed data in an AV stream and how the restoration entry, as a restoration descriptor, is stored into the AV stream.

FIG. 18 shows how an AV stream is transformed. The AV stream is transformed by steps of selecting pre-transformation data, creating a restoration entry, recording a restoration descriptor into PMT, and overwriting the pre-transformation data with post-transformation data.

The pre-transformation data indicates original data before part of a video stream, audio stream and the like which are multiplexed into the AV stream is transformed. The pre-transformation data which is of a constant length can be selected at an arbitrary position in the payload of a TS packet. Further, in the present embodiment, some of the TS packets are protected as untransformable packets, and the pre-transformation data cannot be selected from the untransformable packets.

The restoration entry is created using the pre-transformation data. The restoration entry includes the following fields: a transformation instruction flag, a relative packet count, an intra-packet position, and an overwrite value. The overwrite value is set to the pre-transformation data. The intra-packet position describes a byte offset from the beginning of the source packet V including the pre-transformation data. The relative packet count contains the number of packets from the source packet V of PMT which exists prior to the pre-transformation data to the source packet including the pre-transformation data. The transformation instruction flag contains at least either "restoration not required" or "restoration required". When transformation processing has been performed with respect to data included in the AV stream, "restoration required" is contained. For each restoration entry which is created as mentioned above, a mask restoration entry is created by performing an XOR operation on the restoration entry and the restoration parameter corresponding to the restoration segment including the pre-transformation data. It should be noted that while masking is performed by an XOR operation here, other invertible logical operations or encryption processing can be used instead.

The mask restoration entry is included in a restoration descriptor which is recorded in PMT as the descriptor thereof. Here, the restoration descriptor is registered as the first descriptor of PMT so as to enable the playback apparatus to perform analysis processing of PMT efficiently.

Finally, the position of the pre-transformation data in the AV stream is overwritten by the post-transformation data such as a random value.

Even in a case where the transformation processing has not been performed in one or more of the restoration segments of the data of the AV stream, a restoration entry is created with the transformation instruction flag set to "restoration not required", and a restoration descriptor is created by masking the created restoration entry with the restoration parameter and is recorded in PMT. It should be noted that while a piece of pre-transformation data is stored in one restoration entry here, multiple pieces of pre-transformation data can be stored in one restoration entry. With this structure, the number of PMT can be reduced with respect to the pre-transformation data.

<Untransformable Ranges in Primary Video Stream>

Next, description is given on untransformable ranges in a video stream included in the AV stream, in which the TS packets are not allowed to be transformed. First, description is given with respect to the primary video stream.

Figure 19:
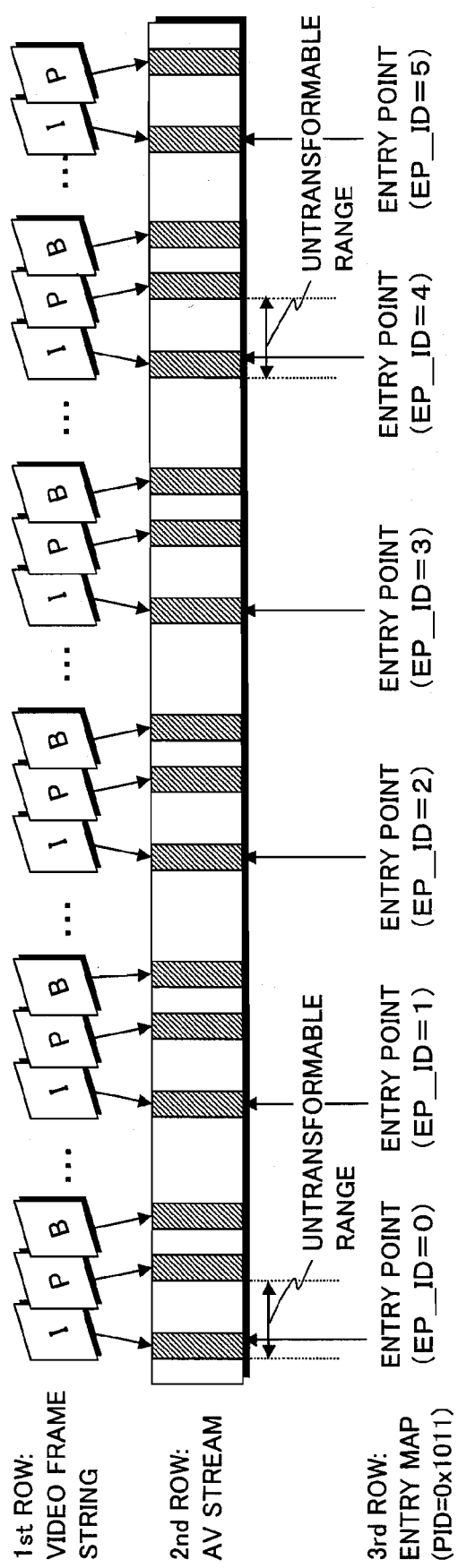
FIG. 19 shows untransformable ranges which are not allowed to be transformed, in a video stream included in an AV stream.

FIG. 19 shows, in a primary video stream included in the AV stream, the untransformable ranges not allowed to be transformed. The first row of FIG. 19 indicates the data structure of the pictures in the primary video stream, and the second row of FIG. 19 indicates the TS packets storing the AV stream. Arrows indicate positions of the source packets containing the beginning of the pictures (shaded areas in the second row). The third row of FIG. 19 indicates an entry map corresponding to the primary video stream, and each entry point indicates the first packet among the TS packets storing an I-picture. Here, each I-picture indicated by an entry point whose EP_ID is a multiple of four is rendered untransformable, and each entry unit, in the AV stream, composed of the TS packets storing the I-picture becomes an untransformable range. The example in FIG. 19 shows that the I-pictures indicated by the first entry point (EP_ID=0) and the fourth entry point (EP_ID=4) counting from the first entry point are untransformable. If, for example, the AV stream in FIG. 19 further continues, the I-pictures indicated by the entry points such as EP_ID=8, EP_ID=12, EP_ID=16 . . . are untransformable. Here, the I-pictures indicated by the entry points whose EP_ID is a multiple of four are untransformable.

Thus, by cyclically rendering part of the TS packets untransformable so as to ensure that the part is not transformed, the playback apparatus which plays back the recording medium of the present embodiment is able to specify I-pictures which are not transformed, in a video stream in the entry map. Consequently, the playback apparatus can perform, by selecting and playing the untransformed I-pictures, special playback such as fast-forward/rewind without executing restoration processing which causes a load on the apparatus playback.

<Untransformable Ranges in Secondary Video Stream>

Next, description is given on untransformable ranges in the secondary video stream.

Figure 20:
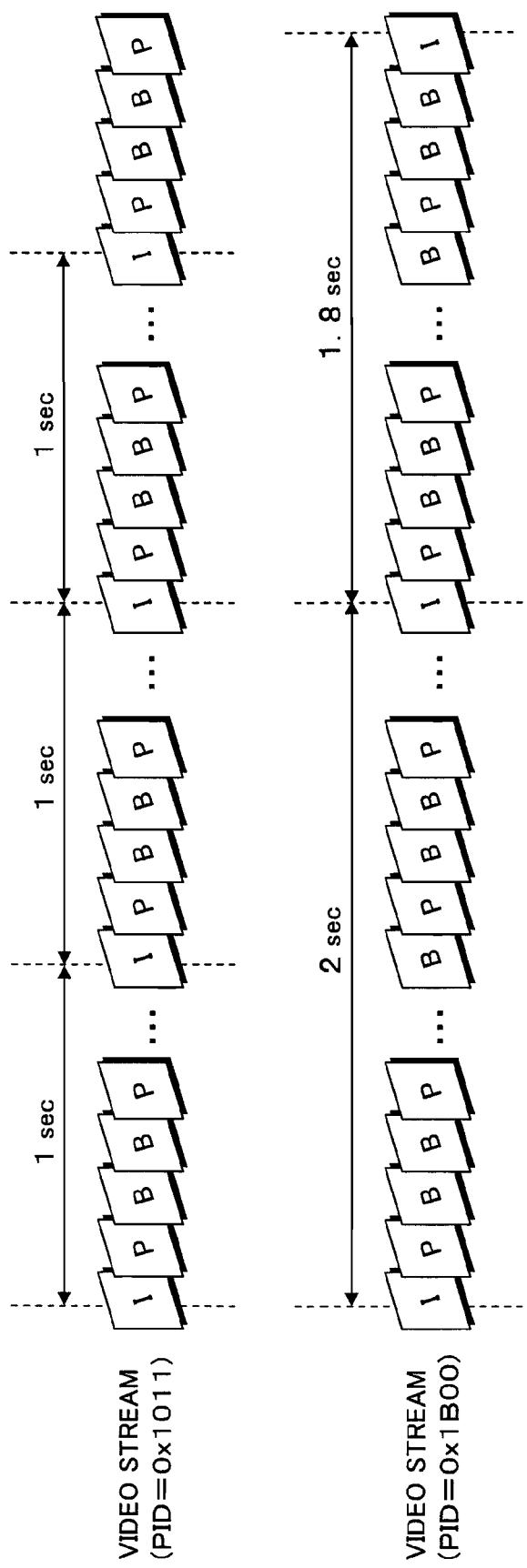
FIG. 20 shows video frame strings in video streams included in an AV stream.

FIG. 20 shows video frame strings of video streams included in the AV stream. The upper row of FIG. 20 shows a video frame string of a video stream which is a primary video and has PID of 0x1011, while the lower row of FIG. 20 shows a video frame string of a video stream which is the secondary video and has PID of 0x1B00. As shown in FIG. 20, intervals between an I-picture and the next I-picture may differ between the primary video and the secondary video. Here, if it is assumed that I-pictures indicated by the entry points whose EP_ID is a multiple of four are untransformable for the entry maps of both the primary video and secondary video, then when the playback apparatus plays back the I-pictures indicated by the entry points whose EP_ID is a multiple of four, for both the primary video and secondary video, while performing special playback such as fast-forward/rewind, it may result in playing pictures whose PTSs are considerably distant between the primary video and the secondary video in terms of time.

Figure 21:
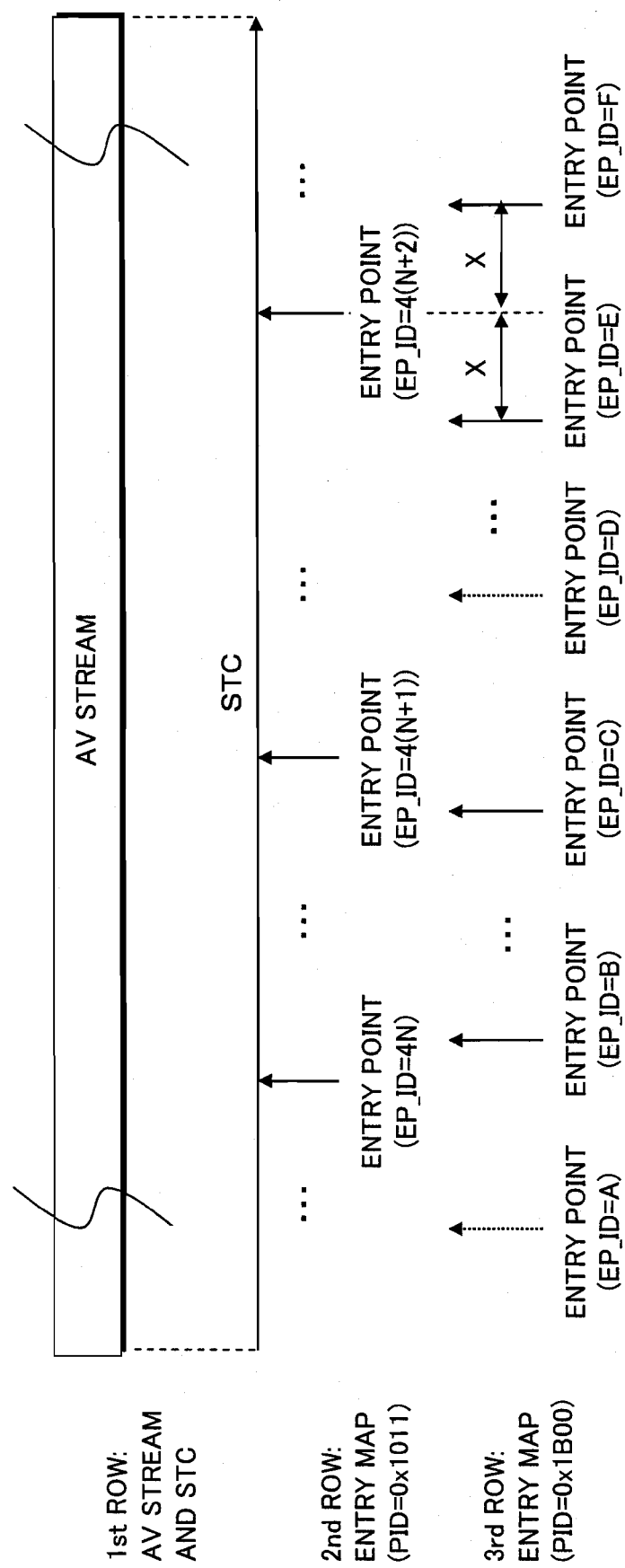
FIG. 21 shows PTS positions of entry points of a primary video and a secondary video with respect to STC which is a playback time axis of the AV stream, and entry points indicating untransformable I-pictures in the entry map of the secondary video.

Thus, entry points indicating untransformable I-pictures in the entry map of the secondary video are determined as shown in FIG. 21. FIG. 21 shows PTS positions of entry points with respect to STC which is a playback time axis of the AV stream. Arrows shown in the second row of FIG. 21 indicate PTS positions of entry points of the primary video having PID of 0x1011. EP_ID of each of these entry points is a multiple of four, and the I-pictures indicated by these entry points are untransformable. Arrows shown in the third row of FIG. 21 indicate PTS positions of entry points of the secondary video having PID of 0x1B00. Here, with respect to each PTS position of an entry point whose PID is 0x1011 and EP_ID is a multiple of four, an I-picture indicated by, among the entry points having PID of 0x1B00, an entry point whose PTS is closest to the PTS position is rendered untransformable, and the entry unit storing this I-picture in the secondary stream is rendered untransformable. For example, among the entry points having PID of 0x1B00, an entry point having EP_ID of B is closest to the PTS of the entry point whose PID is 0x1011 and EP_ID is 4N. Accordingly, the I-picture indicated by this entry point is rendered untransformable. Similarly, among the entry points having PID of 0x1B00, the entry point having EP_ID of C is closest to the PTS of the entry point whose PID is 0x1011 and EP_ID is 4(N+1). Accordingly, the I-picture indicated by this entry point is rendered untransformable. Furthermore, among the entry points having PID of 0x1B00, the entry point having EP_ID of E and the entry point having EP_ID of F are closest to the PTS of the entry point whose PID 0x1011 and EP_ID is 4(N+2). In this case, both I-pictures indicated by these two entry points are rendered untransformable.

Figure 22:
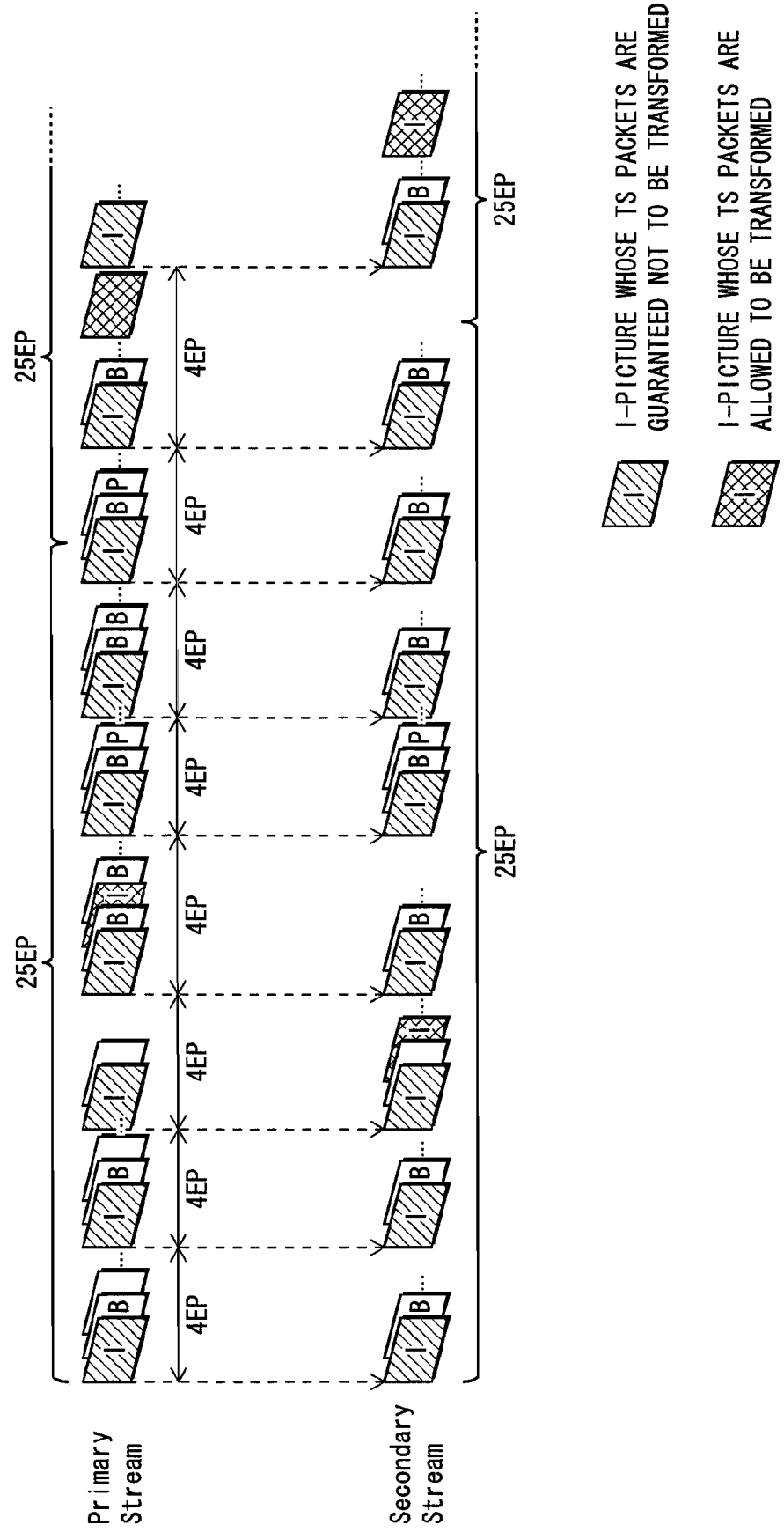
FIG. 22 shows relationship between untransformable TS packets of the primary video stream and secondary video stream, using frames constituting each video stream.

The I-pictures rendered untransformable are shaded pictures in the picture strings in the video streams shown in FIG. 22. With the AV stream having this data structure, when performing fast-forward/rewind of the primary and secondary videos, the playback apparatus can play I-pictures which are closest to each other in terms of presentation time, using the I-pictures rendered untransformable. This realizes the synchronized playback of the primary and secondary videos as a result. Here, if the AV stream recorded on the BD-ROM 100 is of three-dimensional images, where the primary video is for right-eye image and the secondary video is for left-eye image, the shaded I-pictures in the right-eye and left-eye images are closest to each other in terms of presentation time, that is to say, the right-eye and left-eye pictures constituting a three-dimensional frame. This enables natural three-dimensional playback when performing fast-forward/rewind playback using only these I-pictures.

It should be noted that in FIG. 21, a modification can be made such that when the difference between PTS of an entry point of the primary video whose PID is 0x1011 and EP_ID is a multiple of four, and PTS of an entry point of the secondary video whose PID is 0x1B00 and which is closest to the aforementioned PTS is more than half of the maximum value of the interval of I-pictures set by the BD-ROM format, the I-picture indicated by the entry point having PID of 0x1B00 does not need to be rendered untransformable. As a result, when playing back an I-picture of an entry point whose PID is 0x1011 and EP_ID is a multiple of four, the playback apparatus is not required to play back a part unnecessarily further away to play back an untransformable I-picture of an entry point having PID of 0x1B00. This reduces the load on the playback apparatus.

Also, a modification can be made as in the following: in a case where there are two entry points, among the entry points of the secondary video having PID of 0x1B00, whose PTSs are equally closest to the PTS of an entry point of the primary video whose PID is 0x1011 and EP_ID is a multiple of four, the I-picture indicated by one of the two entry points with PTS which is positioned posterior to the other is rendered untransformable, and the I-picture indicated by the other which is positioned anterior is not rendered untransformable. For example, in FIG. 21, among the entry points having PID of 0x1B00, the entry point having EP_ID of E and the entry point having EP_ID of F are closest to the PTS of the entry point whose PID is 0x1011 and EP_ID is 4(N+2). In accordance with the modification, only the I-picture indicated by the posteriorly positioned entry point having EP_ID of F is rendered untransformable.

Up to this point, the data structure of the BD-ROM which is the recording medium of the present invention has been described.

<Conclusion>

As described above, according to the present invention, the following two aspects can be achieved: (i) copyright protection at the TS packets level is realized by transforming part of the AV stream; and (ii) because every fourth entry unit in the primary video stream and entry units, in the secondary video stream, each storing Presentation Time Stamp (PTS) closest to the every fourth entry unit in the primary video stream are ensured to be untransformed, by selectively using these untransformed entry units, it is not necessary to execute transform restoration processing when performing high-speed fast-forward/rewind playback, thereby preventing increase of processing load.

Here, in particular, the TS packets in the secondary video stream which are ensured to be untransformed constitute entry units closest, in terms of time, to the every fourth entry unit in the primary video stream. Accordingly, even selective use of the entry units constituted by these untransformed TS packets also enables fast-forward/rewind where the primary video stream and the secondary video stream are as closely synchronized as possible.

<Modifications>

The following describes modifications of the present embodiment, with respect to the selection of the I-pictures to be rendered untransformable in the secondary video.

Figure 23:
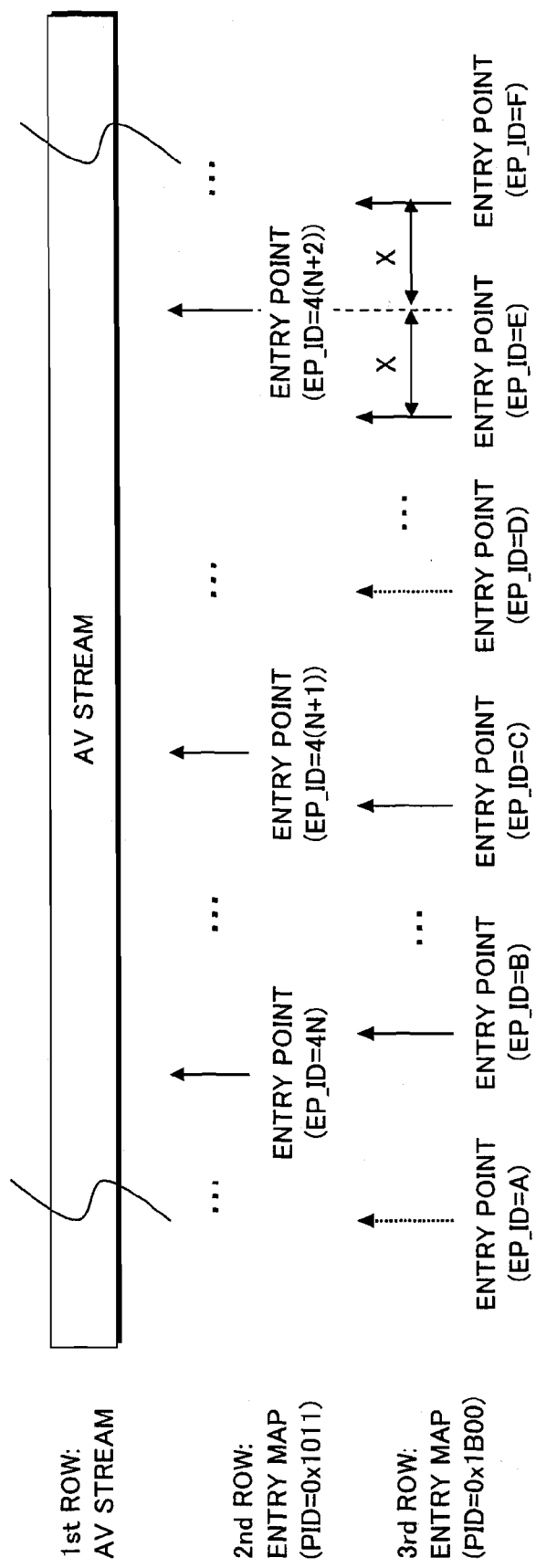
FIG. 23 shows SPN positions of the entry points of the primary video and secondary video with respect to file position of the AV stream, and entry points indicating untransformable I-pictures in the entry map of the secondary video in a first modification.

(1) It should be noted that the untransformable I-pictures in the secondary video may be determined as shown in FIG. 23. FIG. 23 shows SPN positions of entry points with respect to the AV stream file. Arrows shown in the second row of FIG. 23 indicate SPN positions of the entry points having PID of 0x1011. EP_ID of each of these entry points is a multiple of four, and the I-pictures indicated by these entry points are untransformable. Arrows shown in the third row of FIG. 23 indicate SPN positions of the entry points having PID of 0x1B00. Here, with respect to each SPN position of an entry point with EP_ID of a multiple of four, in the primary video stream having PID of 0x1011, an I-picture indicated by, among the entry points of the secondary video stream having PID of 0x1B00, an entry point whose SPN is closest to the SPN position is rendered untransformable.

For example, among the entry points having PID of 0x1B00, an entry point having EP_ID of B is closest to the SPN of the entry point whose PID is 0x1011 and EP_ID is 4N. Accordingly, the I-picture indicated by this entry point is rendered untransformable. Similarly, among the entry points having PID of 0x1B00, the entry point having EP_ID of C is closest to the SPN of the entry point whose PID is 0x1011 and EP_ID is 4(N+1). Accordingly, the I-picture indicated by this entry point is rendered untransformable. Furthermore, among the entry points whose PID is 0x1B00, the entry point having EP_ID of E and the entry point having EP_ID of F are closest to the SPN of the entry point whose PID is 0x1011 and EP_ID is 4(N+2). In this case, both I-pictures indicated by these two entry points are rendered untransformable.

In the present modification, untransformable I-pictures of the primary and secondary videos are stored at positions close to each other in the packet sequences of the AV stream. With the AV stream having this data structure, when performing fast-forward/rewind of the primary and secondary videos, the playback apparatus uses I-pictures which are close to each other in terms of storage position in the file for playback, thereby reducing the load of BD-ROM drive reading processing.

It should be noted that in FIG. 23, a modification can be made such that when the difference between (a) SPN of an entry point having EP_ID of a multiple of four, of the primary video stream having PID of 0x1011, and (b) SPN of, among entry points of the secondary video whose PID is 0x1B00, an entry point whose SPN is closest to the SPN pertaining to PID of 0x1011 is more than a size determined by (half the maximum temporal interval between I-pictures set by the BD-ROM format)*(bitrate size of the AV stream), the I-picture pertaining to PID of 0x1B00 does not need to be rendered untransformable. As a result, when playing an I-picture of the entry point having EP_ID of a multiple of four, of the primary video stream having PID of 0x1011, the playback apparatus is not required to play back a part unnecessarily further away to play back an untransformable I-picture of an entry point of the secondary video having PID of 0x1B00, thereby reducing the load on the playback apparatus.

Figure 24:
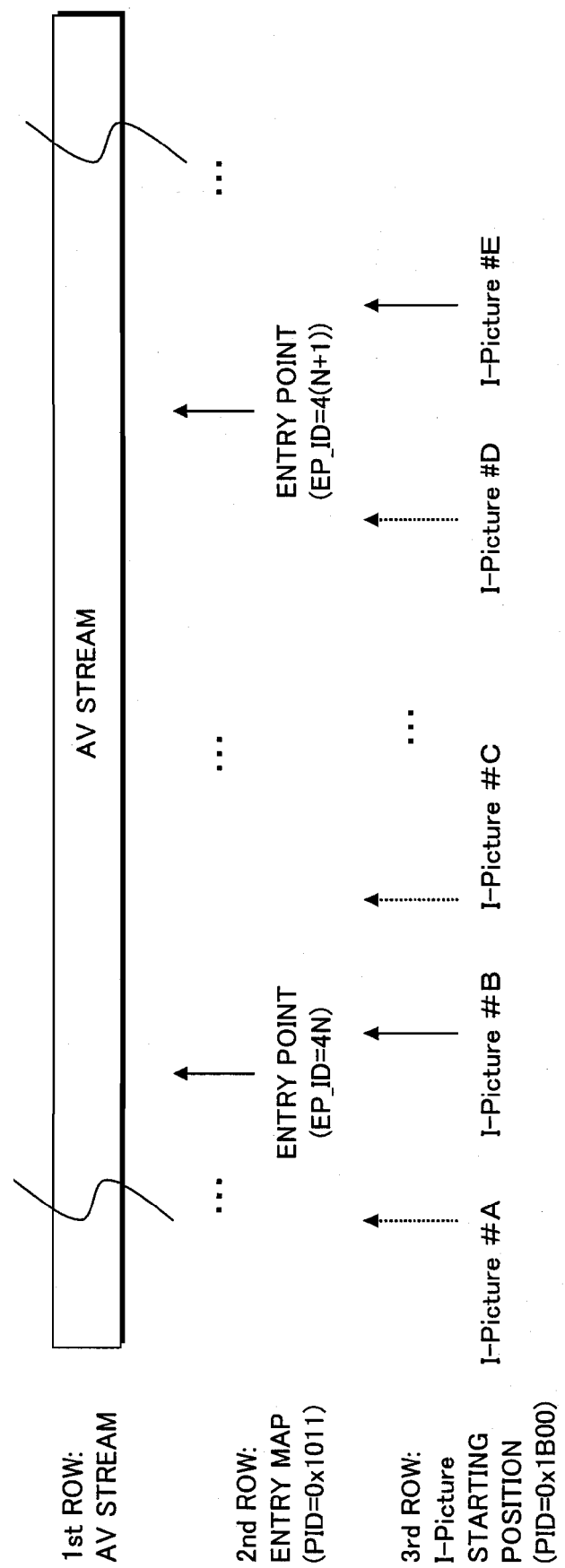
FIG. 24 shows SPN positions of entry points of the primary video with respect to the file position of the AV stream, and untransformable I-pictures of the secondary video in a second modification.

(2) As another modification, the untransformable I-pictures in the secondary video may be determined as shown in FIG. 24. FIG. 24 shows SPN positions of entry points with respect to the AV stream file. Arrows shown in the second row of FIG. 24 indicate SPN positions of the entry points having PID of 0x1011. EP_ID of each of these entry points is a multiple of four, and the I-pictures indicated by these entry points are untransformable. Arrows shown in the third row of FIG. 24 indicate SPN positions where beginnings of the I-pictures of the secondary video having PID of 0x1B00 exist. Here, the first I-picture among I-pictures of the secondary video positioned posterior to the entry point having EP_ID of a multiple of four, of the primary video having PID of 0x1011, are rendered untransformable. In other words, in the secondary video, an entry unit storing the first I-picture, among the I-pictures whose SPN are positioned posterior to the entry point, of the primary video, having EP_ID of a multiple of four, becomes a untransformable range.

For example, in FIG. 24, among the I-pictures whose PID is 0x1B00 and which are positioned posterior to the SPN indicated by the entry point whose PID is 0x1011 and EP_ID is 4N, the I-picture#B is the beginning of the picture closest to the SPN pertaining to PID of 0x1011. Accordingly, this I-picture is rendered untransformable. Similarly, among the I-pictures positioned posterior to the SPN of the entry point whose PID is 0x1011 and whose EP_ID is 4(N+1), the I-picture#E is the beginning of the picture closest to the SPN of the entry point whose PID is 0x1011 and EP_ID is 4(N+1). Accordingly, this I-picture is rendered untransformable. With this structure, untransformed I-pictures of the secondary video can be specified using only the entry map of the primary video, thereby reducing the load of implementation of the playback apparatus.

It should be noted that this can be modified such that when the difference between SPN of an entry point whose PID is 0x1011 and EP_ID is a multiple of four, and SPN of, among each beginning of pictures whose PID is 0x1B00 and SPN is positioned posterior to the SPN pertaining to PID of 0x1011, the beginning of a picture whose SPN is closest to the SPN pertaining to PID of 0x1011 is more than a size determined by (the maximum temporal interval between I-pictures set by the BD-ROM format)*(bitrate size of the AV stream), the I-picture pertaining to PID of 0x1B00 does not need to be rendered untransformable. As a result, when playing an I-picture of an entry point whose PID is 0x1011 and EP_ID is a multiple of four, the playback apparatus is not required to play back a part unnecessarily further away to play back an untransformable I-picture of an entry point having PID of 0x1B00, thereby reducing the load on the playback apparatus.

Figure 25:
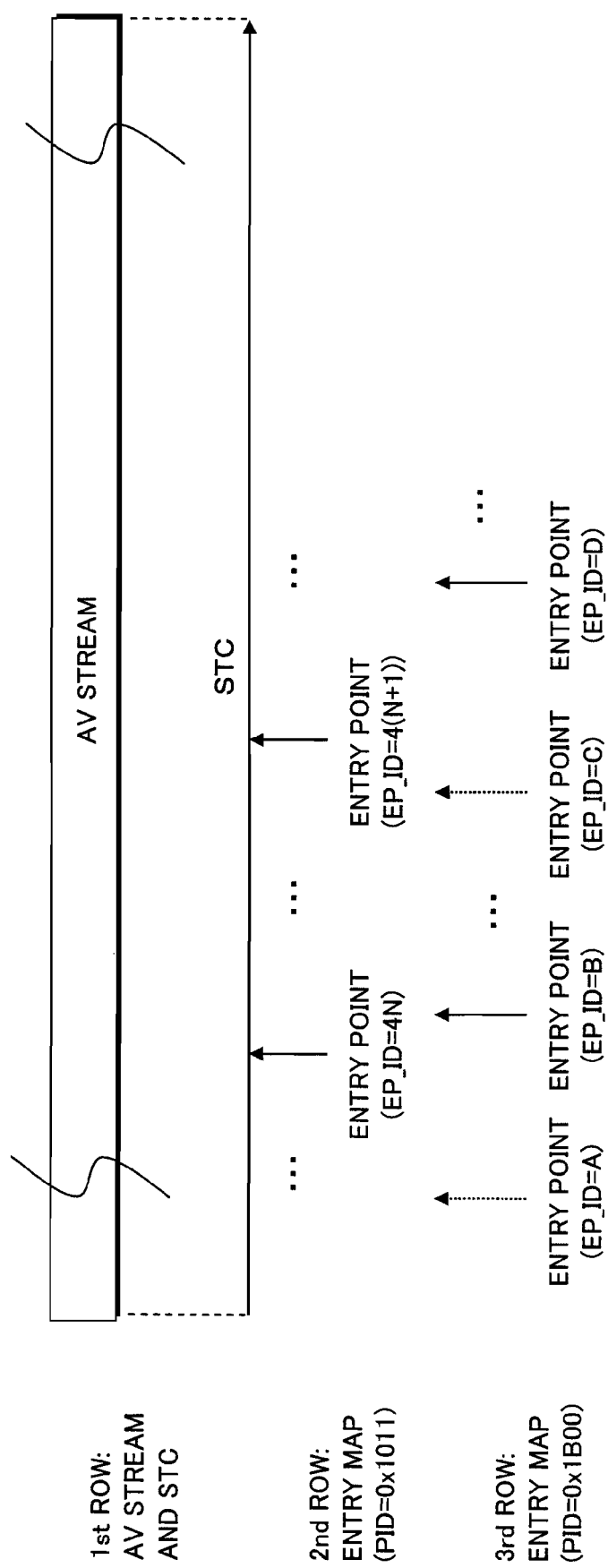
FIG. 25 shows the PTS positions of the entry points of the primary video and the secondary video with respect to STC which is the playback time axis of the AV stream, and entry points indicating untransformable I-pictures in the entry map of the secondary video in a third modification.

(3) As another modification, the untransformable I-pictures in the secondary video may be determined as shown in FIG. 25. FIG. 25 shows PTS positions of entry points with respect to the STC which is the playback time axis of the AV stream. Arrows shown in the second row of FIG. 25 indicate the PTS positions of the entry points having PID of 0x1011. EP_ID of each of these entry points is a multiple of four, and the I-pictures indicated by these entry points are untransformable. Arrows shown in the third row of FIG. 25 indicate the PTS positions of the entry points having PID of 0x1B00. Here, with respect to each PTS position whose PID is 0x1011 and EP_ID is a multiple of four, an I-picture indicated by, among the entry points whose PID is 0x1B00 and which are positioned posterior to the PTS position, an entry point whose PTS is closest to the PTS position is rendered untransformable.

For example, among the entry points whose PID is 0x1B00 and which are positioned posterior to the PTS of the entry point whose PID is 0x1011 and EP_ID is 4N, the entry point having EP_ID of B is closest to the PTS of the entry point whose PID is 0x1011 and EP_ID is 4N. Accordingly, the I-picture indicated by this entry point is rendered untransformable. Similarly, among the entry points whose PID is 0x1B00 and which are positioned posterior to the PTS of the entry point whose PID is 0x1011 and EP_ID is 4(N+1), the entry point having EP_ID of C is closest to the PTS of the entry point whose PID is 0x1011 and EP_ID is 4(N+1). Accordingly, the I-picture indicated by this entry point is rendered untransformable. With this data structure, when performing fast-forward/rewind of primary and secondary videos, the playback apparatus can easily search I-pictures which are close to each other in terms of presentation time, thereby realizing efficient fast-forward/rewind of the primary and secondary videos by the playback apparatus as a result.

It should be noted that this can be modified such that when the difference between PTS of an entry point whose PID is 0x1011 and EP_ID is a multiple of four, and PTS of an entry point whose PID is 0x1B00 and which is closest to the aforementioned PTS is more than the maximum value of the interval of I-pictures set by the format, the I-picture indicated by the entry point having PID of 0x1B00 does not need to be rendered untransformable. As a result, when playing back an I-picture of an entry point whose PID is 0x1011 and EP_ID is a multiple of four, the playback apparatus is not required to play back a part unnecessarily further away to playback an untransformable I-picture of an entry point having PID of 0x1B00. This reduces the load on the playback apparatus.

Figure 26:
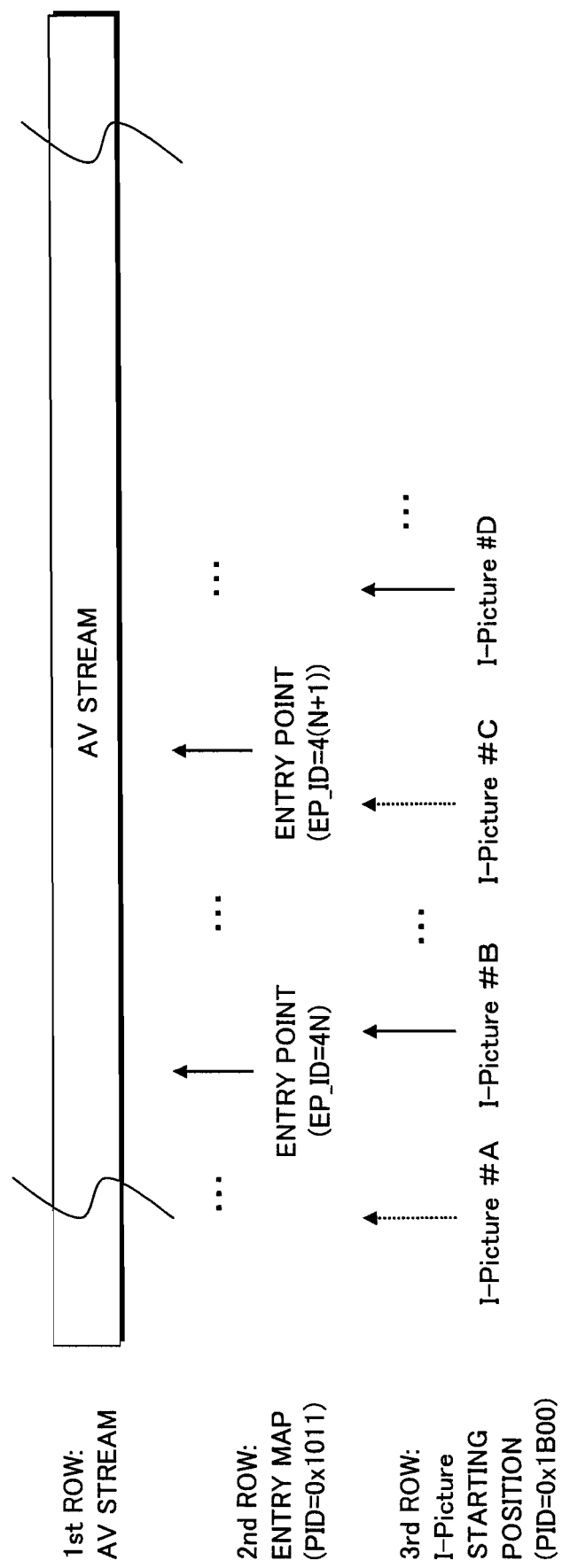
FIG. 26 shows the SPN positions of the entry points of the primary video and secondary video with respect to the file position of the AV stream, and entry points indicating untransformable I-pictures in the entry map of the secondary video in a fourth modification.

(4) As another modification, the untransformable I-pictures in the secondary video may be determined as shown in FIG. 26. FIG. 26 shows SPN positions of entry points with respect to the AV stream file. Arrows shown in the second row of FIG. 26 indicate the SPN positions of the entry points having PID of 0x1011. EP_ID of each of these entry points is a multiple of four, and the I-pictures indicated by these entry points are untransformable. Arrows shown in the third row of FIG. 26 indicate SPN positions where beginnings of the I-pictures of the secondary video having PID of 0x1B00 exist. Here, with respect to each SPN position whose PID is 0x1011 and EP_ID is a multiple of four, an I-picture, of the secondary video having PID of 0x1B00, whose SPN at the beginning thereof is closest to the SPN position is rendered untransformable.

For example, in FIG. 26, among the I-pictures having PID of 0x1B00, the I-picture#B is the beginning of the picture closest to the SPN indicated by the entry point whose PID is 0x1011 and EP_ID is 4N. Accordingly, this I-picture is rendered untransformable. Similarly, among the I-pictures having PID of 0x1B00, the I-picture#c is the beginning of the picture closest to the SPN of the entry point whose PID is 0x1011 and EP_ID is 4(N+1). Accordingly, this I-picture is rendered untransformable. With this data structure, when performing fast-forward/rewind of primary and secondary videos, the playback apparatus can easily search and play I-pictures which are close to each other in terms of file position, thereby realizing efficient fast-forward/rewind of the primary and secondary videos by the playback apparatus as a result.

It should be noted that this can be modified such that when the difference between SPN of an entry point whose PID is 0x1011 and EP_ID is a multiple of four, and SPN of, among I-pictures having PID of 0x1B00, an I-picture whose SPN is closest to the SPN pertaining to PID of 0x1011 is more than the size determined by (the maximum temporal interval between I-pictures set by the format)*(bitrate size of the AVclip), the I-picture pertaining to PID of 0x1B00 does not need to be rendered untransformable. As a result, when playing an I-picture of the entry point whose PID is 0x1011 and EP_ID is a multiple of four, the playback apparatus is not required to play back a part unnecessarily further away to play back an untransformable I-picture of an entry point having PID of 0x1B00, thereby reducing the load on the playback apparatus.

Figure 27:
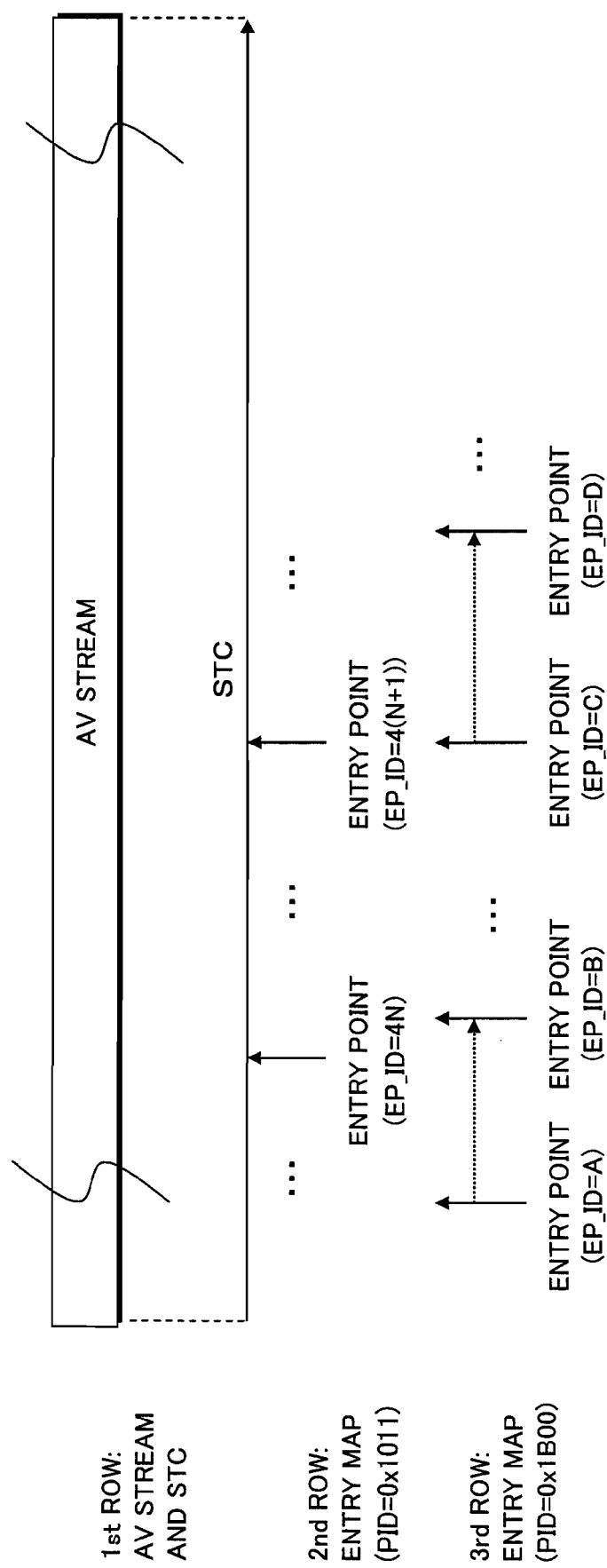
FIG. 27 shows the PTS positions of the entry points indicating untransformable I-pictures, in a fifth modification, with respect to STC which is the playback time axis of the AV stream.

(5) As another modification, the untransformable I-pictures in the secondary video may be determined as shown in FIG. 27.

FIG. 27 shows PTS positions of entry points with respect to the STC which is the playback time axis of the AV stream. Arrows shown in the second row of FIG. 27 indicate the PTS positions of the entry points having PID of 0x1011. EP_ID of each of these entry points is a multiple of four, and the I-pictures indicated by these entry points are untransformable. Arrows shown in the third row of FIG. 27 indicate the PTS positions of the entry points having PID of 0x1B00. Here, with respect to each PTS position whose PID is 0x1011 and EP_ID is a multiple of four, part of the stream from SPN of, among the entry points whose PID is 0x1B00 and whose PTS is equivalent to or positioned anterior to the PTS position, an entry point whose PTS is closest to the PTS position, to SPN of the next entry point having PID of 0x1B00 is rendered untransformable.

For example, among the entry points whose PID is 0x1B00 and PTS is equivalent to or positioned anterior to PTS of the entry point whose PID is 0x1011 and EP_ID is 4N, the entry point having EP_ID of A is closest to the PTS of the entry point whose PID is 0x1011 and EP_ID is 4N. And the next entry point having PID of 0x1B00 is the entry point having EP_ID of B. Accordingly, the secondary video stream between SPNs of these two entry points is rendered untransformable. Similarly, among the entry points whose PID is 0x1B00 and whose PTS is equivalent to or positioned anterior to PTS of the entry point whose PID is 0x1011 and EP_ID is 4(N+1), the entry point having EP_ID of C is closest to the PTS of the entry point whose PID is 0x1011 and EP_ID is 4(N+1). And the next entry point having PID of 0x1B00 is the entry point having EP_ID of D. Accordingly, the secondary video stream between SPNs of these two entry points is rendered untransformable.

With this data structure, when performing fast-forward/rewind of primary and secondary videos, the playback apparatus can easily search the secondary video stream which has the same PTS as the presentation time, thereby realizing efficient fast-forward/rewind of the primary and secondary videos by the playback apparatus as a result.

Figure 28:
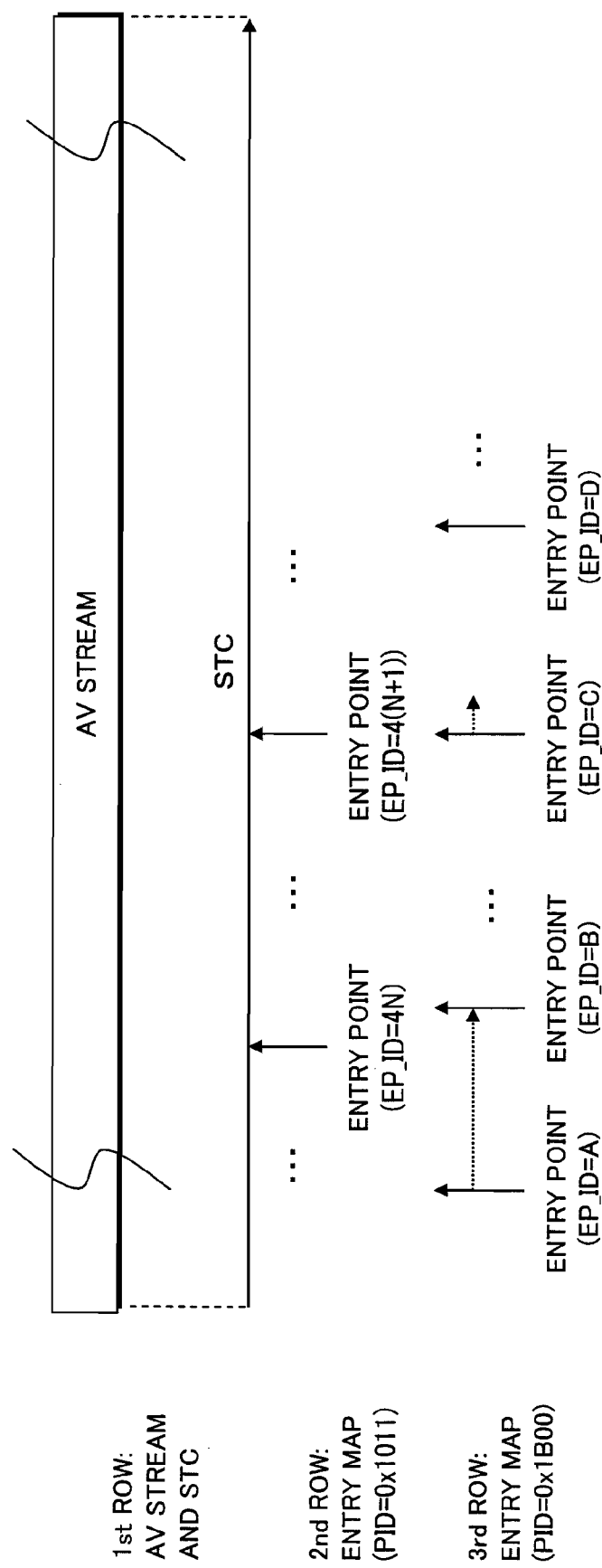
FIG. 28 shows the PTS position of the entry points indicating untransformable I-pictures, in a sixth modification, with respect to STC which is the playback time axis of the AV stream.

(6) As another modification, the untransformable I-pictures in the secondary video may be determined as shown in FIG. 28.

FIG. 28 shows PTS positions of entry points with respect to the STC which is the playback time axis of the AV stream. The arrows shown in the second row of FIG. 28 indicate the PTS positions of the entry points having PID of 0x1011. EP_ID of each of these entry points is a multiple of four, and the I-pictures indicated by these entry points are untransformable.

Arrows shown in the third row of FIG. 28 indicate the PTS positions of the entry points having PID of 0x1B00. Here, with respect to each PTS position whose PID is 0x1011 and whose EP_ID is a multiple of four, part of the stream from SPN of, among the entry points whose PID is 0x1B00 and whose PTSs are positioned anterior to the PTS position, an entry point whose PTS is closest to the PTS position, to SPN of the next entry point having PID of 0x1B00 is rendered untransformable. However, it should be noted, with respect to each PTS position whose PID is 0x1011 and whose EP_ID is a multiple of four, if an entry point whose PID is 0x1B00 and whose PTS is equivalent to the PTS position exists, an I-picture indicated by this entry point is rendered untransformable.

For example, among the entry points whose PID is 0x1B00 and whose PTSs are positioned anterior to PTS of the entry point whose PID is 0x1011 and EP_ID is 4N, the entry point having EP_ID of A is closest to the PTS of the entry point whose PID is 0x1011 and EP_ID is 4N. And the next entry point having PID of 0x1B00 is the entry point having EP_ID of B. Accordingly, the secondary video stream between SPNs of these two entry points is rendered untransformable. Further, among the entry points whose PID is 0x1B00, PTS of the entry point having EP_ID of C is equivalent to the PTS of the entry point whose PID is 0x1011 and EP_ID is 4(N+1). Accordingly, the I-picture indicated by this entry point is rendered untransformable.

With this data structure, when performing fast-forward/rewind of primary and secondary videos, the playback apparatus can easily search the secondary video stream which has the same PTS as the presentation time, thereby realizing efficient fast-forward/rewind of the primary and secondary videos by the playback apparatus as a result.

Figure 29:
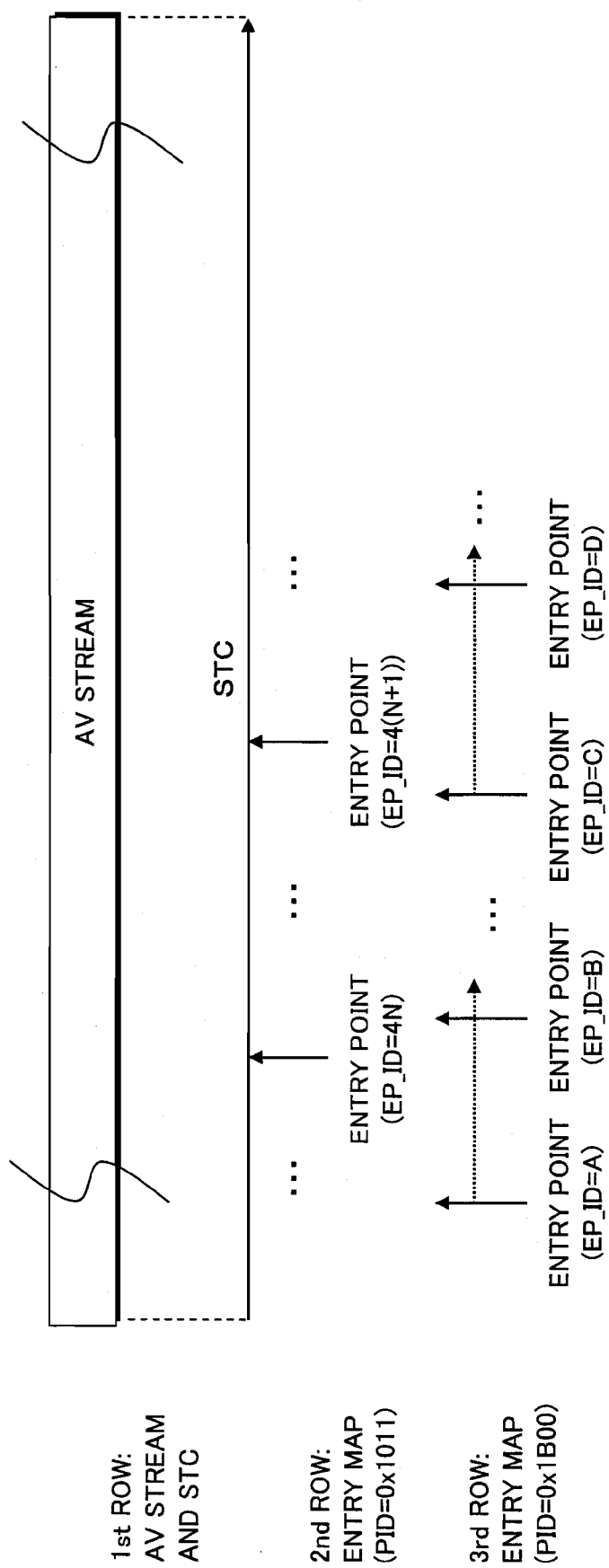
FIG. 29 shows the PTS positions of the entry points indicating untransformable I-pictures, in a seventh modification, with respect to STC which is the playback time axis of the AV stream.

(7) As another modification, the untransformable I-pictures in the secondary video may be determined as shown in FIG. 29.

FIG. 29 shows PTS positions of entry points with respect to the STC which is the playback time axis of the AV stream. Arrows shown in the second row of FIG. 29 indicate the PTS positions of the entry points having PID of 0x1011. EP_ID of each of these entry points is a multiple of four, and the I-pictures indicated by these entry points are untransformable. Arrows shown in the third row of FIG. 29 indicate the PTS positions of the entry points having PID of 0x1B00. Here, with respect to each PTS position whose PID is 0x1011 and EP_ID is a multiple of four, part of the stream from SPN of, among the entry points whose PID is 0x1B00 and PTSs are equivalent to or positioned anterior to the PTS position, an entry point whose PTS is closest to the PTS position, to the I-picture of the next entry point having PID of 0x1B00 is rendered untransformable.

For example, among the entry points whose PID is 0x1B00 and PTSs are equivalent to or positioned anterior to PTS of the entry point whose PID is 0x1011 and EP_ID is 4N, the entry point having EP_ID of A is closest to the PTS of the entry point whose PID is 0x1011 and EP_ID is 4N. And the I-picture indicated by the next entry point having PID of 0x1B00 is the entry point having EP_ID of B. Accordingly, the secondary video stream from SPN of this entry point having EP_ID of A to the I-picture indicated by the entry point having EP_ID of B is rendered untransformable. Similarly, among the entry points whose PID is 0x1B00 and whose PTSs are equivalent to or positioned anterior to PTS of the entry point whose PID is 0x1011 and EP_ID is 4(N+1), the entry point having EP_ID of C is closest to the PTS of the entry point whose PID is 0x1011 and EP_ID is 4(N+1). And the next entry point having PID of 0x1B00 is the entry point having EP_ID of D. Accordingly, the secondary video stream from SPN of this entry point having EP_ID of C to the I-picture indicated by the entry point having EP_ID of D is rendered untransformable.

With this data structure, when performing fast-forward/rewind of primary and secondary videos, the playback apparatus can easily search the picture of the secondary video stream which has the same PTS as the presentation time of the primary video, while at the same time being able to easily search the I-picture of the secondary video being closest to the presentation time of the primary video, thereby realizing efficient fast-forward/rewind of the primary and secondary videos by the playback apparatus as a result.

Figure 30:
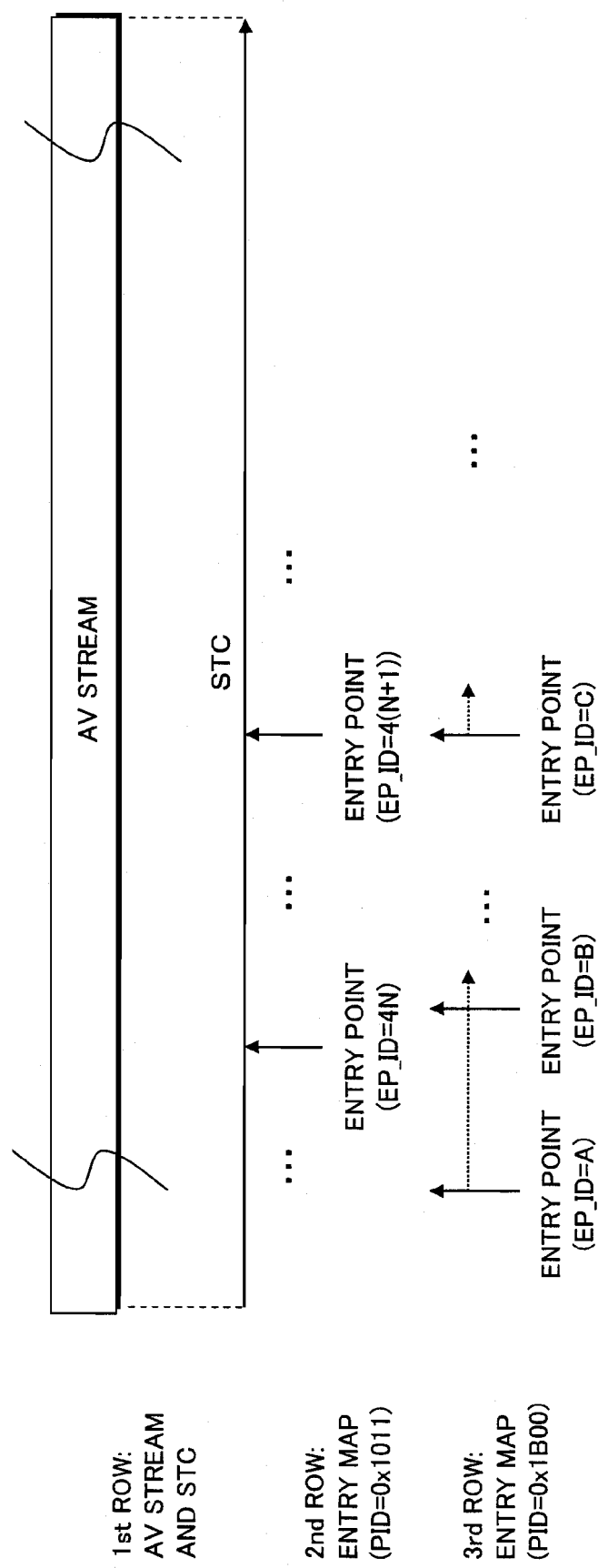
FIG. 30 shows the PTS positions of the entry points indicating untransformable I-pictures, in an eighth modification, with respect to STC which is the playback time axis of the AV stream.

(8) As another modification, the untransformable I-pictures in the secondary video may be determined as shown in FIG. 30.

FIG. 30 shows PTS positions of entry points with respect to the STC which is the playback time axis of the AV stream. Arrows shown in the second row of FIG. 30 indicate the PTS positions of the entry points having PID of 0x1011. EP_ID of each of these entry points is a multiple of four, and the I-pictures indicated by these entry points are untransformable. Arrows shown in the third row of FIG. 30 indicate the PTS positions of the entry points having PID of 0x1B00. Here, with respect to each PTS position whose PID is 0x1011 and EP_ID is a multiple of four, part of the stream from SPN of, among the entry points whose PID is 0x1B00 and whose PTS is positioned anterior to the PTS position, an entry point whose PTS is closest to the PTS position, to the I-picture indicated by the next entry point having PID of 0x1B00 is rendered untransformable. However, it should be noted, with respect to each PTS position whose PID is 0x1011 and EP_ID is a multiple of four, if an entry point whose PID is 0x1B00 and PTS is equivalent to the PTS position exists, an I-picture, in the secondary video, indicated by this entry point is rendered untransformable.

For example, among the entry points whose PID is 0x1B00 and whose PTSs are positioned equivalent to or anterior to PTS of the entry point whose PID is 0x1011 and EP_ID is 4N, the entry point having EP_ID of A is closest to the PTS of the entry point whose PID is 0x1011 and EP_ID is 4N. And the next entry point having PID of 0x1B00 is the entry point having EP_ID of B. Accordingly, the secondary video stream from SPN of this entry point having EP_ID of A to the I-picture indicated by the entry point having EP_ID of B is rendered untransformable. Further, among the entry points whose PID is 0x1B00, PTS of the entry point having EP_ID of C is equivalent to the PTS of the entry point whose PID is 0x1011 and EP_ID is 4(N+1). Accordingly, the I-picture indicated by this entry point is rendered untransformable.

With this data structure, when performing fast-forward/rewind of primary and secondary videos, the playback apparatus can easily search the picture of the secondary video stream which has the same PTS as the presentation time of the primary video, while at the same time being able to easily search the I-picture of the secondary video being closest to the presentation time of the primary video, thereby realizing efficient fast-forward/rewind of the primary and secondary videos by the playback apparatus as a result.

It should be noted that when the pictures to be rendered untransformable, indicated by the entry points of the entry maps of the primary and secondary videos, are of a field structure and the picture of the second field is inter-frame encoded (for example, Predictive method), both the first and second fields can be rendered untransformable. With this structure, when executing special playback without restoring the stream, the playback apparatus is able to play back data in both of the first and second fields of the picture, which are to be rendered untransformable, indicated by the entry map.

Second Embodiment

In the second embodiment, the playback apparatus of the present invention is described.

Figure 31:
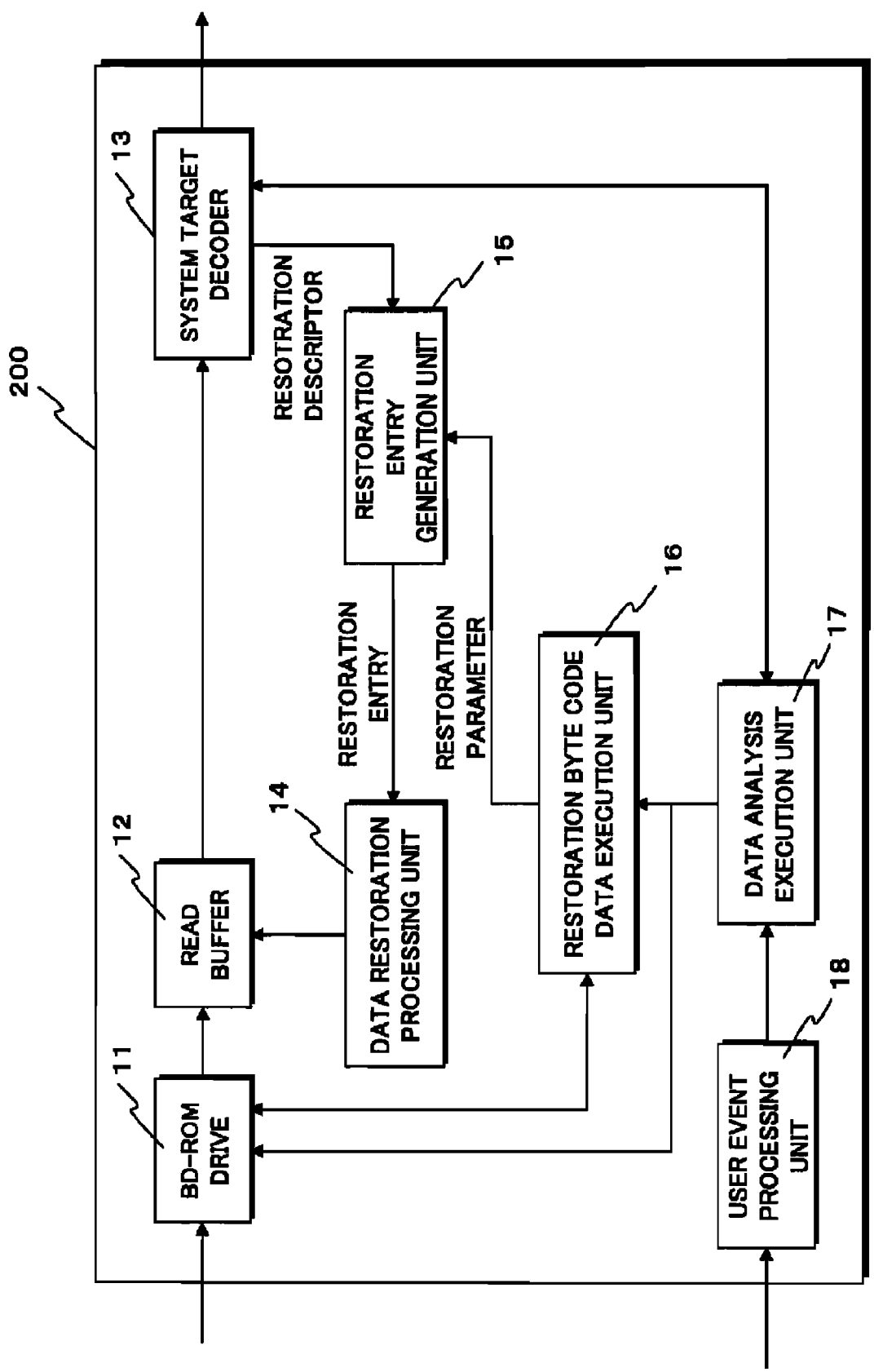
FIG. 31 shows an inner structure of a playback apparatus.

FIG. 31 shows a structure of a playback apparatus 200. The playback apparatus 200 includes a BD-ROM drive 11, a read buffer 12, a system target decoder 13, a data restoration processing unit 14, a restoration entry generation unit 15, a restoration byte code data execution unit 16, a data analysis execution unit 17, and a user event processing unit 18.

The BD-ROM drive 11 reads data from the BD-ROM disc based on commands from the data analysis execution unit 17 and stores the read data into the read buffer 12. The data read from the BD-ROM disc includes the Index File, Movie Object file, and PlayList file in addition to the AV stream. When a command to read restoration byte code data is generated by the restoration byte code data execution unit 16, the BD-ROM drive 11 reads the restoration byte code data from the BD-ROM disc and transmits it to the restoration byte code data execution unit 16.

The read buffer 12 is a buffer composed of a memory or the like temporarily storing the data read using the BD-ROM driver.

The system target decoder 13 performs demultiplexing processing on source packets read by the read buffer 12, and decodes and plays back each stream. When data of PMT is transferred from the read buffer 12 and a system target decoder in the system target decoder 13 detects a restoration descriptor, the system target decoder 13 transfers to the restoration entry generation unit 15 the restoration descriptor and SPN of the PMT packet in which the restoration descriptor is described. Details of the system target decoder 13 are described later.

The user event processing unit 18 responds to user operations via the remote controller and requests the data analysis execution unit 13 to execute processing. For example, when a button on the remote controller is pressed, the user event processing unit 18 requests the data analysis execution unit 13 to execute the command contained in the button. For example, when the fast-forward/rewind button on the remote controller is pressed, the user event processing unit 18 instructs the data analysis execution unit 13 to execute fast-forward/rewind processing on the AV stream of the PlayList currently being played back.

The restoration byte code data execution unit 16, upon receiving an execution command from the data analysis execution unit 17, receives the number of the AV stream and the restoration segment ID from the data analysis execution unit 17, acquires the restoration byte code data 16 from the BD-ROM drive 11, and executes processing. A restoration parameter generated from the restoration byte code data is passed on to the restoration entry generation unit.

The restoration entry generation unit 15 generates a restoration entry by executing, on the mask restoration entry included in the restoration descriptor transferred from the system target decoder 13, XOR operation processing of the restoration parameter transferred from the restoration byte code data execution unit 16. The restoration entry generation unit 15 transfers SPN of a PMT packet corresponding to the generated restoration entry, to the data restoration processing unit 14.

The data restoration processing unit 14 receives the SPN of the PMT packet corresponding to the restoration entry transferred from the restoration entry generation unit 15 and executes restoration processing. When the transformation instruction flag of the restoration entry is "restoration not required", the data restoration processing unit 14 ignores the restoration entry and performs no processing. When the transformation instruction flag of the restoration entry is "restoration required", the data restoration processing unit 14 identifies a source packet, which is the restoration target, based on the relative packet count and the SPN of the PMT packet, and finds the identified source packet in the read buffer 12. The data restoration processing unit 14 identifies an overwrite position in the source packet based on the intra-packet position of the restoration entry, and overwrites it with the overwrite value.

The data analysis execution unit 17 includes a command processor executing navigation commands which constitute a Movie Object, and a playback control engine. The playback control engine plays back the AV stream, via the PlayList information, based on an execution result of PlayPL command by the command processor, API calls by a platform unit, and the like. The data analysis execution unit 17 manages how far the AV stream has been played back, and prior to changing of the restoration segment in the AV stream, instructs the restoration byte code data execution unit 16 to execute the restoration byte code data to generate the next restoration parameter.

The data analysis execution unit 17, upon being notified, by the restoration byte code data execution unit 16, of an execution command of special playback which is high-speed fast-forward/rewind, analyzes the entry map in which PID in the stream information file of the AV stream to be played back indicates the primary video, and identifies entry points whose EP_ID is a multiple of four. Next, the data analysis execution unit 17 analyzes the entry map in which PID in the stream information file of the AV stream to be played back indicates the secondary video. After selecting the entry point of the primary video to be played back first, the data analysis execution unit 17 selects, in the entry map of the secondary video, an entry point whose PTS is close to the PTS of the entry point of the primary video. Following that, the data analysis execution unit 17 realizes high-speed fast-forward/rewind by repeating the following processing (1) to (4). (1) The data analysis execution unit 17 notifies the BD-ROM drive 11 of the smallest SPN among the selected entry points of the primary video and secondary video, and requests the BD-ROM drive 11 to start reading from the notified SPN. (2) The data analysis execution unit 17 provides information on the entry points of the primary video and secondary video to the system target decoder 13, and instructs the system target decoder 13 to play back only I-pictures therein. (3) The data analysis execution unit 17 receives notification of playback completion of the I-pictures of the primary video and secondary video from the system target decoder 13. (4) The data analysis execution unit 17 selects, in the entry map of the primary video, an entry point to be played back next whose EP_ID is a multiple of four, and selects, in the entry map of the secondary video, an entry point whose PTS is closest to the PTS of the selected entry point of the primary video. Note that obviously, not all of the entry points in the primary video with a multiple of four need to be played back, and the entry points are selected and played back in accordance with the speed of fast-forward/rewind specified by the user.

<System Target Decoder 13>

Figure 32:
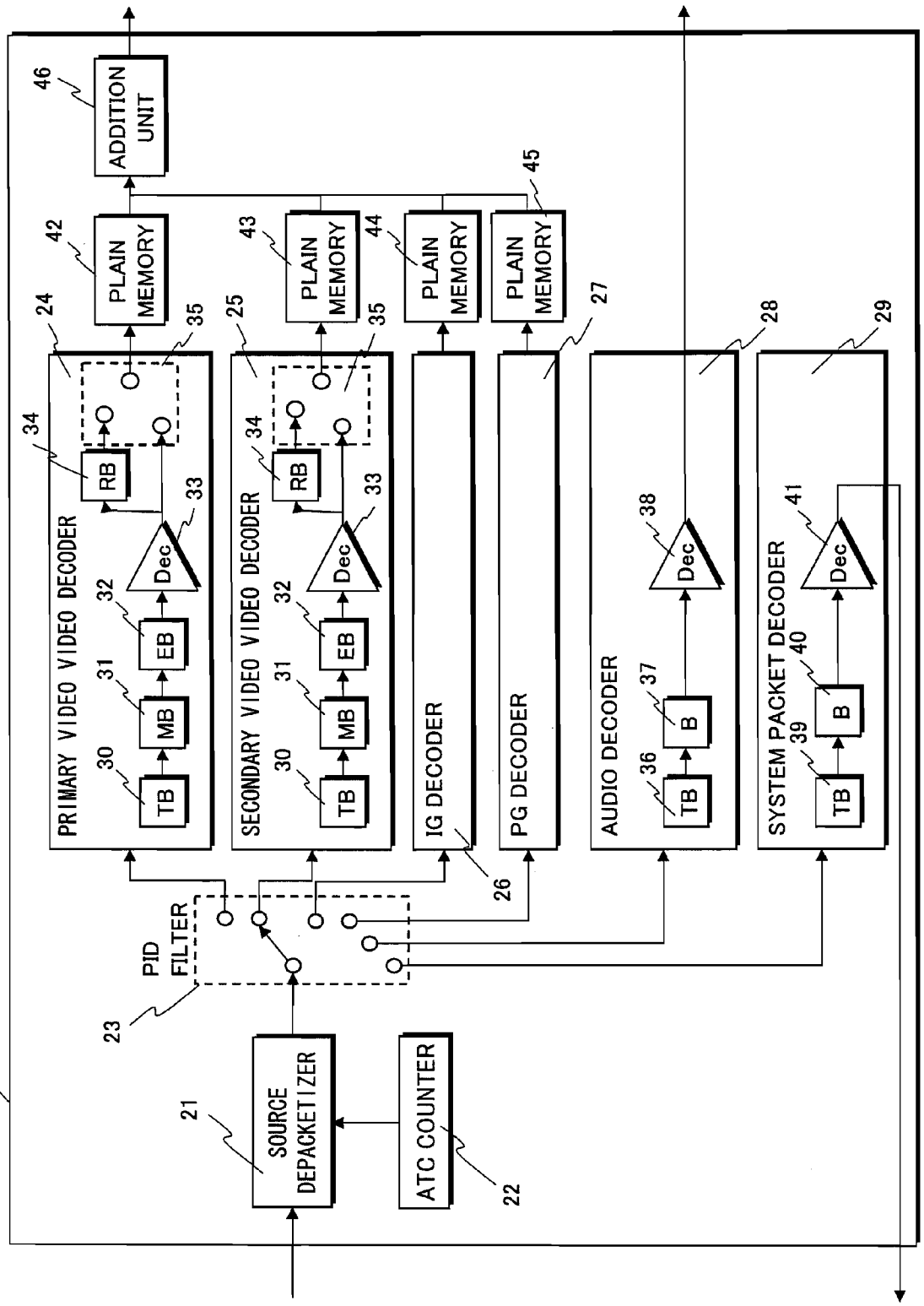
FIG. 32 shows an inner structure of a system target decoder.

Next, the system target decoder 13 is described with reference to FIG. 32.

A source packetizer 21 interprets source packets transferred to the system target decoder 13, fetches TS packets therefrom, and transmits the fetched TS packets to a PID filter 23. When transmitting the TS packets to the PID filter 23, the source packetizer 21 adjusts input time to the decoder according to ATS of each source packet. Specifically, when the value of ATC generated by an ATC counter 22 coincides with the value of ATC of the source packet, the source packetizer 21 sends only the TS packet to the PID filter 23 in accordance with the recording rate of the ACVlip.

The PID filter 23 transfers, among the TS packets output from the source packetizer 21, TS packets whose PID coincides with PID required for the playback to, in accordance with PID, a primary video decoder 24, a secondary video decoder 25, an IG decoder 26, a PG decoder 27, an audio decoder 28, and a system packet decoder 29. For example, for a BD-ROM, the PID filter 23 sends a TS packet to the primary video decoder 24 when PID included in the TS packet is 0x1011, to the secondary video decoder 25 when PID is 0x1B00 to 0x1B1F, to the audio decoder 28 when PID is 0x1100 to 0x111F, to the PG decoder 27 when PID is 0x1200 to 0x121F, to the IG decoder 26 when PID is 0x1400 to 0x141F, and to the system packet decoder 29 when PID is 0x0000 indicating PAT or 0x0100 indicating PMT.

The primary video decoder 24 includes TB (TransportStreamBuffer) 30, MB (Multiplexing Buffer) 31, EB (ElementaryStreamBuffer) 32, a compressed video decoder 33, RB (Re-order Buffer) 34, and a switch 35.

The TB 30 is a buffer temporarily storing TS packets belonging to a video stream when the TS packets are output from the PID filter 23.

The MB 31 is a buffer temporarily storing PES packets when the TB 30 outputs the video stream to the EB 32.

The EB 32 is a buffer storing encoded pictures (I-pictures, B-pictures, and P-pictures).

The compressed video decoder 33 creates multiple frame images by decoding each frame image in the video elementary stream according to a predetermined decoding time (DTS). Compression encoding methods used for video streams multiplexed into an AV stream include MPEG2, MPEG4AVC, VC1, and the like, and the compressed video decoder 33 is set according to the attribute of the stream. The compressed video decoder 33, when information on the entry maps has been transmitted from the data analysis execution unit 17 to the system target decoder 13 and the information instructs only playback of I-pictures, notifies the data analysis execution unit 17 upon completion of decoding of the I-pictures.

The RB 34 is a buffer for changing the order of the decoded pictures from the order of encoding to the order of presentation.

The switch 35 is a switch for changing the order of the decoded pictures from the order of encoding to the order of presentation. Changeover of the switch 35 causes the pictures to be written into a plain memory 42 in accordance with the presentation time (PTS).

The secondary video decoder 25 which has the same structure as the primary video decoder 24 decodes input secondary video streams and writes the pictures into a plain memory 43 in accordance with the presentation time (PTS).

The IG decoder 26 extracts and decodes interactive graphics streams from the TS packets input from the source packetizer and writes uncompressed graphics data into a plain memory 44 in accordance with the presentation time (PTS).

The PG decoder 27 extracts and decodes presentation graphics streams from the TS packets input from the source packetizer and writes uncompressed graphics data into a plain memory 45 in accordance with their presentation time (PTS).

The addition unit 46 instantaneously overlaps the data written in the plain memories 42, 43, 44, and 45 and displays the overlapped data on TV or the like.

The audio decoder 28 is composed of TB (TransportStreamBuffer) 36, B (Buffer) 37, and a compressed audio decoder 38.

The TB 36 stores the TS packets output from the PID filter 23 in a first-in first-out manner and transfers the stored TS packets to the B 37 at a constant bitrate.

The B 37 stores the audio stream input from the TB 36 in a first-in first-out manner and provides the stored audio stream to the compressed audio decoder 38 in units of PES packets.

The compressed audio decoder 38 performs decoding processing on the input PES packets, thereby obtaining audio data in compressed LPCM, and outputs the obtained audio data in accordance with the playback time (PTS). Compression encoding methods for audio streams to be multiplexed into an AV stream include AC3, DTS and the like. The compression video decoder 33 is switched in accordance with the attribute of the stream.

The system packet decoder 29 is composed of TB (TransportStreamBuffer) 39, B (Buffer) 40, and a system packet analysis unit 41.

The TB 39 stores the TS packets output from the PID filter 23 in a first-in first-out manner and transfers the stored TS packets to the B 40 at a constant bitrate.

The B 40 transfers the data input from the TB 39 at a constant transfer rate and data of PAT and PMT, to the system packet analysis unit 41.

The system packet analysis unit 41 analyzes contents of input transferred PAT and PMT. For example, the system packet analysis unit 41 analyzes stream information described in PMT and initializes the respective decoders. When PMT includes a restoration descriptor at the beginning thereof, the system packet analysis unit 41 extracts the restoration descriptor and notifies the restoration entry generation unit 15 of SPN of the PMT packet.

Described above is the hardware structure of the playback apparatus of the present invention.

Figure 33:
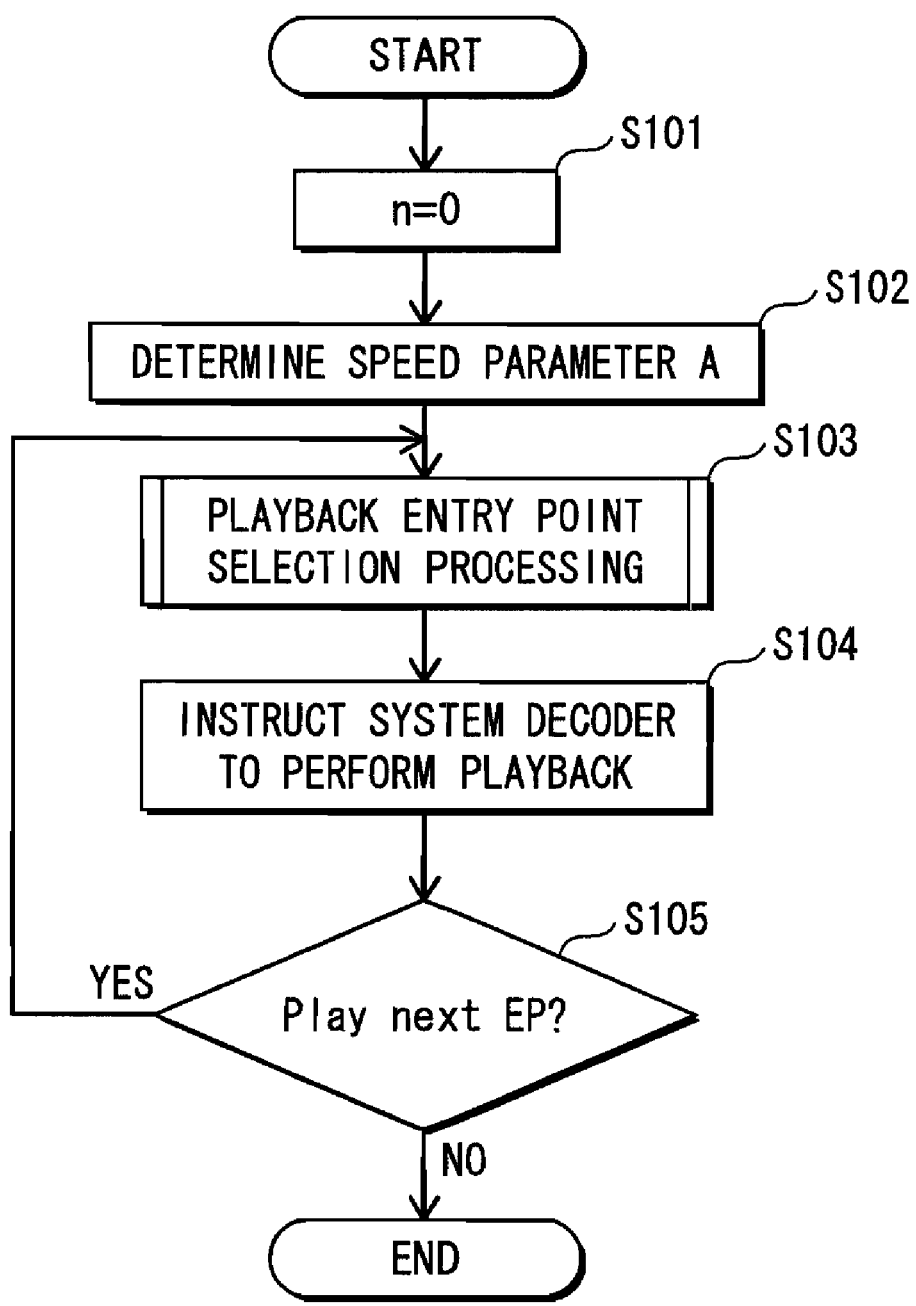
FIG. 33 is a flowchart showing processing by a data analysis execution unit 17.

Next, detailed description is given on operations during high-speed fast-forward/rewind playback, which is the feature of the playback apparatus of the present embodiment. The operations during high-speed fast-forward/rewind playback are controlled by the data analysis execution unit 17. FIG. 33 is a flowchart showing the processing by the data analysis execution unit 17.

Upon receiving a fast-forward/rewind instruction by user operation, the data analysis execution unit 17 first sets a variable n allocated on a work memory to 0 (S101), and determines a multiple-speed parameter A in accordance with the specified playback speed (S102).

After that, the data analysis execution unit 17 selects entry points of the primary video and secondary video for playback by executing playback entry point selection processing using the variable n and multiple-speed parameter A (S103) and instructs the system target decoder 13 to play back the I-pictures indicated by the selected entry points (S104).

The data analysis execution unit 17 executes the above-mentioned processing repeatedly (S103 to S105), and upon receiving a stop instruction by the user or reaching the end of the entry map (S105: No), ends the special playback.

Figure 34:
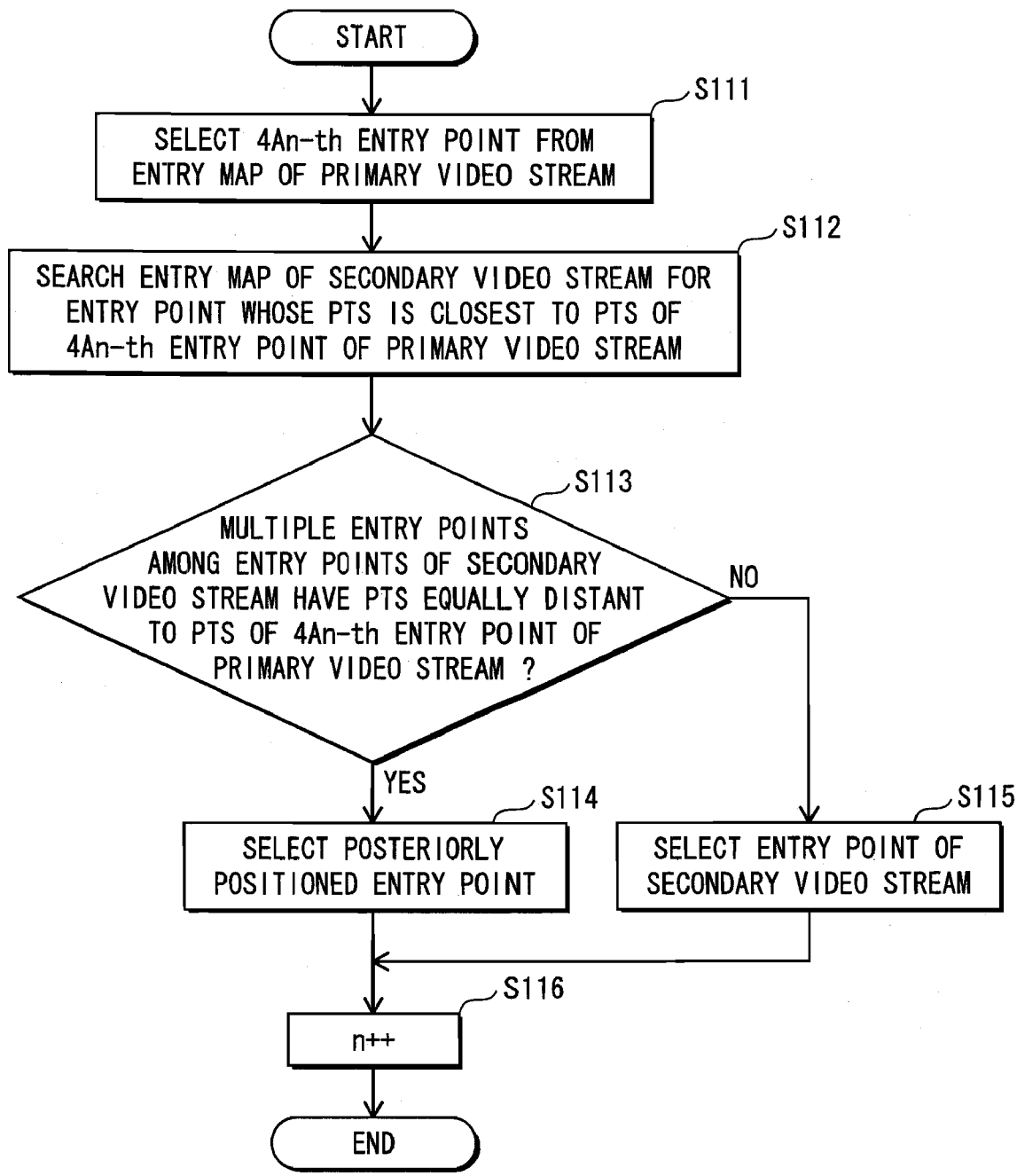
FIG. 34 is a flowchart showing processing steps of playback entry point selection processing.

Next, description is given on the playback entry point selection processing. FIG. 34 is a flowchart showing processing steps of the playback entry point selection processing.

In the playback entry point selection processing, the data analysis execution unit 17 first searches the entry map of the primary video for the 4An-th entry point, and selects the entry point as the playback target of the primary video (S111).

Next, the data analysis execution unit 17 searches the entry map of the secondary video for an entry point whose PTS is closest to PTS of the entry point of the primary video selected in S111 (S112). Here, when two entry points are detected in the secondary video (S113: Yes), one of the two which is posteriorly positioned to the other in terms of time is selected as the playback target of the secondary video (S114). When one entry point is detected in the secondary video in S112 (S113: No), the detected entry point is selected as the playback target of the secondary video (S115). Lastly, the data analysis execution unit 17 increments the variable n by one (S116) and after that, performs the high-speed fast-forward/rewind playback shown in FIG. 33.

Up to this point, the playback entry point selection processing has been described in detail.

As described above, according to the present embodiment, when an AV stream is read, for performing high-speed fast-forward/rewind playback thereof, from a recording medium on which copyright protection at the TS packet level has been realized by recording the AV stream which is partially transformed, an increase in the processing load can be avoided by selectively using the following TS packets: TS packets which are ensured to be untransformed, that is, TS packets constituting every fourth entry unit in the primary video stream and TS packets constituting entry units in the secondary video stream, each of which has a presentation time stamp closest to anyone of the every fourth entry unit in the primary video stream.

Third Embodiment

In the third embodiment, an embodiment of the recording apparatus and recording method of the present invention is described. For the production and manufacturing of the BD-ROM mentioned in the first embodiment, the recording apparatus and the recording method of the present invention are used.

Here, the recording apparatus is so-called an authoring apparatus which is installed at production studios for distributing motion picture content and used by authoring staff. A use form of the recording apparatus of the present invention is as follows: the recording apparatus generates digital streams which are compression encoded in accordance with MPEG standard and scenarios which describe how to play back motion picture Titles, and generates, for BD-ROM, a volume image including these. The object of the recording apparatus of the present invention is to generate the recording medium described in the first embodiment.

Figure 35:
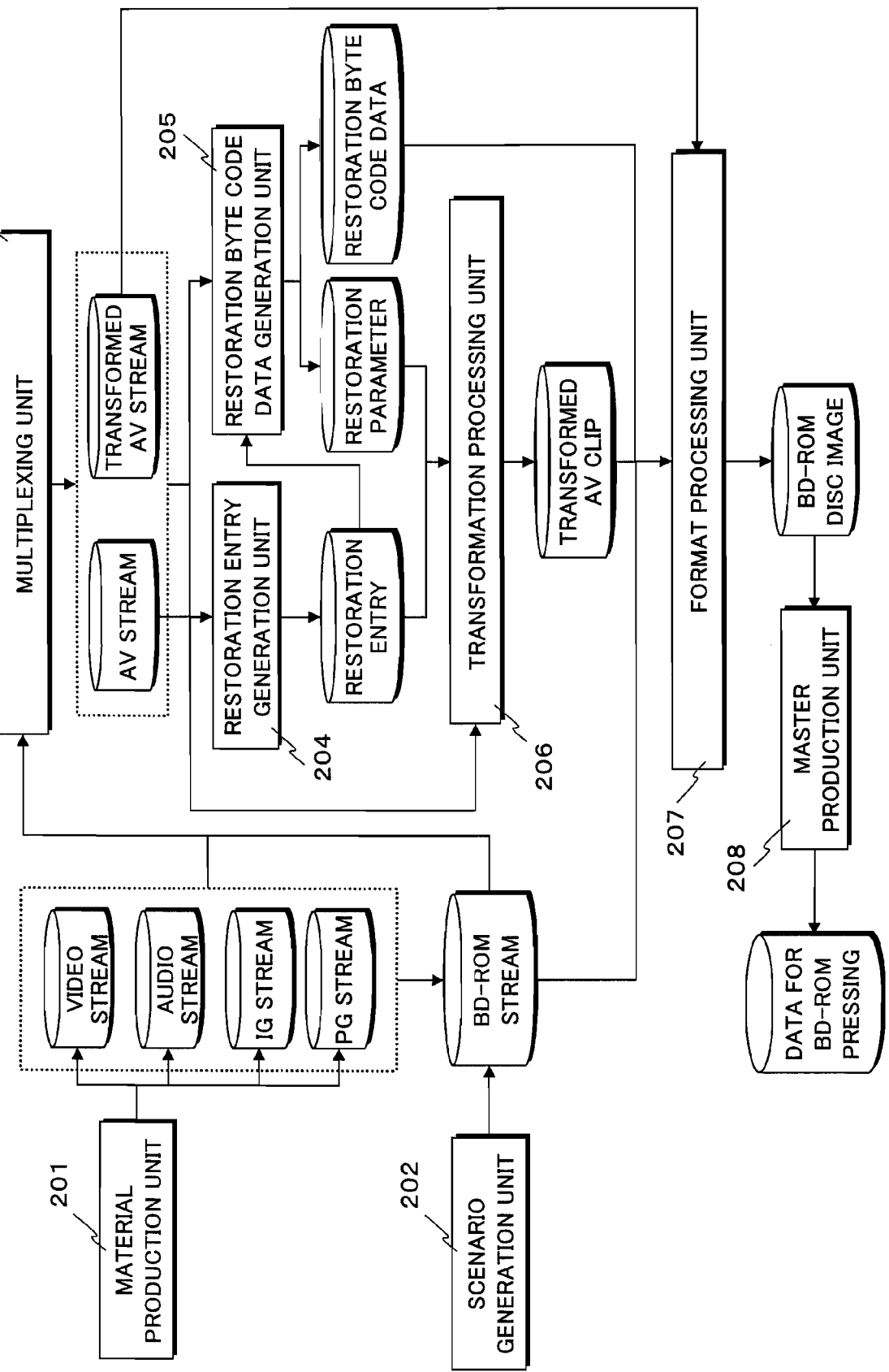
FIG. 35 shows an inner structure of a recording apparatus.

FIG. 35 shows the internal structure of the recording apparatus of the present invention. As shown in the figure, the recording apparatus of the present invention includes a material production unit 201, a scenario generation unit 202, a multiplexing unit 203, a restoration entry generation unit 204, a restoration byte code data generation unit 205, a transformation processing unit 206, a format processing unit 207, and a master production unit 208.

The material production 201 creates streams such as video streams, audio streams, presentation graphics streams, and interactive graphics streams. The material production unit 201 creates video streams by encoding video images such as uncompressed bit map in accordance with a compression standard such as MPEG4-AVC and MPEG2. Also, the material production unit 201 creates audio streams by encoding uncompressed Linear PCM audio and the like in accordance with a compression standard such as AC3. The material production unit 201 creates presentation graphics streams which are formats of subtitle streams conforming to the BD-ROM standard, based on a subtitle information file which includes subtitle images, presentation timing, and subtitle effects such as fade-in/fade-out. The material production unit 201 creates interactive graphics streams which are formats of menu screens conforming to the BD-ROM standard, based on bit-map images used for the menu and a menu file describing transition of buttons on the menu and presentation effects.

The scenario generation unit 202 creates scenarios in a format conforming to the BD-ROM standard in accordance with information on the streams created by the material production unit 201 and operations by the authoring staff via GUI. Here, the scenarios correspond to files such as the Index File, Movie Object file, and PlayList file. The scenario generation unit 202 further creates parameter files each describing which streams compose which AV stream, to realize multiplexing processing.

The multiplexing unit 203 multiplexes multiple streams such as video, audio, subtitles, buttons and the like described in BD-ROM scenario data into an AV stream in MPEG2-TS format. Here, a stream information file corresponding one-to-one with the AV stream is created as well. Creation of the stream information file by the multiplexing unit 203 is performed as follows. The multiplexing unit 203 creates entry maps while creating the AV stream. More specifically, the multiplexing unit 203, in each of the streams generated by the material production unit 201, detects where I-pictures exist if the contained video stream is MPEG2, where I-pictures or IDR pictures exist if the contained video stream is MPEG4-AVC, and where I-pictures exist if the contained video stream is VC-1. The multiplexing unit 203 then registers, in the entry map, entry points each of which associates the presentation time of the picture with a source packet, in the AV stream in the MPEG2-TS format, in which the starting data of the pictures exists. When there are two kinds of video streams, that is, a primary video stream and a secondary video stream in the AV stream, the multiplexing unit 203 creates entry maps for these two simultaneously. The multiplexing unit 203 creates the stream information file in which the entry maps created thereby correspond one-to-one with attribute information indicating audio attribute, video attribute and the like for each of the streams included in the AV stream. Also, the multiplexing unit 203 creates, without causing overflow to the buffer in the system target decoder 2409, a large number such as 50 pieces, per second, of PMT packets. In the BD-ROM, a restoration entry for transforming an AV stream needs to be inserted as a restoration descriptor into a PMT packet in the AV stream. Thus, a large number of PMT packets are required to realize a large amount of data transformation in the AV stream.

The restoration entry generation unit 204 analyzes contents of the AV stream, selects pre-transformation data to be transformed, and creates restoration entries. The restoration entry generation unit 204 selects the pre-transformation data effectively such that the image is distorted and the AV stream cannot be played back properly when an unauthorized playback apparatus plays back the AV stream without restoration. Here, a large playback distortion due to transforming pre-transformation data is defined as "a large transformation effect". In order to select pre-transformation data enabling a large transformation effect when the AV stream contains a video stream, the following priorities are taken into account. (1) Pre-transformation data is selected in the following order of priority: IDR-picture/I-picture->P-picture->B-picture. (Since a compression method of a video stream uses compression based on temporal correlation, transforming a picture which largely affects correlation of pictures increases the transformation effect.) (2) A slice header and a periphery around the beginning of slice data in the picture are selected as pre-transformation data. (A video stream can be decoded in units of slices, and because slice headers and the beginning of slice data are the most important data for the decoder, transformation of these or a vicinity thereof increases the transformation effect.) (3) When there are multiple slices in the picture, the first slice is given higher priority when selecting pre-transformation data. (The first slice header includes such as a parameter common to slices in the picture, and thus, transforming the first slice header increases the transformation effect.) With respect to the pre-transformation data selected as above, SPN of PMT positioned anterior thereto is found out and the transformation instruction flag, relative packet, intra-packet position, and overwrite value are set, thereby creating a restoration entry. Also, the restoration byte code data generation unit 205 refers to the entry map in the stream information file, and avoids selecting pre-transformation data from the I-pictures, in the entry map of the primary video, whose EP_ID is a multiple of four, for the primary video stream. In addition, the restoration byte code data generation unit 205 refers to the stream information file in the entry map, and avoids selecting pre-transformation data from an I-picture indicated by an entry point, in the entry map of the secondary video, whose PTS is closest to that of the entry point whose EP_ID is a multiple of four.

The restoration byte code data generation unit 205 calculates restoration segments based on the AV stream and the stream information file, and creates restoration parameters corresponding one-to-one with the restoration segments. Also, the restoration byte code data generation unit 205 generates restoration byte code data with respect to the AV stream number and restoration segment ID so as to be able to generate restoration parameter. When generating the restoration byte code data, some efforts may be made. These efforts are, for example, with use of a key on the BD-ROM disc or in the playback apparatus, allowing only the playback apparatus having the correct key to generate the restoration parameter, thereby preventing an illegal playback apparatus from performing playback, or obfuscating program codes to prevent the program itself from being illegally analyzed. Additionally, for the restoration byte code data, the restoration byte code data generation unit 205 creates a mask restoration entry obtained by performing XOR on the restoration entry using the restoration parameter, and creates a restoration entry packet in which a base SPN indicating the pre-transformation data indicated by the restoration entry is set, and includes these in the restoration byte code data.

The transformation processing unit 206 performs transformation processing on the AV stream based on the restoration entries created by the restoration entry generation unit and the restoration parameters generated by the restoration byte code data generation unit 205, thereby creating a transformed AV stream. The restoration byte code data generation unit 205 creates a mask restoration entry by performing XOR on the restoration entry using the restoration parameter, converts the mask restoration entry to the restoration descriptor, and inserts the converted restoration descriptor into PMT positioned immediately before the pre-transformation data indicated by the restoration entry. Following that, the transformation processing unit 206 overwrites the position of the pre-transformation data indicated by the restoration entry with a data string such as a random value. When no pre-transformation data exists between the PMT and the next PMT, the transformation processing unit 206 creates anew restoration entry, sets the restoration instruction flag to "transformation not required", generates a mask restoration entry by performing XOR on the restoration entry with the restoration parameter, generates a restoration descriptor, and inserts the generated restoration descriptor into the PMT.

The format processing unit 207 arranges the following into files and directories conforming to the BD-ROM standard, thereby generating a disc image in the UDF format which is a file system conforming to the BD-ROM standard: the BD-ROM scenario data generated by the scenario generation unit 202, the transformed AV stream generated by the transformation processing unit 206, the stream information file generated by the multiplexing unit 203, and the restoration byte code data generated by the restoration byte code data generation unit 205.

The master production unit 208 creates data for BD-ROM pressing from the disc image generated by the format processing unit 207. A BD-ROM can be manufactured by performing pressing processing on this data.

Described above is the structure of the recording apparatus.

In the following, the BD-ROM recording method of the recording apparatus is described with reference to FIG. 36.

In a step S201, the material production unit 201 generates the video streams, audio streams, IG streams, and PG streams. In a step S202, the scenario generation unit 202 creates the BD-ROM scenario data describing playback scenario, such as the IndexFile, Movie Object file, and PlayList file. In a step S203, the multiplexing unit 203 creates the AV stream and stream information file based on the BD-ROM scenario data.

Here, the restoration entry generation unit 204 executes untransformable packet specification processing, thereby specifying untransformable packets which are not allowed to be transformed, among the TS packets in the primary video and secondary video (S204). After that, the restoration entry generation unit 204 selects pre-transformation data from among TS packets which are other than the untransformable packets specified in the step S204, and creates a restoration entry (S205).

The restoration byte code data generation unit 205 generates restoration byte code data which outputs the restoration parameter used to generate the restoration entry in the step S205 (S206), and the transformation processing unit 206 creates a transformed AV stream based on the restoration entry and the AV stream (S207).

Lastly, the format processing unit 207 rearranges the BD-ROM scenario data, transformed AV stream, stream information file, and restoration byte code data into a file-directory structure conforming to the BD-ROM standard, thereby creating a disc image conforming to the BD-ROM standard (S208), and the master generation unit 208 creates the data for BD-ROM pressing (S209). These are the processing steps of the BD-ROM recording processing by the recording apparatus of the present embodiment.

Figure 37:
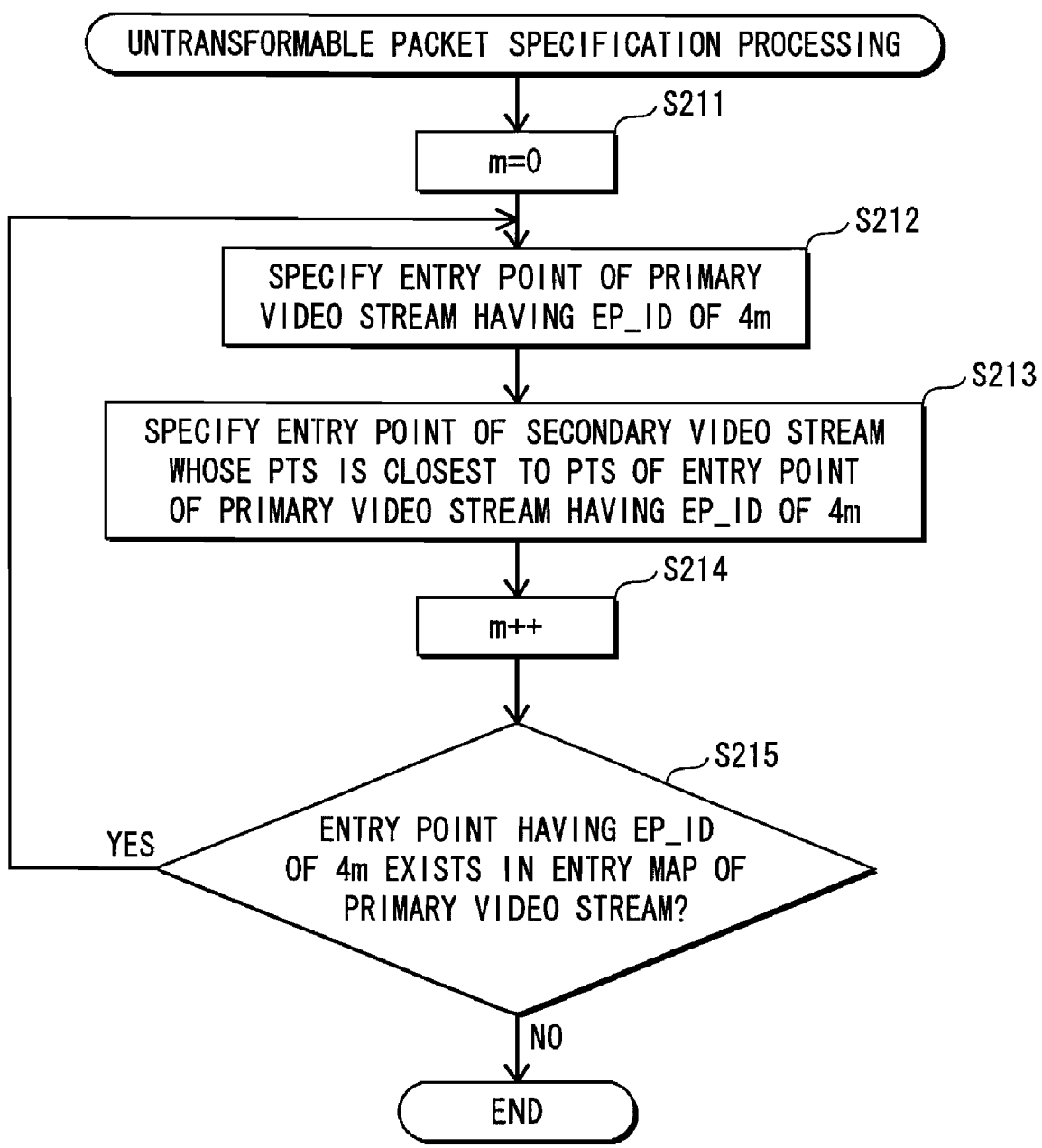
FIG. 37 is a flowchart showing processing steps of untransformable packet specification processing.

Next, the untransformable packet specification processing is described in detail. FIG. 37 is a flowchart showing processing steps of the untransformable packet specification processing.

Figure 36:
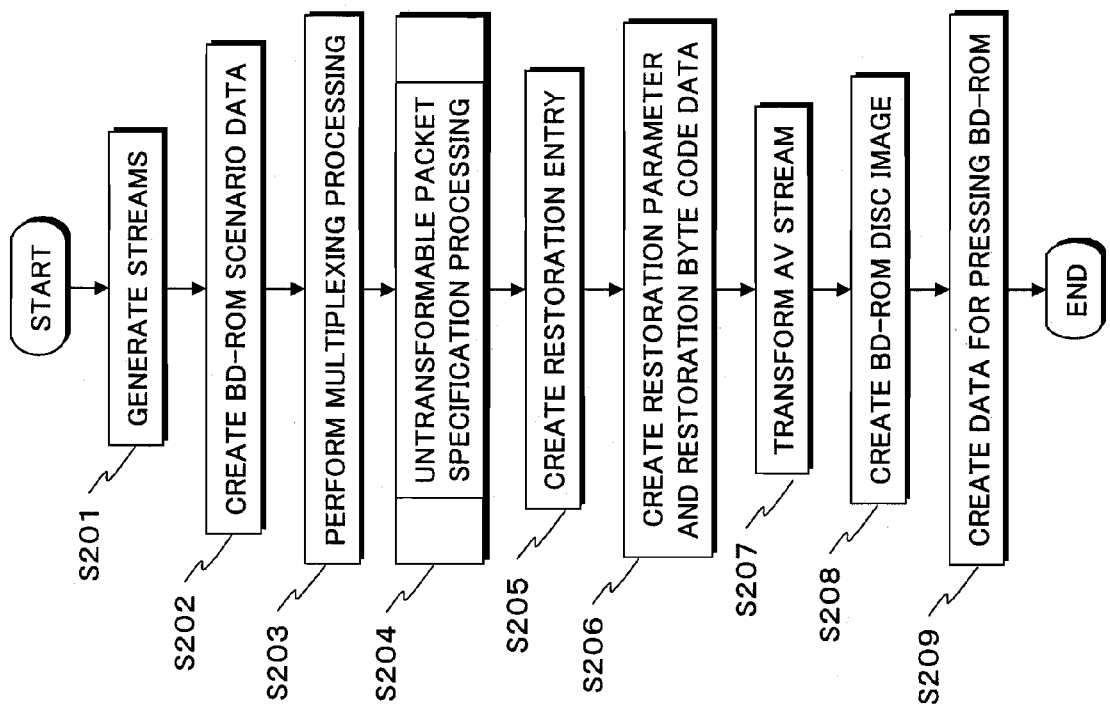
FIG. 36 shows a flowchart of a recording method.

In the untransformable packet specification processing, the restoration entry generation unit 204 first sets the variable m allocated on the work memory to 0 (S211):

After that, the restoration entry generation unit 204 refers to the entry maps in the stream information file generated by the multiplexing processing unit 203 in S203 in FIG. 36, and specifies, among the TS packets constituting the AV stream, TS packets constituting an I-picture indicated by the entry point whose EP_ID is 4m in the entry map of the primary video, as the untransformable packets (S212). Furthermore, the restoration entry generation unit 204 specifies, as the untransformable packets, the TS packets constituting an I-picture indicated by an entry point, in the entry map of the secondary video, whose PTS is closest to the entry point, in the entry map of the primary video, whose EP_ID is 4m (S213).

Following that, restoration entry generation unit 204 increments the variable m by one (S214), repeats the processing steps of S212 to S215, thereby adding specification of the untransformable packets, until 4m exceeds the final EP_ID of the entry map of the primary video, and when 4m exceeds the final EP_ID of the entry map of the primary video (S215: No), ends the untransformable packet specification processing.

Above is the detail of the untransformable packet specification processing.

As described above, according to the present embodiment, even in a case where copyright protection at the TS packet level has been realized by transforming part of an AV stream and recording the AV stream, TS packets constituting every fourth entry unit in the primary video stream and TS packets constituting entry units in the secondary video stream each having a presentation time stamp closest to any one of the every fourth entry unit in the primary video stream are not transformed. Consequently, as a result of selective use of the I-pictures stored in these TS packets by the playback apparatus, high-speed fast-forward/rewind playback can be performed without restoration processing of TS packets.

(Other Modifications)

While the present invention has been described through the embodiments above, it is not limited to these embodiments, and, for example, includes the following modifications as well.

(1) The present invention may be a playback/recording method disclosed by the processing steps of the flowchart explained in each embodiment. Also, the present invention may be a computer program including program codes which operate a computer using the processing steps, and may be a digital signal of the computer program.

Also, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal.

Furthermore, the present invention may be the computer program or the digital signal transmitted on an electric communication network, a wireless or wired communication network, or a network of which the Internet is representative.

Furthermore, by transferring the program or the digital signal to the recording medium, or by transferring the program or the digital signal via a network or the like, the program or the digital signal may be executed by another independent computer system.

(2) The present invention can also be realized by a LSI that controls the playback/recording apparatus described the embodiments above. Such a LSI can be achieved by integrating the functional blocks indicated in FIG. 31 of FIG. 35. These functional blocks may be partially or entirely implemented by one chip.

Though the LSI is described here, the circuit may be called an IC, a system LSI, a super LSI, or an ultra LSI, depending on the degree of integration.

Also, the integration is not limited to the LSI, and may be performed using a dedicated circuit or a general processor. A FPGA (Field Programmable Gate Array) that can be programmed after LSI manufacturing or a reconfigurable processor capable of reconfiguring connections and settings of circuit cells in an LSI may be used.

Also, if an integrated circuit technique that replaces a LSI emerges from advancement of semiconductor technology or other derivative technology, such a technique can be used for the integration of the functional blocks and components. For instance, biotechnology may be adapted in this way.

(3) The first to third embodiments describe the structure where the entry points, of the primary video, whose EP_ID is a multiple of four are ensured to be untransformed at the TS packet level. However, according to the present invention, it is not limited to the entry points having EP_ID of a multiple of four which are ensured to be untransformed at the TS packet level. One TS packet in how many entry points is ensured to be untransformed is set appropriately according to the format characteristics.

(4) While in the first embodiment, as shown in FIG. 18, the restoration entry is recorded on the recording medium after being masked and inserted into PMT as a descriptor, the restoration entry may be recorded on the recording medium using another method.

Figure 38:
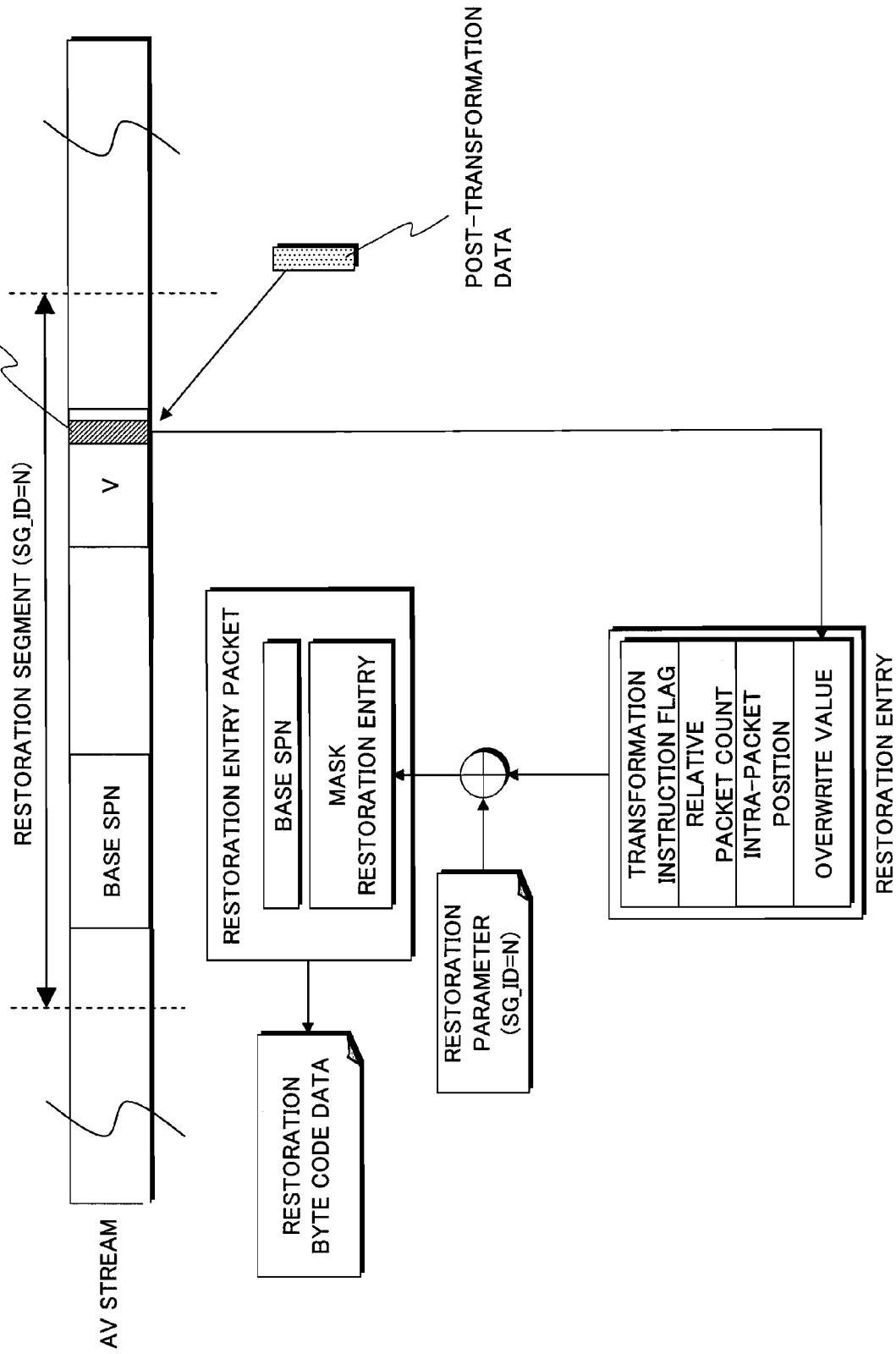
FIG. 38 shows a structure of a restoration entry with respect to transformed data in an AV stream in a modification, and how the restoration entry, as a restoration entry packet, is stored into the AV stream.

For example, as shown in FIG. 38, the restoration entry may be inserted into the restoration byte code data. In this case, while having the same structures as those in FIG. 18, the restoration entry and the mask restoration entry are inserted into the restoration byte code data as a restoration entry packet instead of as the restoration descriptor. The restoration entry packet has a base SPN and the mask restoration entry, and the base SPN stores a value obtained by subtracting the relative packet count of the restoration entry from SPN where the pre-transformation data exists. The restoration entry packet is stored in the restoration byte code data and is managed for each restoration segment ID.

(5) In the embodiments above, only part of the BD-ROM standard which is related to the present invention is excerpted, and description is given using only the representative directories and files. However, obviously, the present invention is able to record other files stipulated in the BD-ROM standard on the BD-ROM.

(6) While in the embodiments above, a BD-ROM conforming to the BD-ROM standard are used as an example, the features of the present invention do not depend on physical characteristics of the BD-ROM, and the present invention can be applied to other recording media.

(7) The present invention may be any combination of the above-described embodiments and modifications.

What is claimed is:

1. A non-transitory computer-readable recording medium comprising a recording area that has recorded thereon an AV stream and stream information, wherein
the AV stream includes (a) TS packets composing a primary video stream and (b) TS packets composing a secondary video stream, the stream information includes:
a first entry map indicating a plurality of associations each associating (a) a start position of, among the TS packets composing the primary video stream, a group of TS packets which constitute an entry unit with (b) a presentation time stamp of the group of TS packets of the primary video stream; and
a second entry map indicating a plurality of associations each associating (a) a start position of, among the TS packets composing the secondary video stream, a group of TS packets which constitute an entry unit with (b) a presentation time stamp of the group of TS packets of the secondary video stream,
each group of TS packets constituting an entry unit stores an intra-frame encoded image therein, among the TS packets composing the primary video stream, one or more TS packets have been transformed by replacement of the TS packets with another piece of data and TS packets which constitute every N-th entry unit, in an order of the start position, are not transformed by the replacement, N being an integer of 2 or more, each TS packet which constitutes one of the entry units of the secondary video stream and whose presentation time stamp is in a predetermined relationship with a presentation time stamp of the every N-th entry unit of the primary video stream, is not transformed by the replacement, the one or more transformed TS packets are decodable only after restoration processing, the restoration processing being performed for restoring the one or more transformed TS packets to one or more untransformed packets, and TS packets that have not been transformed by the replacement are decodable without the restoration processing.

2. The recording medium of claim 1, wherein
when the presentation time stamps with respect to two of the entry units of the secondary video stream are in the predetermined relationship with the presentation time stamp of a same one of the every N-th entry unit of the primary video stream, TS packets constituting one of the two entry units that is temporally posterior to the other entry unit are untransformed.

3. The recording medium of claim 2, wherein
the predetermined relationship is to be, among the presentation time stamps of the entry units of the secondary video stream, temporally closest to the presentation time stamp of any one of the every N-th entry unit of the primary video stream.

4. The recording medium of claim 2, wherein
the predetermined relationship is to be, among the presentation time stamps of the entry units of the secondary video stream, temporally posterior to and closest to the presentation time stamp of any one of the every N-th entry unit of the primary video stream.

5. The recording medium of claim 2, wherein
the primary video stream and the secondary video stream each include intra-frame encoded images with an interval of a predetermined value or less between any two adjacent intra-frame encoded images, and
the predetermined relationship is to be, among the presentation time stamps of the entry units of the secondary video stream, temporally posterior to and closest to the presentation time stamp of any one of the every N-th entry unit of the primary video stream, and a difference between the presentation time stamp of the any one of the every N-th entry unit of the primary video stream and the presentation time stamp of the entry unit, of the secondary video stream, which is temporally posterior thereto and closest thereto is less than the predetermined value.

6. The recording medium of claim 1 further having recorded thereon a restoration program which outputs a restoration parameter when executed, wherein
the AV stream includes a masked table multiplexed therein, and
restoration processing for restoring the transformed TS packets is executed by (a) performing a calculation using the masked table and the restoration parameter, and (b) overwriting the transformed packets with a result of the calculation.

7. The recording medium of claim 1, wherein
the every N-th entry unit of the primary video stream in the first entry map, and the one of entry units of the secondary video stream and whose presentation time stamp is in the predetermined relationship with the presentation time stamp of the every N-th entry unit of the primary video stream are entry units whose intra-frame encoded images stored in TS packets which constitutes the entry units are synchronously played back in special playback.

8. A playback apparatus which reads an AV stream and stream information from a recording medium and plays back the read AV stream, wherein
the AV stream includes (a) TS packets composing a primary video stream and (b) TS packets composing a secondary video stream, and the stream information includes:
a first entry map indicating a plurality of associations each associating (a) a start position of, among the TS packets composing the primary video stream, a group of TS packets which constitute an entry unit with (b) a presentation time stamp of the group of TS packets of the primary video stream; and
a second entry map indicating a plurality of associations each associating (a) a start position of, among the TS packets composing the secondary video stream, a group of TS packets which constitute an entry unit with (b) a presentation time stamp of the group of TS packets of the secondary video stream,
each group of TS packets constituting an entry unit stores an intra-frame encoded image therein, the playback apparatus comprises:
a reader circuit that reads TS packets included in the AV stream in accordance with the first entry map and the second entry map;
a demultiplexer circuit that demultiplexes the read TS packets into the TS packets composing the primary video stream and the TS packets composing the secondary video stream;
two video decoders that decode the TS packets composing the primary video stream and the TS packets composing the secondary video stream, respectively;
a read buffer that buffers TS packets between the reader circuit and the demultiplexer circuit;
a restoration circuit that restores, among TS packets in the read buffer, TS packets which have been transformed by replacement of the TS packets with another piece of data,
among the TS packets composing the primary video stream, one or more TS packets have been transformed by the replacement and TS packets which constitute every N-th entry unit, in an order of the start position, are not transformed by the replacement, N being an integer of 2 or more,
each TS packet which constitutes one of the entry units of the secondary video stream and whose presentation time stamp is in a predetermined relationship with a presentation time stamp of the every N-th entry unit of the primary video stream, is not transformed by the replacement,
the one or more transformed TS packets are restored to one or more untransformed TS packets by the restoration circuit, and the one or more untransformed packets are decodable by the video decoders, and
TS packets that have not been transformed by the replacement are decodable by the video decoders without the restoration processing.

9. The playback apparatus of claim 8, wherein
when the presentation time stamps with respect to two of the entry units of the secondary video stream are, among the presentation time stamps of the entry units of the secondary video stream, temporally closest to the presentation time stamp of a same one of the every N-th entry unit of the primary video stream, TS packets constituting one of the two entry units that is temporally posterior to the other entry unit are untransformed.

10. The playback apparatus of claim 9 further comprising a playback controller, wherein
the playback controller, when instructed to perform a special playback, (i) acquires, from the first entry map, each start position with respect to the every N-th entry unit of the primary video stream, (ii) further acquires, from the second entry map, each start position of the entry units of the secondary video stream, the presentation time stamp associated with each of which is closest to the presentation time stamp of a different one of the every N-th entry unit of the primary video stream, (iii) instructs the demultiplexer circuit to separate, from a TS packet at each start position in the read buffer, TS packets subsequent thereto, and (iv) instructs the two video decoders to decode part of TS packets separated from the start positions of the primary video stream and part of TS packets separated from the start positions of the secondary video stream, each part being equivalent to one intra-frame encoded image.

11. The playback apparatus of claim 10, wherein
the recording medium has further recorded a restoration program which outputs a restoration parameter when executed,
the AV stream includes a masked table multiplexed therein;
the demultiplexer circuit demultiplexes the masked table from the AV stream,
the restoration circuit includes:
an execution circuit that obtains the restoration parameter by executing the restoration program; and
a calculation circuit that obtains a plain table by performing a calculation using the masked table and the restoration parameter, and
restoration processing to restore the transformed TS packets is performed by overwriting the transformed TS packets in the read buffer using the plain table.

12. The playback apparatus of claim 11, wherein
the calculation is an XOR operation.

13. The playback apparatus of claim 8, wherein
in special playback, the playback apparatus synchronously plays back intra-frame encoded images stored in TS packets which constitute the every N-th entry unit of the primary video stream in the first entry map, and intra-frame encoded images stored in TS packets which constitute the one of entry units of the secondary video stream and whose presentation time stamp is in the predetermined relationship with the presentation time stamp of the every N-th entry unit of the primary video stream.

14. The playback apparatus of claim 8, wherein
after the restorator restores the one or more transformed TS packets among the TS packets composing the primary video stream, the two video decoders decode the restored TS packets of the primary video stream and TS packets of the secondary video stream whose presentation time stamps are to be synchronous with presentation time stamps of the restored TS packets.

15. A recording apparatus comprising:
a multiplexer circuit that obtains a multiplexed stream by multiplexing TS packets composing a primary video stream and TS packets composing a secondary video stream;
a first entry map generator circuit that generates a first entry map indicating a plurality of associations each associating (a) a start position of, among the TS packets composing the primary video stream, a group of TS packets which constitute an entry unit storing therein an intra-frame encoded image with (b) a presentation time stamp of the group of TS packets of the primary video stream;
a second entry map generator circuit that generates a second entry map indicating a plurality of associations each associating (a) a start position of, among the TS packets composing the secondary video stream, a group of TS packets which constitute an entry unit storing therein an intra-frame encoded image with (b) a presentation time stamp of the group of TS packets of the secondary video stream;
a specification circuit that specifies as untransformable packets, among the TS packets multiplexed in the multiplexed stream, (a) TS packets which constitute every N-th entry unit, in an order of the start position, among the TS packets composing the primary video stream, N being an integer of 2 or more, and (b) each TS packet which constitutes one of the entry units of the secondary video stream and whose presentation time stamp is closest to the presentation time stamp of the every N-th entry unit of the primary video stream;
a transformation circuit that obtains an AV stream by, with use of a restoration parameter, performing a restorable transformation by replacement of the TS packets with another piece of data with respect to some of TS packets among the TS packets in the multiplexed stream other than the untransformable TS packets;
a program generator circuit that generates a restoration program which outputs the restoration parameter when executed;
a recorder circuit that records, onto a recording medium, the AV stream, the first entry map, the second entry map, and the restoration program,
the transformed TS packets are decodable only after restoration processing, the restoration processing being performed for restoring one or more transformed TS packets to one or more untransformed TS packets, and
TS packets that have not been transformed by the replacement are decodable without the restoration processing.

16. A playback method which reads an AV stream and stream information from a recording medium and plays back the read AV stream, wherein
the AV stream includes (a) TS packets composing a primary video stream and (b) TS packets composing a secondary video stream, the stream information includes:
a first entry map indicating a plurality of associations each associating (a) a start position of, among the TS packets composing the primary video stream, a group of TS packets which constitute an entry unit with (b) a presentation time stamp of the group of TS packets of the primary video stream; and
a second entry map indicating a plurality of associations each associating (a) a start position of, among the TS packets composing the secondary video stream, a group of TS packets which constitute an entry unit with (b) a presentation time stamp of the group of TS packets of the secondary video stream, each group of TS packets constituting an entry unit stores an intra-frame encoded image therein, the playback method comprises:
  reading TS packets included in the AV stream in accordance with the first entry map and the second entry map, and buffering the read TS packets into a read buffer;
  restoring, among TS packets in the read buffer, TS packets which have been transformed by replacement of the TS packets with another piece of data;
  demultiplexing, from the read buffer, the TS packets composing the primary video stream and the TS packets composing the secondary video stream; and
  decoding step of decoding the TS packets composing the primary video stream and the TS packets composing the secondary video stream, respectively,
among the TS packets composing the primary video stream, one or more TS packets have been transformed by the replacement and TS packets which constitute every N-th entry unit, in an order of the start position, are not transformed by the replacement, N being an integer of 2 or more,
each TS packet which constitutes one of the entry units of the secondary video stream and whose presentation time stamp is in a predetermined relationship with a presentation time stamp of the every N-th entry unit of the primary video stream, is not transformed by the replacement,
the transformed TS packets are decodable only after restoration processing, the restoration processing being performed for restoring the one or more transformed TS packets to one or more untransformed TS packets, and
TS packets that have not been transformed by the replacement are decodable without the restoration processing.

17. A recording method for a recording medium, comprising:
  creating application data; and
  recording the created data onto a recording medium, wherein
  the application data includes an AV stream and stream information,
  the AV stream includes (a) TS packets composing a primary video stream and (b) TS packets composing a secondary video stream, the stream information includes:
    a first entry map indicating a plurality of associations each associating (a) a start position of, among the TS packets composing the primary video stream, a group of TS packets which constitute an entry unit with (b) a presentation time stamp of the group of TS packets of the primary video stream; and
    a second entry map indicating a plurality of associations each associating (a) a start position of, among the TS packets composing the secondary video stream, a group of TS packets which constitute an entry unit with (b) a presentation time stamp of the group of TS packets of the secondary video stream,
  each group of TS packets constituting an entry unit stores an intra-frame encoded image therein,
  among the TS packets composing the primary video stream, one or more TS packets have been transformed by replacement of the TS packets with another piece of data and TS packets which constitute every N-th entry unit, in an order of the start position, are not transformed by the replacement, N being an integer of 2 or more,
  each TS packet which constitutes one of the entry units of the secondary video stream and whose presentation time stamp is in a predetermined relationship with a presentation time stamp of the every N-th entry unit of the primary video stream, is not transformed by the replacement,
  the one or more transformed TS packets are decodable only after restoration processing, the restoration processing being performed for restoring the one or more transformed TS packets to one or more untransformed TS packets, and
  TS packets that have not been transformed by the replacement are decodable without the restoration processing.

18. An integrated circuit of a playback apparatus which reads an AV stream and stream information from a recording medium and plays back the read AV stream, wherein
  the AV stream includes (a) TS packets composing a primary video stream and (b) TS packets composing a secondary video stream,
  the stream information includes:
    a first entry map indicating a plurality of associations each associating (a) a start position of, among the TS packets composing the primary video stream, a group of TS packets which constitute an entry unit with (b) a presentation time stamp of the group of TS packets of the primary video stream; and
    a second entry map indicating a plurality of associations each associating (a) a start position of, among the TS packets composing the secondary video stream, a group of TS packets which constitute an entry unit with (b) a presentation time stamp of the group of TS packets of the secondary video stream,
  each group of TS packets constituting an entry unit stores an intra-frame encoded image therein,
  the integrated circuit comprises:
    a reader circuit that reads TS packets included in the AV stream in accordance with the first entry map and the second entry map;
    a demultiplexer circuit that demultiplexes the read TS packets into the TS packets composing the primary video stream and the TS packets composing the secondary video stream;
    two video decoders that decode the TS packets composing the primary video stream and the TS packets composing the secondary video stream, respectively;
    a read buffer that buffers TS packets between the reader circuit and the demultiplexer circuit; and
    a restoration circuit that restores, among TS packets in the read buffer, TS packets which have been transformed by replacement of the TS packets with another piece of data,
  among the TS packets composing the primary video stream, one or more TS packets have been transformed by the replacement and TS packets which constitute every N-th entry unit, in an order of the start position, are not transformed by the replacement, N being an integer of 2 or more, and
  each TS packet which constitutes one of the entry units of the secondary video stream and whose presentation time stamp is in a predetermined relationship with a presentation time stamp of the every N-th entry unit of the primary video stream, is not transformed by the replacement,
  the one or more transformed TS packets are restored to one or more untransformed TS packets by the restoration circuit, and the one or more untransformed packets are decodable by the video decoders, and TS packets that have not been transformed by the replacement are decodable by the video decoders without the restoration processing.

19. An integrated circuit of a recording apparatus, comprising:
- A multiplexer circuit that obtains a multiplexed stream by multiplexing TS packets composing a primary video stream and TS packets composing a secondary video stream;
- a first entry map generator circuit that generates a first entry map indicating a plurality of associations each associating (a) a start position of, among the TS packets composing the primary video stream, a group of TS packets which constitute an entry unit storing therein an intra-frame encoded image with (b) a presentation time stamp of the group of TS packets of the primary video stream;
- a second entry map generator circuit that generates a second entry map indicating a plurality of associations each associating (a) a start position of, among the TS packets composing the secondary video stream, a group of TS packets which constitute an entry unit storing therein an intra-frame encoded image with (b) a presentation time stamp of the group of TS packets of the secondary video stream;
- a specification circuit that specifies as untransformable packets, among the TS packets multiplexed in the multiplexed stream, (a) TS packets which constitute every N-th entry unit, in an order of the start position, among the TS packets composing the primary video stream, N being an integer of 2 or more, and (b) each TS packet which constitutes one of the entry units of the secondary video stream and whose presentation time stamp is closest to the presentation time stamp of the every N-th entry unit of the primary video stream;
- a transformation circuit that obtains an AV stream by, with use of a restoration parameter, performing a restorable transformation by replacing the TS packets with another piece of data with respect to some of TS packets among the TS packets in the multiplexed stream other than the untransformable TS packets;
- a program generator circuit that generates a restoration program which outputs the restoration parameter when executed;
- a recorder circuit that records, onto a recording medium, the AV stream, the first entry map, the second entry map, and the restoration program,
- the one or more transformed TS packets are decodable only after restoration processing, the restoration processing being performed for restoring the one or more transformed TS packets to one or more untransformed TS packets, and
- TS packets that have not been transformed by the replacement are decodable without the restoration processing.

* * * * *